(12) United States Patent
Borud et al.

(10) Patent No.: US 10,118,477 B2
(45) Date of Patent: Nov. 6, 2018

(54) HYBRID UTILITY VEHICLE

(71) Applicant: Polaris Industries Inc., Medina, MN (US)

(72) Inventors: Eric J. Borud, Roseau, MN (US); Christopher P. Matko, Chisago City, MN (US); David F. Buehler, Seedorf (CH); Brian L. Van Batavia, Delano, MN (US); Benjamin Marco Comana, Bern (CH)

(73) Assignee: Polaris Industries Inc., Medina, MN (US)

(*) Notice: Subject to any disclaimer, the term of this patent is extended or adjusted under 35 U.S.C. 154(b) by 0 days.

(21) Appl. No.: 15/613,483

(22) Filed: Jun. 5, 2017

(65) Prior Publication Data

US 2017/0355259 A1 Dec. 14, 2017

Related U.S. Application Data

(60) Provisional application No. 62/349,998, filed on Jun. 14, 2016.

(51) Int. Cl.
*B60K 6/52* (2007.10)
*B60K 6/26* (2007.10)
(Continued)

(52) U.S. Cl.
CPC ............. *B60K 6/52* (2013.01); *B60K 6/26* (2013.01); *B60K 6/383* (2013.01); *B60K 6/442* (2013.01); *B60K 6/48* (2013.01); *B60L 7/14* (2013.01); *B60L 11/1803* (2013.01); *B60L 11/1816* (2013.01); *B60L 11/1861* (2013.01);
(Continued)

(58) Field of Classification Search
CPC ... B60K 6/20; B60K 6/50; B60K 6/52; B60K 6/42; B60K 6/22; B60K 6/24; B60K 6/26; B60K 6/48; B60K 2006/4808
See application file for complete search history.

(56) References Cited

U.S. PATENT DOCUMENTS 5,461,568 A * 10/1995 Morita ............... B60K 23/0808
 180/197
6,041,877 A * 3/2000 Yamada ................. B60K 6/40
 180/242
(Continued)

FOREIGN PATENT DOCUMENTS

CN 105517670 4/2016
DE 102011102265 4/2012
(Continued)

OTHER PUBLICATIONS

International Search Report and Written Opinion of the International Searching Authority, dated Sep. 14, 2017, for International patent application No. PCT/US2017/035939; 14 pages.

*Primary Examiner* — Erez Gurari
(74) *Attorney, Agent, or Firm* — Faegre Baker Daniels LLP

(57) ABSTRACT

A hybrid vehicle may be a series hybrid or a parallel hybrid vehicle. One embodiment of a parallel hybrid vehicle includes an engine, a transmission coupled to the engine, a front drive coupled to the transmission through a prop shaft, a rear drive coupled to the transmission, a traction motor drivingly coupled to the prop shaft, and a battery to operate the traction motor.

17 Claims, 61 Drawing Sheets

(51) Int. Cl.
 *B60K 6/383* (2007.10)
 *B60K 6/48* (2007.10)
 *B60L 7/14* (2006.01)
 *B60L 11/18* (2006.01)
 *B60K 6/442* (2007.10)
 *B60K 6/24* (2007.10)
 *B60K 6/28* (2007.10)

(52) U.S. Cl.
 CPC ............ *B60K 6/24* (2013.01); *B60K 6/28* (2013.01); *B60K 2006/4808* (2013.01); *B60L 2210/30* (2013.01); *B60L 2210/40* (2013.01); *Y10S 903/905* (2013.01); *Y10S 903/906* (2013.01); *Y10S 903/907* (2013.01); *Y10S 903/913* (2013.01); *Y10S 903/916* (2013.01)

(56) References Cited

U.S. PATENT DOCUMENTS

| | | | | |
|---|---|---|---|---|
| 6,488,108 | B1 * | 12/2002 | Boll | B60K 6/40 180/55 |
| 6,615,946 | B2 * | 9/2003 | Pasquini | B60K 1/02 180/233 |
| 7,191,855 | B2 * | 3/2007 | Vasilantone | B60K 6/24 180/65.245 |
| 7,424,926 | B2 | 9/2008 | Tsuchiya | |
| 7,497,285 | B1 * | 3/2009 | Radev | B60K 6/26 180/65.225 |
| 7,497,286 | B2 * | 3/2009 | Keller | B60K 6/48 180/65.6 |
| 7,533,754 | B2 * | 5/2009 | Burrows | B60K 6/48 180/242 |
| 7,641,584 | B1 * | 1/2010 | Belloso | B60K 5/08 477/6 |
| 7,647,994 | B1 * | 1/2010 | Belloso | B60K 6/448 180/65.25 |
| 7,699,737 | B2 * | 4/2010 | Berhan | B60K 6/365 310/12.14 |
| 7,762,366 | B2 * | 7/2010 | Janson | B60K 6/365 180/65.6 |
| 7,780,562 | B2 * | 8/2010 | King | B60K 6/26 475/5 |
| 7,832,514 | B2 * | 11/2010 | Janson | B60K 6/38 180/65.265 |
| 7,871,348 | B2 * | 1/2011 | Perkins | B60W 20/10 475/5 |
| 7,992,662 | B2 * | 8/2011 | King | B60K 6/26 180/65.22 |
| 8,182,393 | B2 * | 5/2012 | Gillingham | B60K 1/04 477/10 |
| 8,496,079 | B2 | 7/2013 | Wenger | |
| 8,567,540 | B2 * | 10/2013 | Janson | B60K 6/26 180/65.22 |
| 8,597,145 | B2 * | 12/2013 | Stuart | B60K 6/48 180/65.1 |
| 8,701,523 | B2 | 4/2014 | Zerbato | |
| 8,878,469 | B2 | 11/2014 | Zerbato | |
| 8,936,120 | B2 * | 1/2015 | Takagi | B60K 6/48 180/291 |
| 8,958,965 | B2 * | 2/2015 | Perkins | B60K 23/08 701/1 |
| 8,991,283 | B2 * | 3/2015 | Fuechtner | B60K 6/448 180/65.21 |
| 9,038,754 | B2 * | 5/2015 | Takagi | B60K 5/06 180/65.22 |
| 9,108,615 | B2 * | 8/2015 | Lee | B60W 10/02 |
| 9,126,581 | B2 * | 9/2015 | Swales | B60W 20/00 |
| 9,598,067 | B2 * | 3/2017 | Chimner | B60W 50/082 |
| 9,643,490 | B2 * | 5/2017 | Gassmann | B60K 17/354 |
| 9,695,932 | B2 * | 7/2017 | Lee | F16H 61/0403 |
| 9,718,355 | B2 * | 8/2017 | Osborn | B60K 17/35 |
| 9,738,272 | B2 * | 8/2017 | West | B60W 20/40 |
| 9,776,625 | B2 * | 10/2017 | Yukawa | B60K 6/24 |
| 2009/0321156 | A1 * | 12/2009 | Perkins | B60K 6/26 180/65.7 |
| 2010/0317485 | A1 | 12/2010 | Gillingham | |
| 2014/0144719 | A1 | 5/2014 | Morgan | |

FOREIGN PATENT DOCUMENTS

| EP | 2567846 | 3/2013 |
| GB | 2452062 | 2/2009 |

* cited by examiner

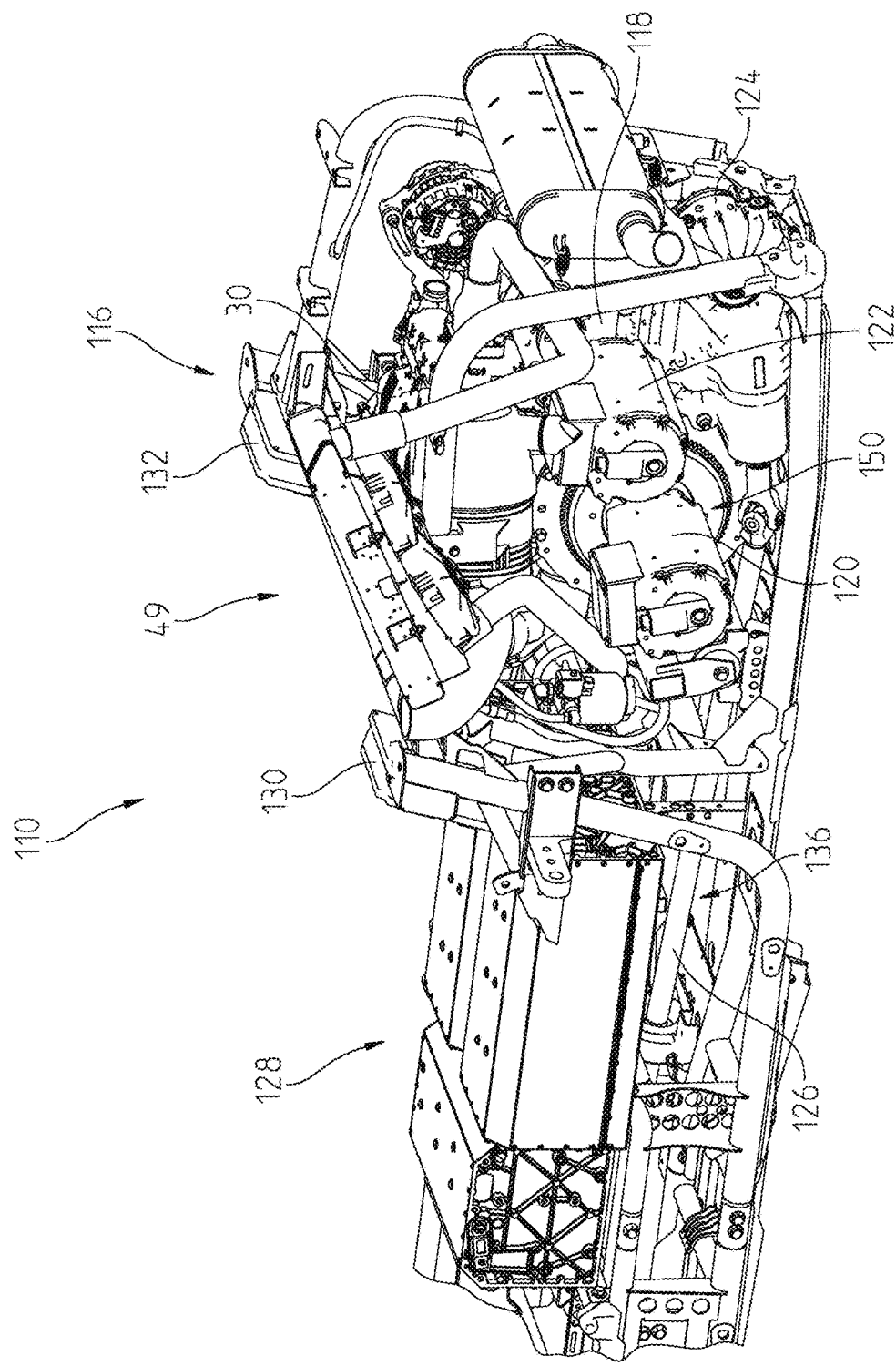

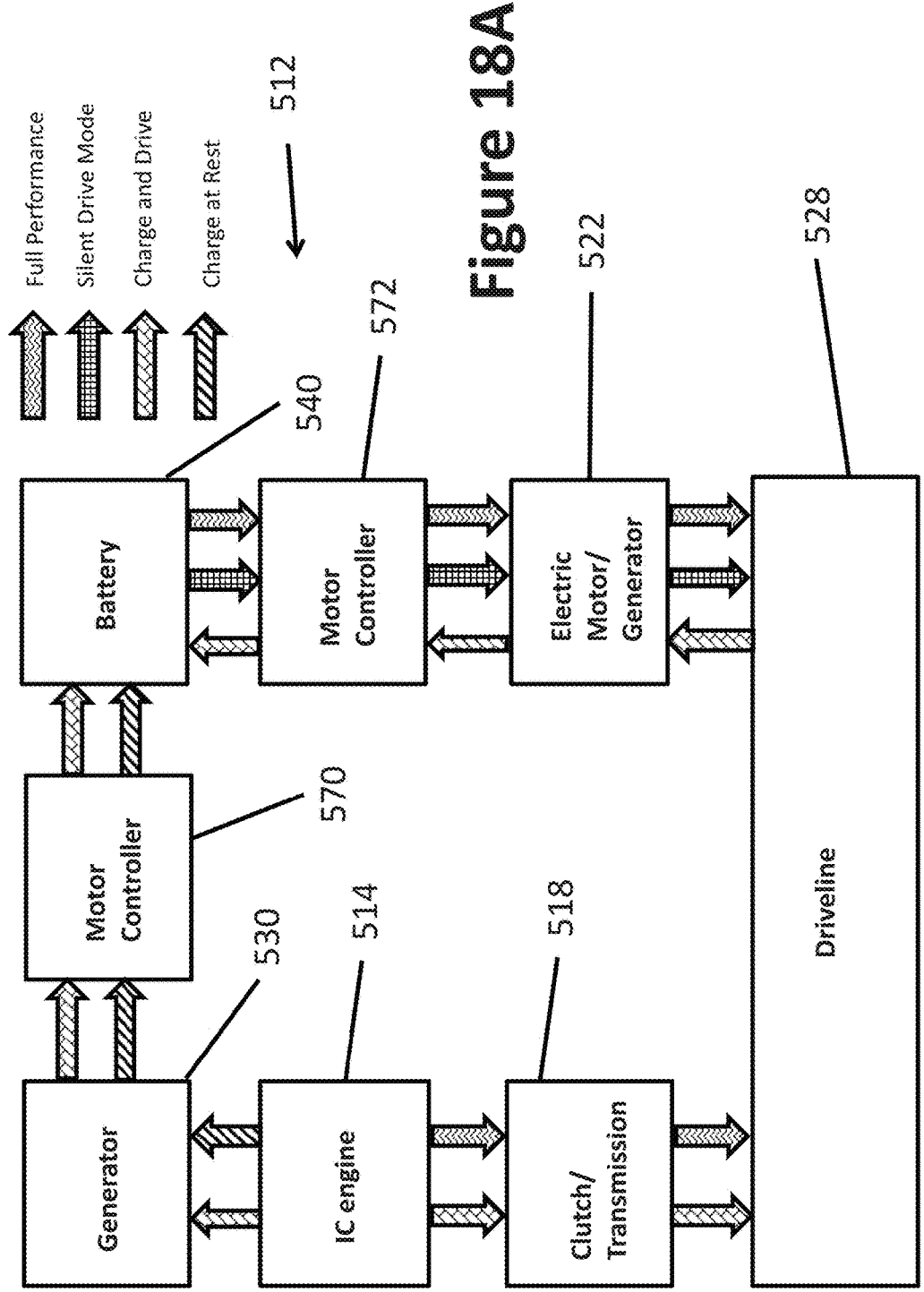

Charge at Rest

Charge and Drive

Silent Drive

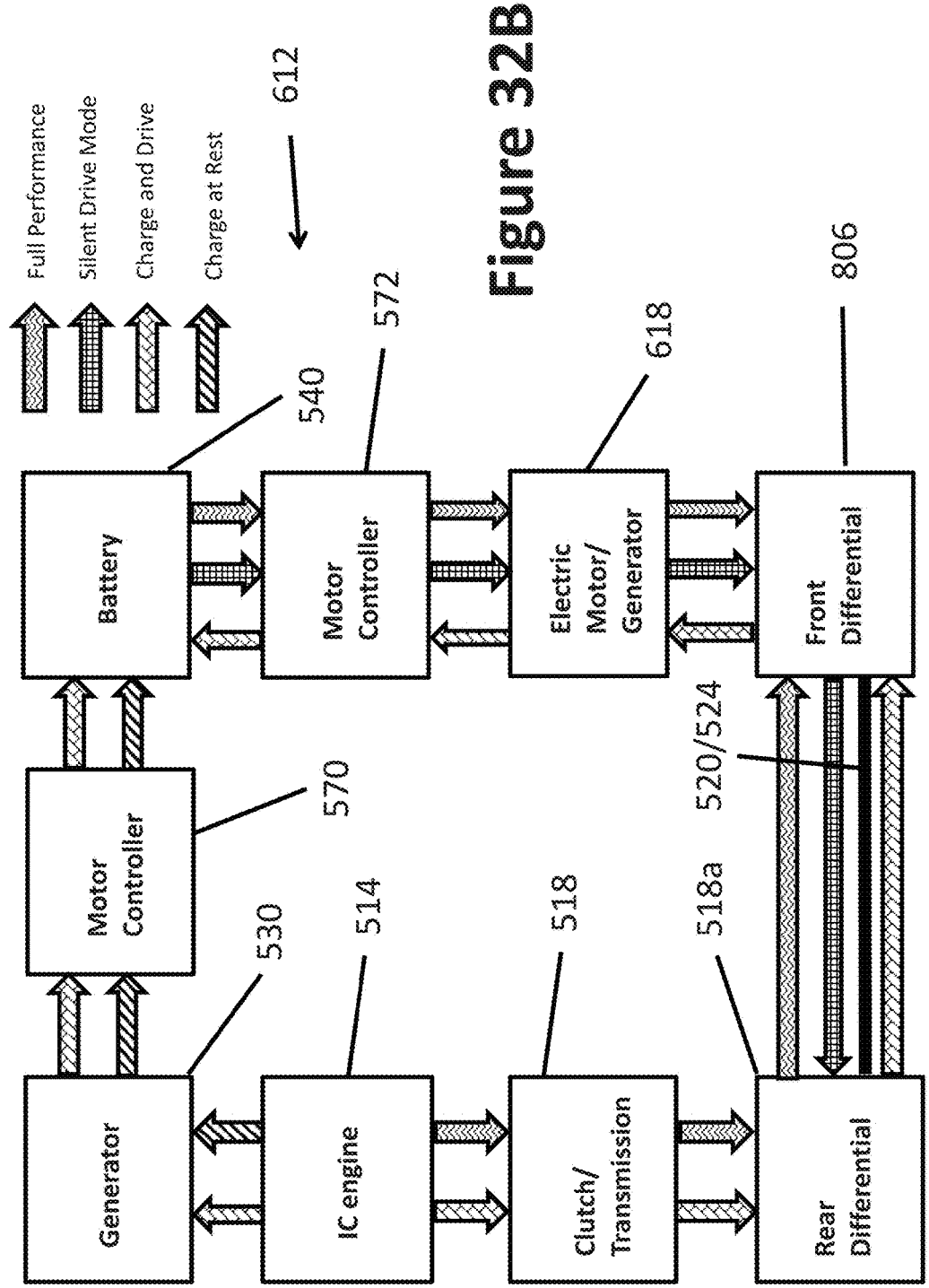

Charge at Rest

Charge and Drive

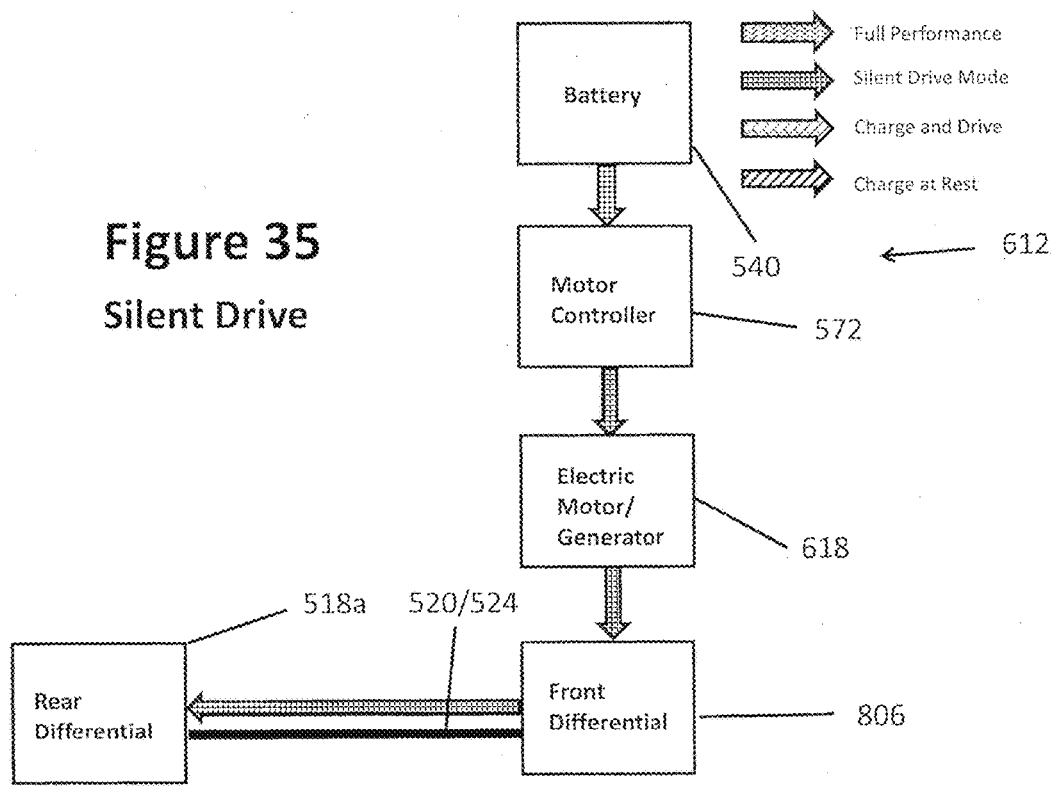

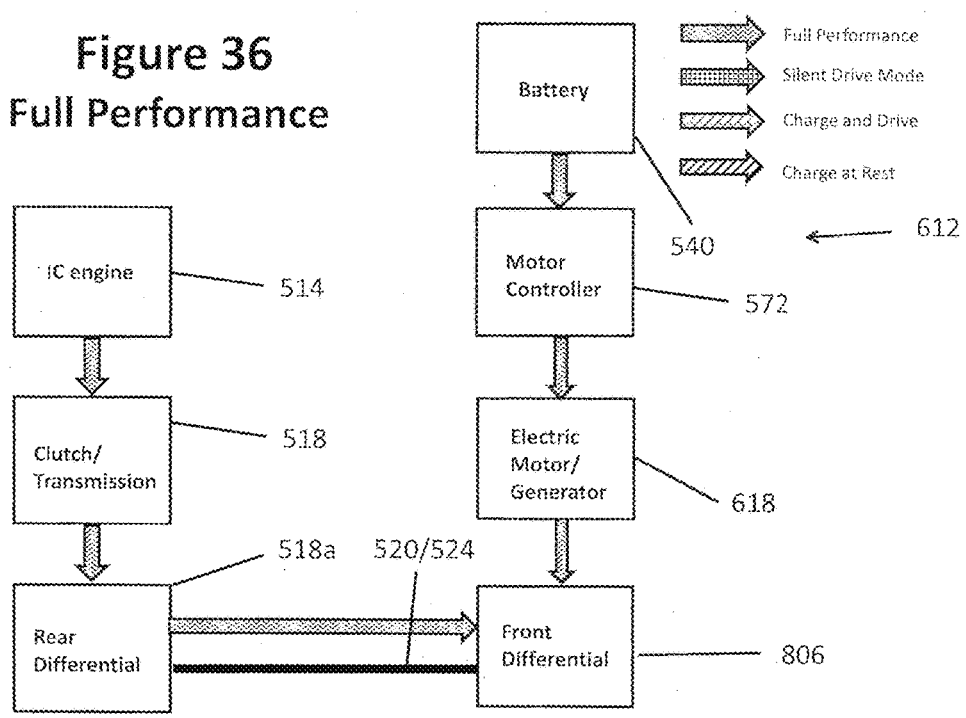

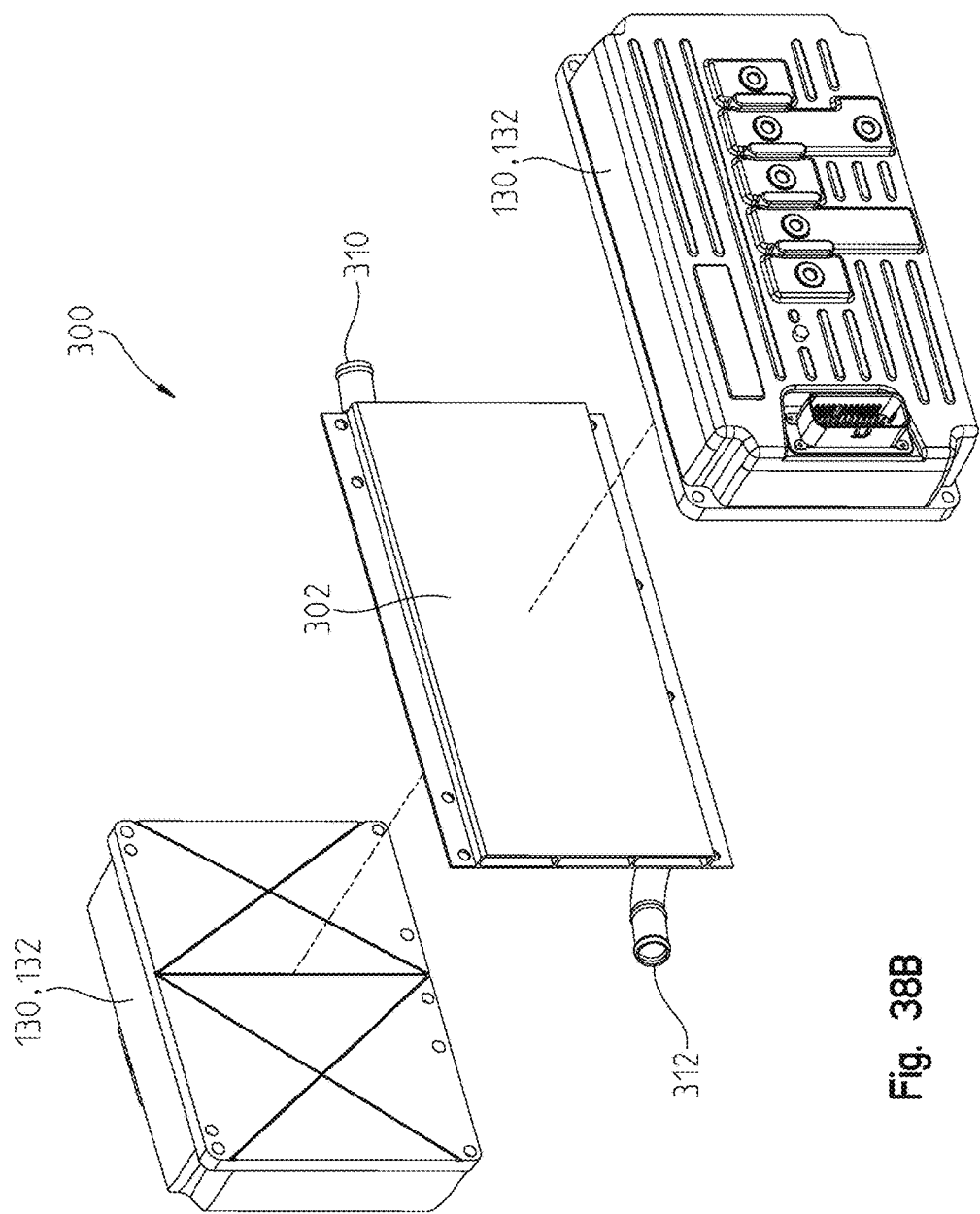

HYBRID UTILITY VEHICLE

CROSS-REFERENCE TO RELATED APPLICATIONS

The present application claims priority to U.S. Provisional Patent Application Ser. No. 62/349,998, filed Jun. 14, 2016, titled "HYBRID UTILITY VEHICLE," the complete disclosure of which is expressly incorporated by reference herein.

FIELD OF THE DISCLOSURE

The present application relates to a utility vehicle and, more particularly, a hybrid utility vehicle configured to operate in various drive modes.

BACKGROUND OF THE DISCLOSURE

Electric vehicles are known to have at least one battery pack which may be operably coupled to an electric motor for charging the battery pack and/or for driving the wheels of the vehicle. A hybrid vehicle, however, has both battery packs and an engine. In one embodiment of a hybrid vehicle, the engine and the battery packs operate in series, meaning that the battery packs provide the power or energy for driving the wheels and the engine operates to charge the battery packs. Alternatively, in another embodiment, a hybrid vehicle may be a parallel hybrid vehicle, meaning that the battery packs provide the power or energy to drive either the front or rear wheels but the engine provides the motive power to drive the other set of wheels.

SUMMARY OF THE DISCLOSURE

In one embodiment, a parallel hybrid power train comprises an engine; a transmission coupled to the engine; a front drive coupled to the transmission through a prop shaft; a rear drive coupled to the transmission; a traction motor being driving coupled to the prop shaft; and a battery to operate the traction motor. Additionally, in a further embodiment, a vehicle comprises a frame assembly, an operator area including at least an operator seat and a passenger seat supported on the frame assembly, and a driveline assembly. The driveline assembly includes an engine supported on the frame assembly, a transmission operably coupled to the engine, a front drive operably coupled to the transmission through a prop shaft, a rear drive operably coupled to the transmission, a traction motor operably coupled to the prop shaft and positioned laterally intermediate the operator seat and the passenger seat, and a battery configured to operate the traction motor.

The parallel hybrid power train may comprise a silent mode wherein the traction motor operates to drive the prop shaft to drive the front and rear drives. The parallel hybrid power train may further comprise an engine driven generator to charge the battery. In this embodiment, the parallel hybrid power train comprises a charge at rest mode wherein the engine is run to charge the batteries through the engine driven generator.

The parallel hybrid power train may also be profiled where the traction motor is also a generator for charging the batteries. The parallel hybrid power train may also comprise a charge and drive mode wherein the vehicle is driven and the batteries are charged by the engine driven generator and the traction motor in the generator mode.

The parallel hybrid power train may also comprise a full performance mode wherein the traction motor and engine are both operated to add torque to the prop shaft to drive the front and rear drives.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, where:

FIG. 2B is a rear left perspective view of the powertrain assembly of the series hybrid utility vehicle of FIG. 2A;

FIG. 18A is a schematic view of the hybrid powertrain of FIG. 14 with the various operating modes with the driveline shown generically;

FIG. 32B shows an overall schematic view of the operation of the hybrid powertrain of FIG. 25 with the various operating modes;

FIG. 35 is a schematic view of the silent drive mode of the hybrid schematic of FIG. 32;

FIG. 36 is a schematic of the full performance mode of the hybrid schematic of FIG. 32;

FIG. 38B is an exploded view of a radiator of the cooling assembly coupled to motor controllers of the electrical system of any of the hybrid utility vehicles disclosed herein;

Figure 1:
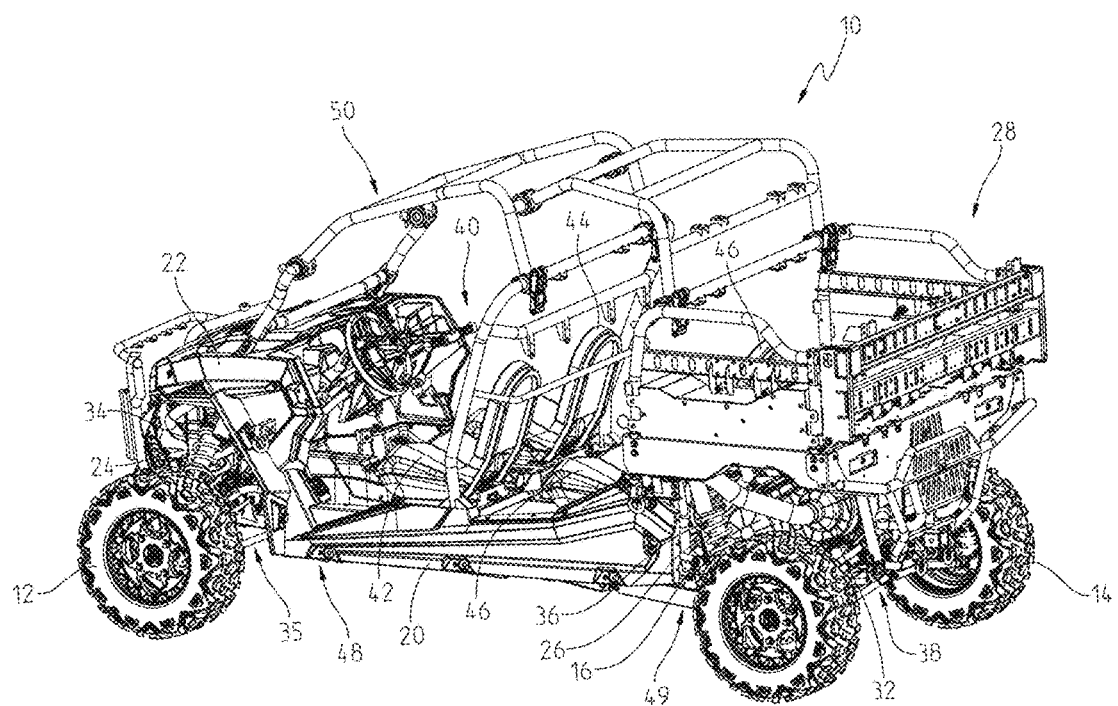
FIG. 1 is a rear left perspective view of a hybrid utility vehicle of the present disclosure.

Corresponding reference characters indicate corresponding parts throughout the several views. Although the drawings represent embodiments of the present invention, the drawings are not necessarily to scale and certain features may be exaggerated in order to better illustrate and explain the present invention.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a utility vehicle, it should be understood that the features disclosed herein may have application to other types of vehicles such as other all-terrain vehicles, motorcycles, snowmobiles, and golf carts.

Referring to FIG. 1, an illustrative embodiment of a hybrid utility vehicle 10 is shown, and includes ground engaging members, including front ground engaging members 12 and rear ground engaging members 14, a powertrain assembly 16, a frame 20, a plurality of body panels 22 coupled to frame 20, a front suspension assembly 24, a rear suspension assembly 26, and a rear cargo area 28. In one embodiment, one or more ground engaging members 12, 14 may be replaced with tracks, such as the PROSPECTOR II tracks available from Polaris Industries, Inc. located at 2100 Highway 55 in Medina, Minn. 55340, or non-pneumatic tires as disclosed in any of U.S. Pat. No. 8,109,308, filed on Mar. 26, 2008; U.S. Pat. No. 8,176,957, filed on Jul. 20, 2009 ; and U.S. Pat. No. 9,108,470, filed on Nov. 17, 2010 ; and U.S. Patent Application Publication No. 2013/0240272, filed on Mar. 13, 2013, the complete disclosures of which are expressly incorporated by reference herein. Vehicle 10 may be referred to as a utility vehicle ("UV"), an all-terrain vehicle ("ATV"), or a side-by-side vehicle ("SxS") and is configured for travel over various terrains or surfaces. More particularly, vehicle 10 may be configured for military, industrial, agricultural, or recreational applications.

Powertrain assembly 16 is operably supported on frame 20 and is drivingly connected to one or more of ground engaging members 12, 14. As shown in FIG. 1, powertrain assembly 16 may include an engine 30 (FIG. 2) and a transmission, for example a continuously variable transmission ("CVT") 32 and/or a shiftable transmission (not shown, and may be operably coupled to or included within a driveline assembly including front and rear differentials (not shown) and a drive shaft (not shown). Engine 30 may be a fuel-burning internal combustion engine, however, any engine assembly may be contemplated, such as hybrid, fuel cell, or electric engines or units. In one embodiment, powertrain assembly 16 includes a turbocharger (not shown) and engine 30 is a diesel internal combustion engine. Additional details of CVT 32 may be disclosed in U.S. Pat. Nos. 3,861,229; 6,176,796; 6,120,399; 6,860,826; and 6,938,508, the complete disclosures of which are expressly incorporated by reference herein.

Front suspension assembly 24 may be coupled to frame 20 and front ground engaging members 12. As shown in FIG. 1, front suspension assembly 20 includes a shock 34 coupled to each front ground engaging member 12 and a front axle arrangement which may include a front control arm assembly 35. Similarly, rear suspension assembly 26 may be coupled to frame 20 and rear ground engaging members 14. Illustratively, rear suspension assembly 26 includes a shock 36 coupled to each rear ground engaging member 14 and a rear axle arrangement 38. Additional details of powertrain assembly 16, the driveline assembly, and front suspension assembly 24 may be described in U.S. Pat. No. 7,819,220, filed Jul. 28, 2006, titled "SIDE-BY-SIDE ATV" and U.S. Patent Application Publication No. 2008/0023240, filed Jul. 28, 2006, titled "SIDE-BY-SIDE ATV"; and additional details of rear suspension assembly 26 may be described in U.S. Patent Application Publication No. 2012/0031693, filed Aug. 3, 2010, titled "SIDE-BY-SIDE ATV, the complete disclosures of which are expressly incorporated by reference herein.

Referring still to FIG. 1, vehicle 10 includes an operator area 40 supported by frame 20, and which includes seating for at least an operator and a passenger. Illustratively, one embodiment of vehicle 10 includes four seats, including an operator seat 42, a front passenger seat 44, and two rear passenger seats 46. More particularly, operator seat 42 and front passenger seat 44 are in a side-by-side arrangement, and rear passengers seats 46 also are in a side-by-side arrangement. Rear passenger seats 46 are positioned behind operator seat 42 and front passenger seat 44 and may be elevated relative to seats 42, 44. Operator seat 42 includes a seat bottom, illustratively a bucket seat, and a seat back. Similarly, front passenger seat 44 includes a seat bottom, illustratively a bucket seat, and a seat back. Likewise, each rear passenger seat 46 includes a seat bottom, illustratively a bucket seat, and a seat back.

Vehicle 10 further includes frame 20 supported by ground engaging members 12, 14. In particular, frame 20 includes a front frame portion 48 and a rear frame portion 49. Illustratively, rear frame portion 49 supports powertrain assembly 16 and rear cargo area 28. Vehicle 10 also comprises an overhead or upper frame portion 50. Upper frame portion 50 is coupled to frame 20 and cooperates with operator area 40 to define a cab of vehicle 10. Additional details of vehicle 10 may be disclosed in U.S. Pat. No. 8,998,253, filed Mar. 28, 2013, the complete disclosure of which is expressly incorporated by reference herein.

Figure 2A:
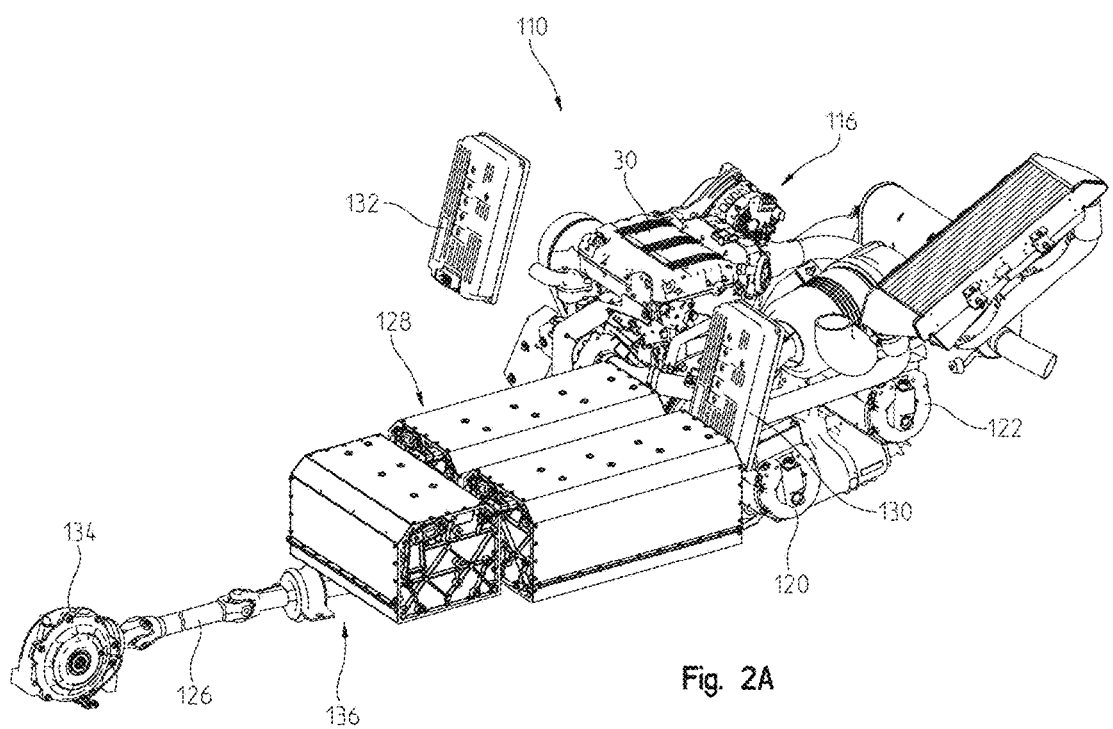
FIG. 2A is a front left perspective view of a driveline of a series hybrid utility vehicle of the present disclosure operably coupled to a first embodiment of a powertrain assembly.
Figure 2C:
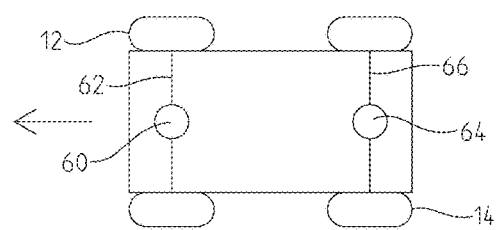
FIG. 2C is a schematic view of the vehicle of FIG. 2A in an ideal turn.

Referring to FIGS. 2A and 2B, in one embodiment, vehicle 10 is a series hybrid utility vehicle 110 configured for all-electrical operation. Vehicle 110 includes an alternative powertrain assembly 116 and an electrical system 150. Powertrain assembly 116 includes engine 30 but does not include CVT 32, although powertrain assembly 116 still includes a transmission 118, which may be a shiftable transmission or gearbox, operably coupled to engine 30. Instead of CVT 32, powertrain assembly 116 is operably coupled to electrical system 150 which includes a motor/generator 120 operably coupled to engine 30 and a traction motor 122 operably coupled to transmission 118 and motor/generator 120. Motor/generator 120 is configured to convert the rotary power supplied by engine 30 into electrical power to be used by traction motor 122, a plurality of battery packs 128, or any other component of vehicle 110. Illustrative vehicle 110 is always electrically driven and, therefore, no CVT or other mechanical drive system is needed between engine 30 and a driveline 136 of vehicle 110.

Referring still to FIGS. 2A and 2B, engine 30 acts an electric generator to provide rotary power to motor/generator 120 which is operably coupled to the crankshaft of engine 30 via a belt or is operably coupled to engine 30 through a gear box. For example, when engine 30 is operating, the crankshaft rotates to provide power to motor/generator 120 which then supplies power to traction motor 122 via a motor controller 130 (e.g., which may be or includes an inverter) (FIG. 3). Traction motor 122 also may be coupled to a second motor controller 132 (e.g., which may be or includes an inverter) (FIG. 3) to supply power to driveline 136. Traction motor 122 is then configured to supply power to front and rear ground engaging members 12, 14 by providing power either to transmission 118, a prop shaft gear box (not shown), a front gear box (not shown), or directly to each front and rear ground engaging member 12, 14. More particularly, traction motor 122 drives transmission 118 which drives rear ground engaging members 14 through a rear differential or gear box 124 and drives front ground engaging members 12 through a prop shaft 126 which is operably coupled to a front differential or gear box 134 (FIG. 2A).

Figure 2D:
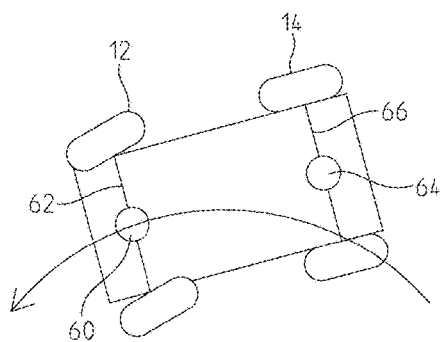
FIG. 2D is a schematic view of the vehicle of FIG. 2A in an oversteer situation.

Front and rear ground engaging members 12, 14 may each include individual motors to provide torque vectoring attributes. More particularly, and referring to FIG. 2C, a front accelerometer 60 may be positioned at a front axle 62 and a rear accelerometer 64 may be positioned at a rear axle 66 of vehicle 110. Using a standard or X-Y-Z coordinate system and $\vec{a}_{60} - \vec{a}_{64} = 0$, the lateral acceleration of vehicle 110 may be measured along the Y-axis and the longitudinal acceleration of vehicle 110 may be measured along the X-axis. If vehicle 110 is an ideal turn, the lateral acceleration of both front and rear axles 62, 66 will be the same. However, if vehicle 110 tends to oversteer, as shown in FIG. 2D, the lateral acceleration on rear axle 66 is less than the lateral acceleration on front axle 62 because rear ground engaging members 14 are not able to maintain the same turning radius as front ground-engaging members 12. In this oversteering situation, $\vec{a}_{60} - \vec{a}_{64} = 0$. In order to correct the oversteering situation, the ECU moves the traction torque distribution from a rear motor to a front motor until $\vec{a}_{60} - \vec{a}_{64} = 0$ is restored. In doing so, the torque vectoring adjusts the original torque distribution based on driver input(s) and the driving situation to maintain a stable driving behavior and vehicle safety.

Figure 2E:
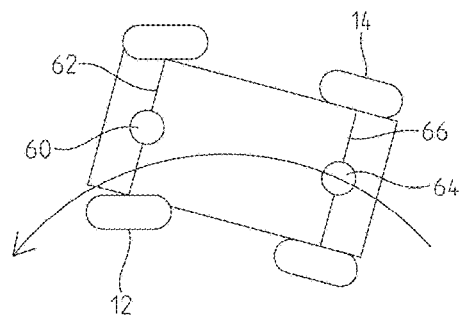
FIG. 2E is a schematic view of the vehicle of FIG. 2A in an understeer situation.

Conversely, as shown in FIG. 2E, if vehicle 110 tends to understeer, the lateral acceleration on rear axle 66 is greater than on front axle 62 because front ground engaging members 12 do not maintain the intended turning radius. In this understeering situation, $\vec{a}_{60} - \vec{a}_{64} = 0$. In order to correct the understeering situation, the ECU moves the traction torque distribution from the front motor to the rear motor until $\vec{a}_{60} - \vec{a}_{64} = 0$ is restored. In doing so, the torque vectoring adjusts the original torque distribution based on driver input(s) and the driving situation to maintain a stable driving behavior and vehicle safety.

Additionally, traction control is monitored, adjusted, and/or contemplated when using torque vectoring for both optimal acceleration of vehicle 110 and stability of vehicle 110 during operation. Traction control monitors the rotational speed of both front and rear axles 62, 66 and also calculates and/or stores derivatives of the signals generated based on the rotational speed of front and rear axles 62, 66. If either the rotational speed or its derivatives differs between front and rear axles 62, 66, the traction control limits the requested torque to one or both of the front and rear motors.

As shown in FIGS. 2A and 2B, vehicle 110 also includes battery packs 128. In one embodiment, battery packs 128 are supported by rear frame portion 49 and are positioned either below rear passenger seats 46 or, illustratively, one or more of rear passenger seats 46 are removed to provide available space for battery packs 128. Battery packs 128 are operably coupled to motor/generator 120 and traction motor 122. Because battery packs 128 are operably coupled to motor/generator 120, motor/generator 120 is able to charge battery packs 128 when vehicle 110 is at rest. Additionally, vehicle 110 may be up-idled to provide more electrical power to battery packs 128 than vehicle 110 is consuming during driving in order to charge battery packs 128. Additionally, vehicle 110 is configured for regenerative braking such that driveline 136 can act as a kinetic energy recovery system as vehicle 110 decelerates, coasts, or brakes in order to capture braking energy for charging battery packs 128.

In one embodiment, battery packs 128 also are operably coupled to traction motor 122 to provide power thereto. However, if battery packs 128 are removed from vehicle 110, engine 30 is configured to constantly supply power to traction motor 122 via motor/generator 120 and motor controllers 130, 132.

Figure 3A:
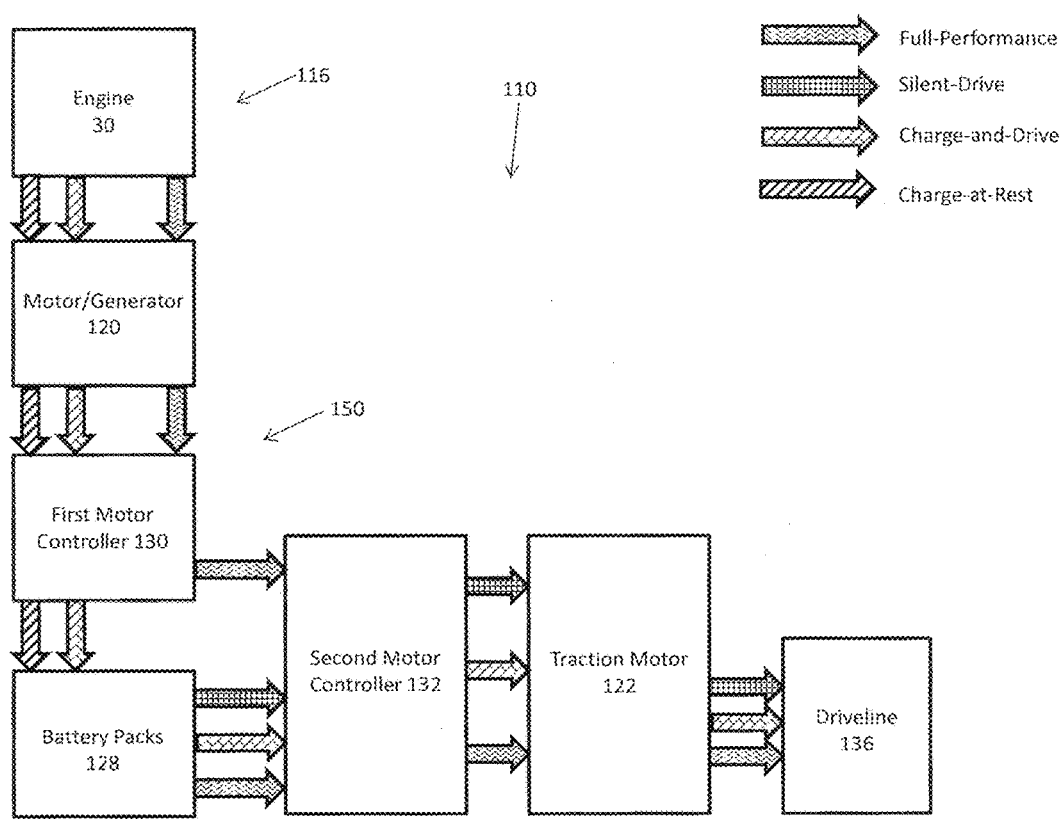
FIG. 3A is a schematic flow chart illustrating the power flow between various components of the hybrid utility vehicle of FIG. 2A in various drive modes.
Figure 3B:
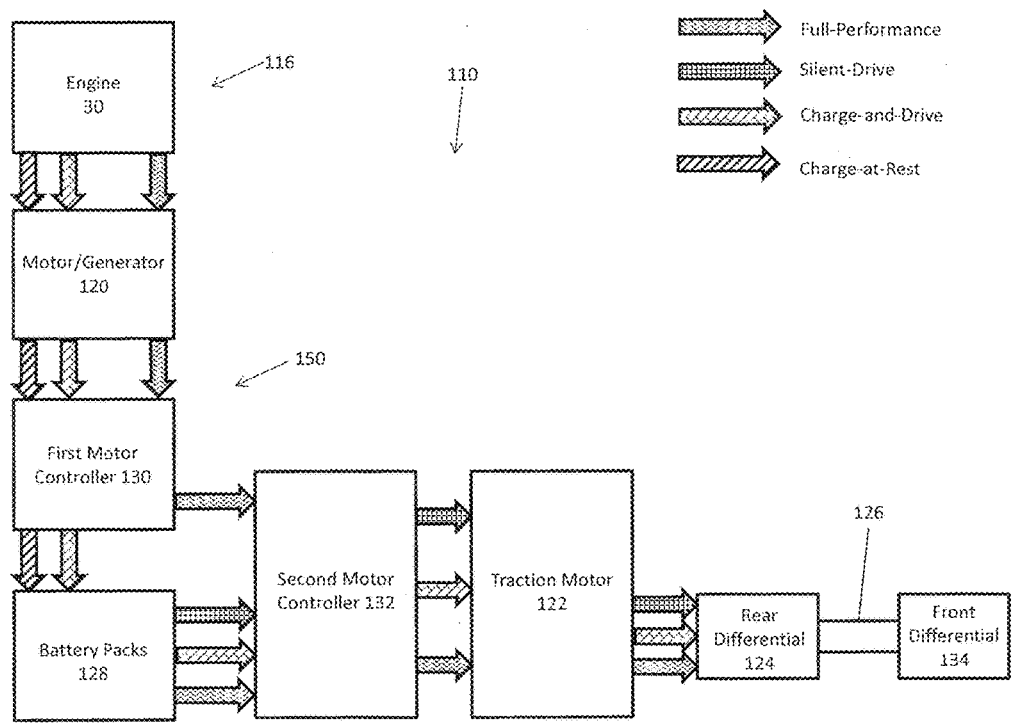
FIG. 3B is a further schematic flow chart illustrating the power flow between various components of the hybrid utility vehicle of FIG. 2A in various drive modes.

Referring to FIGS. 3A-7, vehicle 110 is a series hybrid vehicle configured for four drive modes: (1) Full-Performance; (2) Silent-Drive; (3) Charge-and-Drive; and (4) Charge-at-Rest. As shown in FIG. 3A, power may be provided to any component of driveline 136, including rear differential 124, front differential 134, prop shaft 136, and/or any other component of driveline 136. Illustratively, as shown in FIG. 3B, power may be provided specifically to rear differential 124 which then transmits power to front differential 134 through prop shaft 126.

Figure 4:
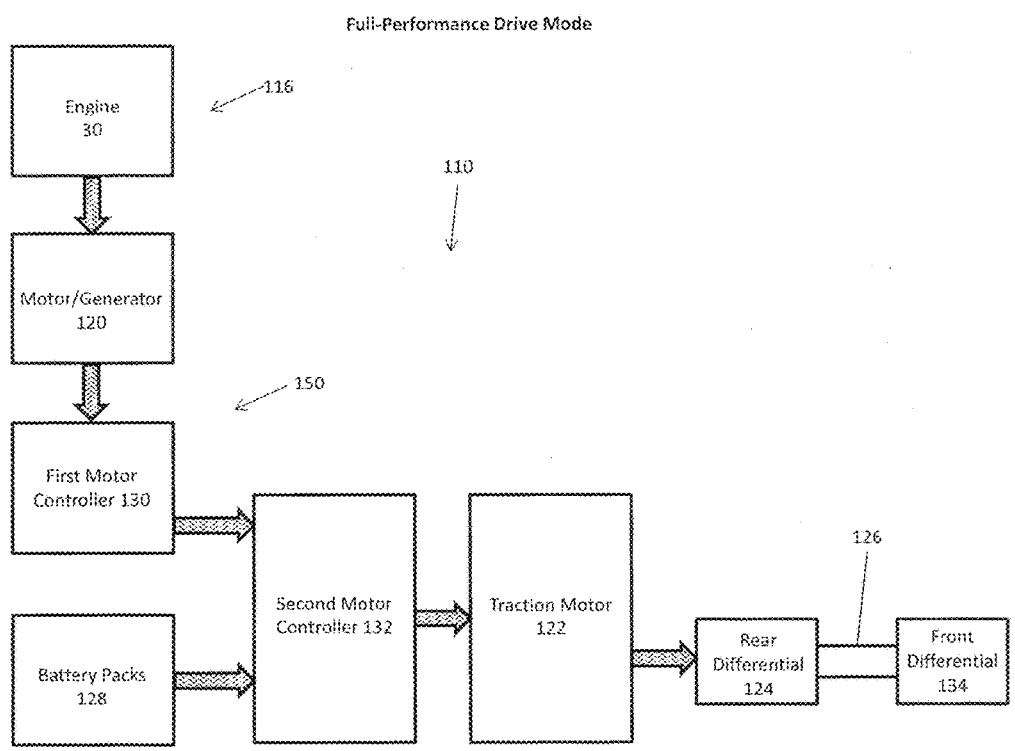
FIG. 4 is a schematic flow chart illustrating a "Full-Performance" drive mode of FIG. 3A.

As shown in FIG. 4, when vehicle 110 is operating in the Full-Performance drive mode, engine 30 supplies power to motor/generator 120 which then provides a power input to motor controller 130. Motor controller 130 then transmits power to second motor controller 132 to provide power to traction motor 122 to drive rear differential 124 for rotating rear ground engaging members 14 and to drive front differential 134 through prop shaft 126 for rotating front ground engaging members 12. Additionally, when in the Full-Performance drive mode, battery packs 128 also supply supplemental power to second motor controller 132 to provide an additional power input to traction motor 122.

Figure 5:
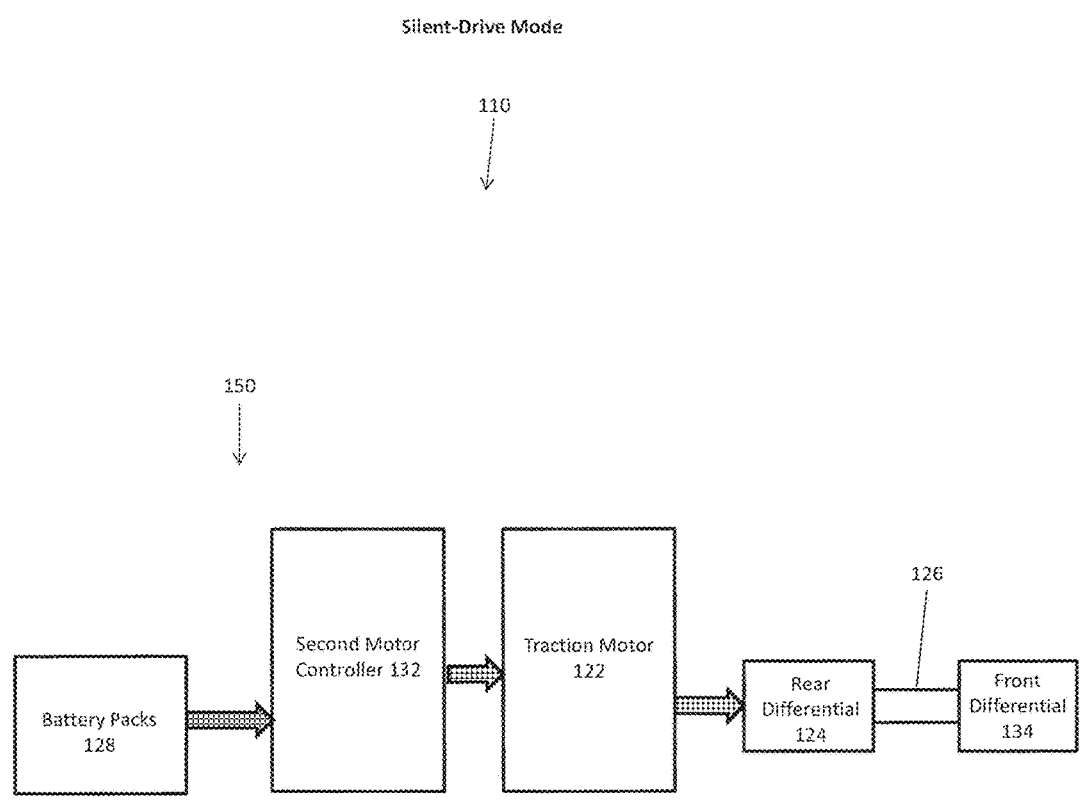
FIG. 5 is a schematic flow chart illustrating a "Silent-Drive" mode of FIG. 3A.

However, as shown in FIG. 5, when vehicle 110 is operating in the Silent-Drive mode, only battery packs 128 provide power to second motor controller 132 to drive traction motor 122. In this way, neither engine 30 nor motor/generator 120 provides a power input to traction motor 122. As such, engine 30 does not operate in the Silent-Drive mode which decreases the noise produced by vehicle 110 and may allow vehicle 110 to operate in low-noise environments or when vehicle 110 is utilized for a stealth-type application.

Figure 6:
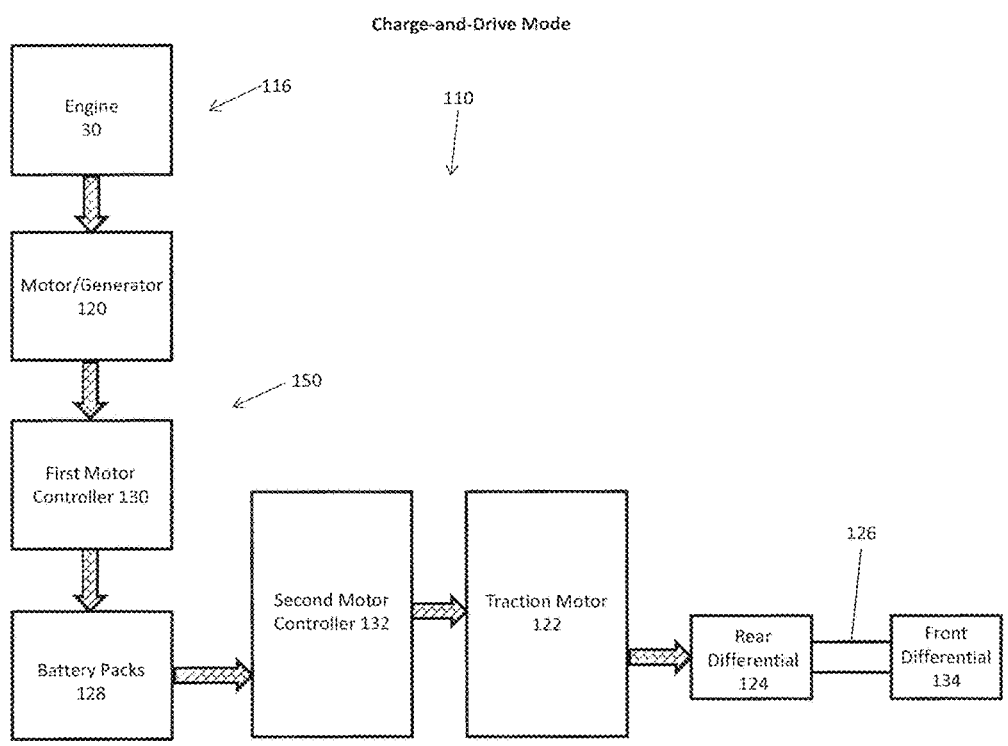
FIG. 6 is a schematic flow chart illustrating a "Charge-and-Drive" mode of FIG. 3A.

Referring to FIG. 6, when vehicle 110 is operating in the Charge-and-Drive mode, engine 30 supplies power to motor/generator 120 which then provides a power input to motor controller 130. Motor controller 130 then transmits power to battery packs 128 for charging battery packs 128 during operation of vehicle 110. As such, when in the Charge-and-Drive mode, engine 30 only operates to charge battery packs 128. In this way, only battery packs 128 provide the motive power necessary to drive front and rear ground engaging members 12, 14, however, battery packs 128 are being charged during operation of vehicle 110. More particularly, battery packs 128 provide power to second motor controller 132 which transmits power to traction motor 122 to drive rear differential 124 for rotating rear ground engaging members 14 and to drive front differential 134 through prop shaft 126 for rotating front ground engaging members 12. Therefore, in the Charge-and-Drive mode, engine 30 charges battery packs 128 to at least match the power output from battery packs 128 necessary to drive vehicle 110.

Figure 7:
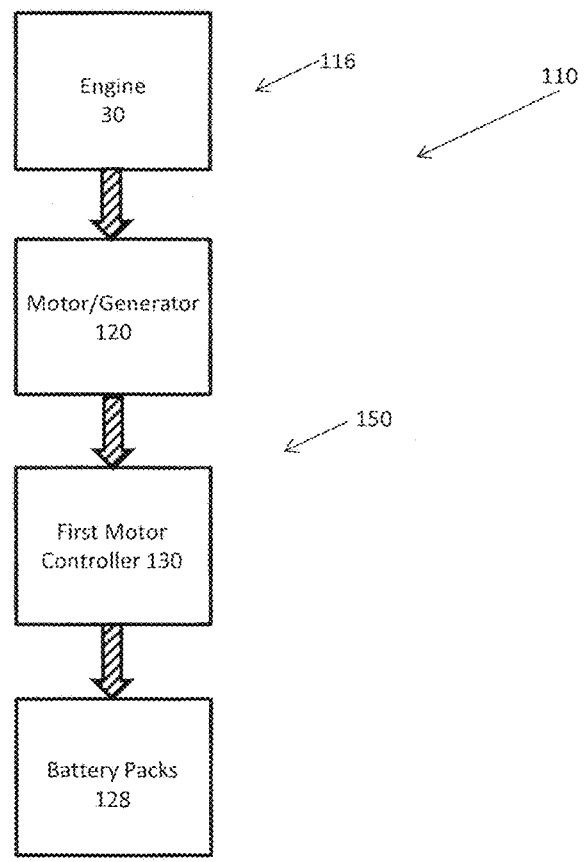
FIG. 7 is a schematic flow chart illustrating a "Charge-at-Rest" drive mode of FIG. 3A.

Lastly, referring to FIG. 7, when vehicle 110 is operating in the Charge-at-Rest mode, engine 30 supplies power to motor/generator 120 which then provides a power input to motor controller 130. Motor controller 130 then transmits power to battery packs 128 to charge battery packs 128 during operation of vehicle 110. However, when in the Charge-at-Rest mode, vehicle 110 is not moving, so no input is provided to traction motor 122, rear differential 124, prop shaft 126, or front differential 134 and, instead, vehicle 110 remains in a stationary position. In this way, battery packs 128 can charge while vehicle 110 is idling.

These four drive modes allow vehicle 110 to operate in either two-wheel drive or four-wheel drive and also allow vehicle 110 to operate in a variety of environments and conditions or in any situations applicable for a series hybrid vehicle. Additional details of vehicle 110 may be disclosed in U.S. Pat. No. 8,496,079, filed Dec. 13, 2010, the complete disclosure of which is expressly incorporated by reference herein.

Figure 8A:
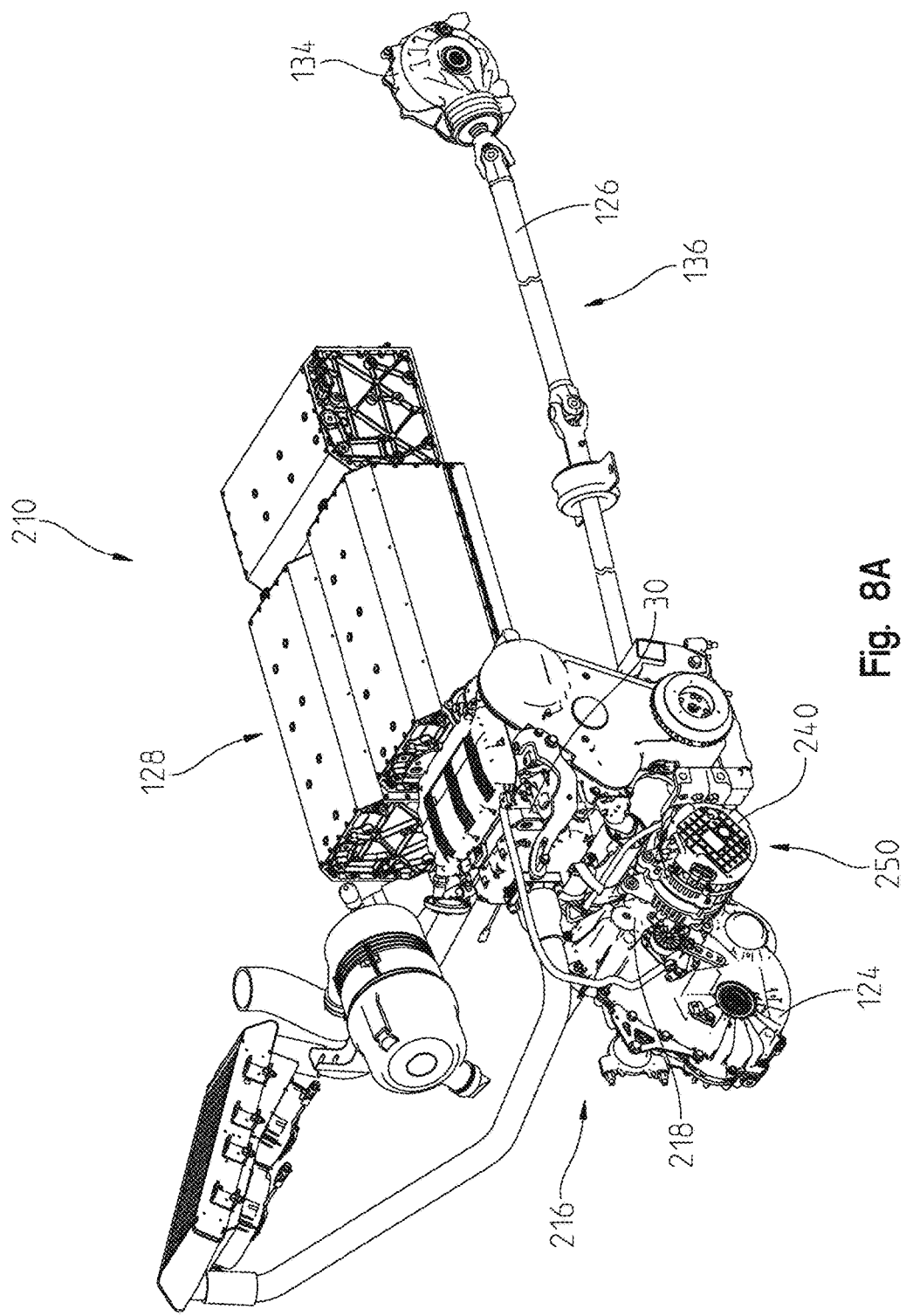
FIG. 8A is a rear right perspective view of a driveline of a first embodiment of a parallel hybrid utility vehicle of the present disclosure operably coupled to a second embodiment of a powertrain assembly.
Figure 8B:
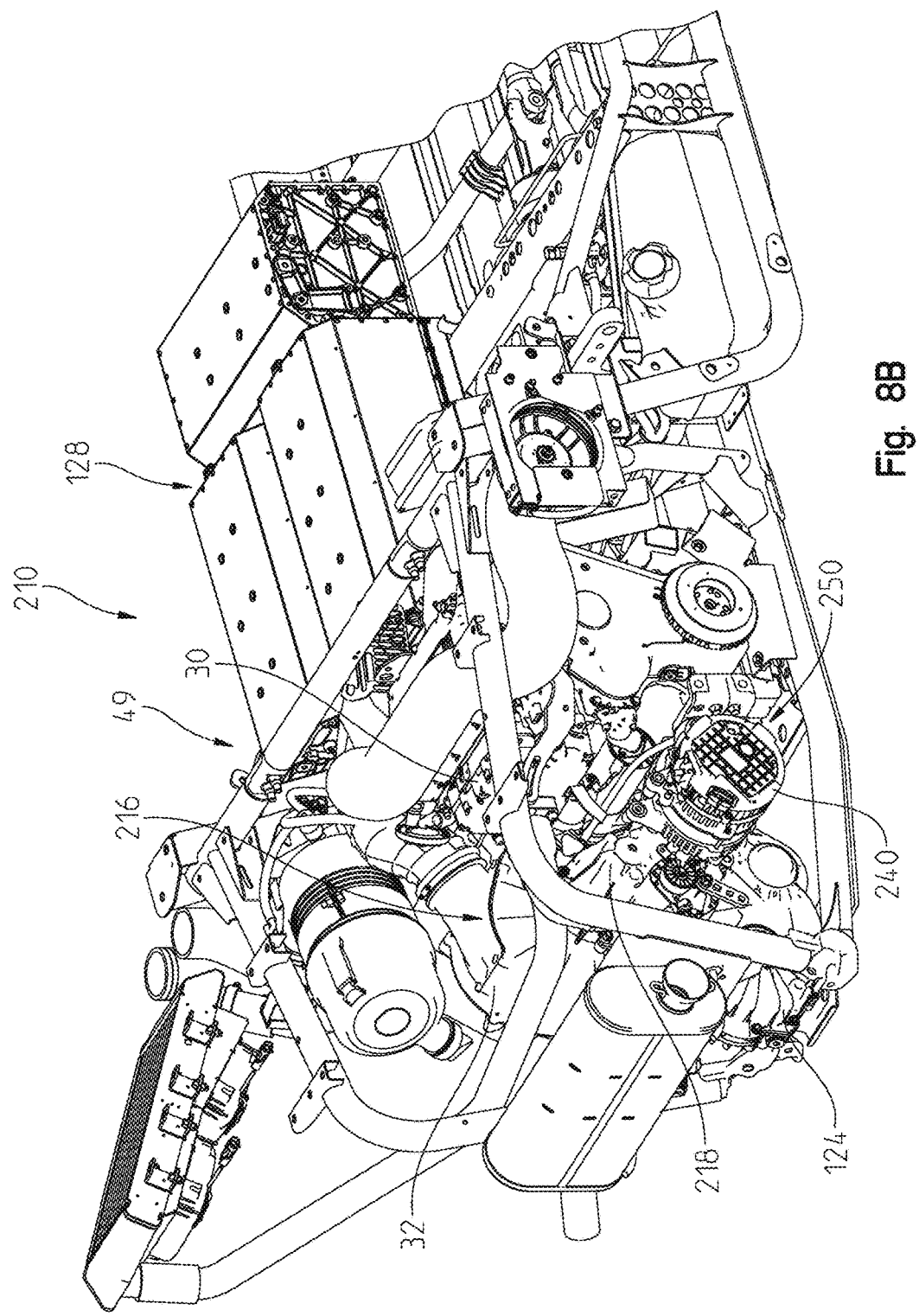
FIG. 8B is a rear right perspective view of the powertrain assembly of the first embodiment hybrid utility vehicle.
Figure 9A:
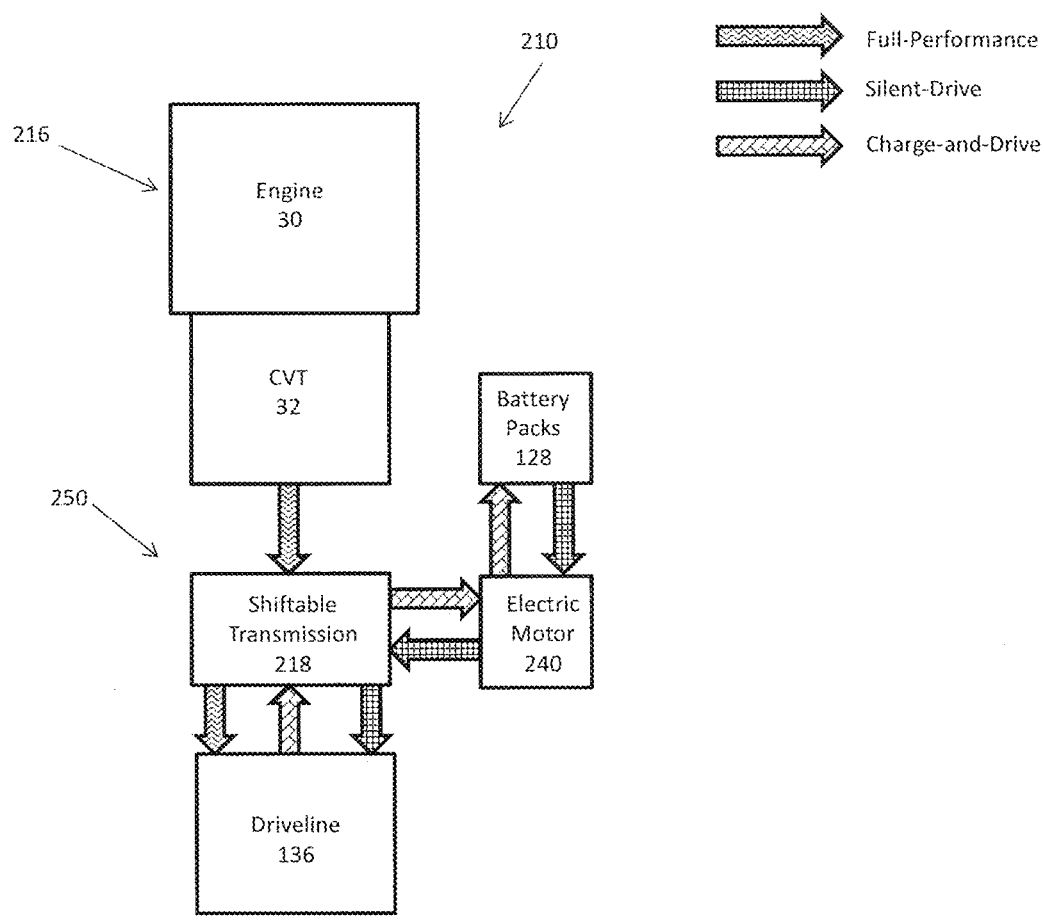
FIG. 9A is a schematic flow chart illustrating the power flow between various components of the hybrid utility vehicle of FIG. 8A in various drive modes.
Figure 9B:
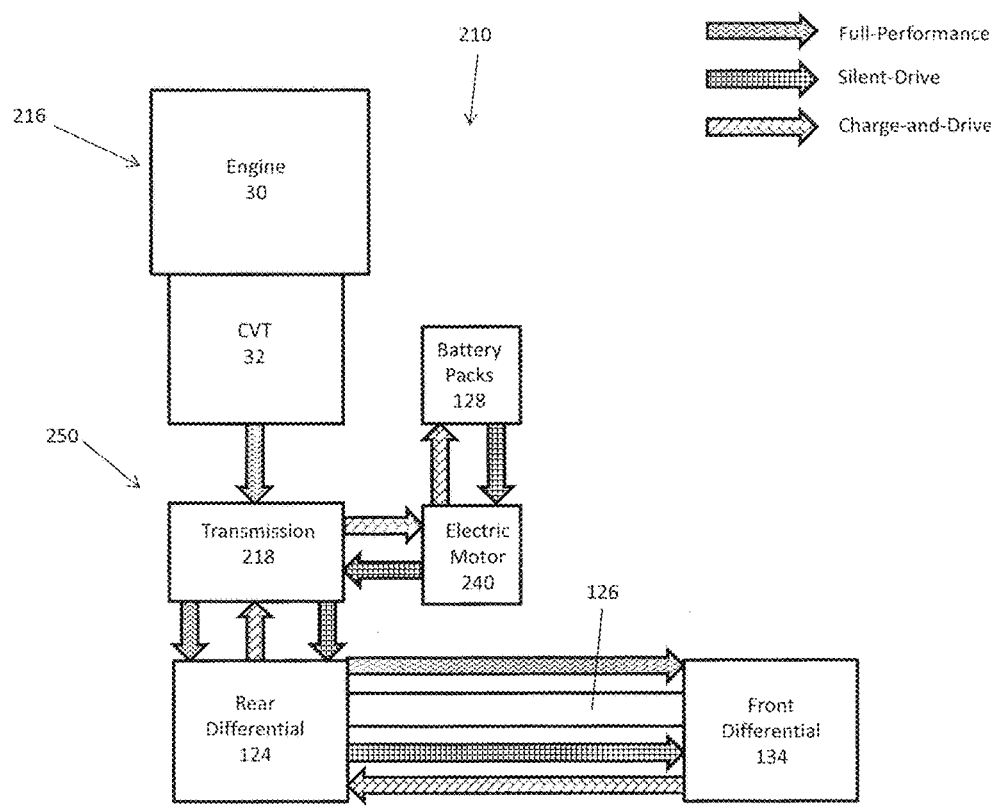
FIG. 9B is a further schematic flow chart illustrating the power flow between various components of the hybrid utility vehicle of FIG. 8A in various drive modes.

Referring now to FIGS. 8A and 8B, vehicle 10 is shown as a parallel hybrid utility vehicle 210 with an alternative powertrain assembly 216. More particularly, vehicle 210 is a non-charge at rest parallel hybrid utility vehicle. Unlike powertrain assembly 116 (FIGS. 2A and 2B), powertrain assembly 216 includes engine 30, CVT 32, and a transmission 218, which may be a shiftable transmission or gearbox. Additionally, unlike electrical system 150 of FIG. 2B, electrical system 250 of vehicle 210 does not include motor/generator 120 or traction motor 122 (FIG. 2B). Instead of motor/generator 120 and traction motor 122, electrical system 250 includes an electric motor 240 operably coupled to an input (not shown) on transmission 218. Because motor/ generator 120 is not provided on vehicle 210, powertrain assembly 216 is not configured for the Charge at Rest drive mode or any battery charging from engine 30. Rather, vehicle 210 is always mechanically driven by engine 30, CVT 32, and transmission 218. However, when in particular drive modes or applications, vehicle 210 may be driven electrically for a limited period of time. In this way, vehicle 210 may be considered a low or mild hybrid vehicle which is primarily mechanically driven by engine 30, CVT 32, and transmission 218 but can be driven electrically by battery packs 128 and motor 240 for a short duration. In one embodiment, motor 240 may include or be operably coupled to an inverter.

Referring to FIGS. 9-12, vehicle 210 is a parallel hybrid vehicle configured with three drive modes: (1) Full-Performance; (2) Silent-Drive; and (3) Charge-and-Drive. As shown in FIG. 9A, power may be provided to any component of driveline 136, including rear differential 124, front differential 134, prop shaft 136, and/or any other component of driveline 136. Illustratively, as shown in FIG. 9B, power may be provided specifically to rear differential 124 which then transmits power to front differential 134 through prop shaft 126.

Figure 10:
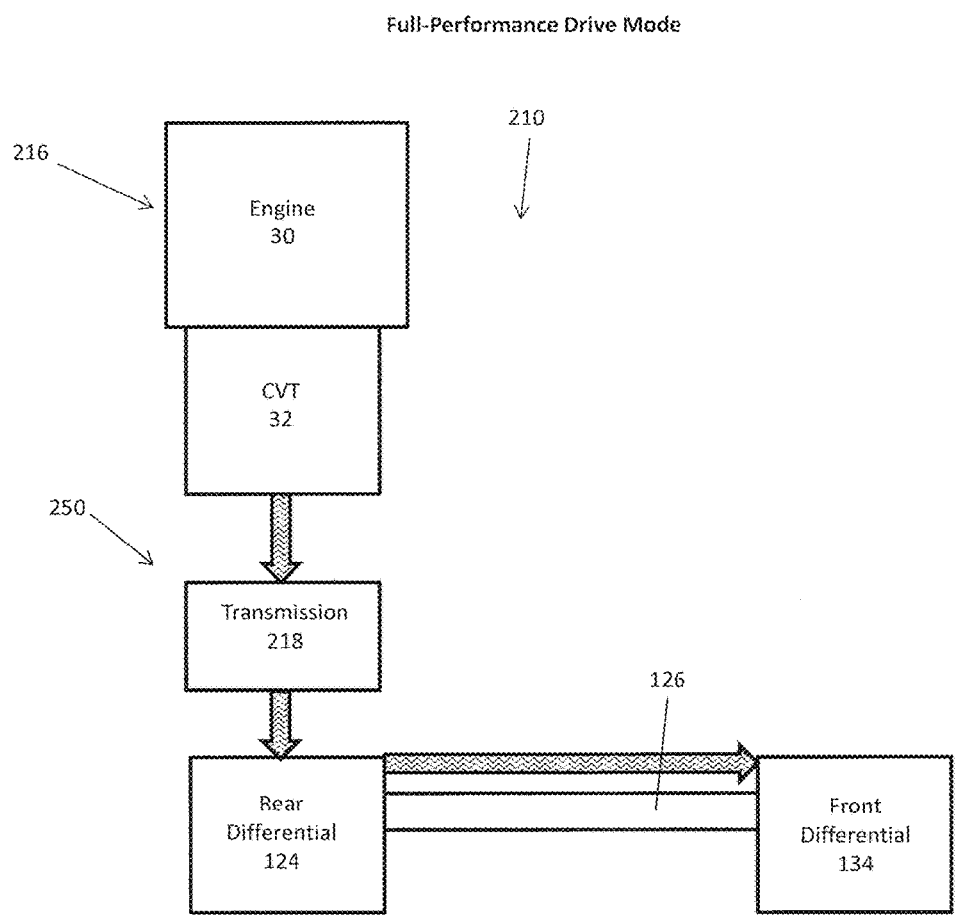
FIG. 10 is a schematic flow chart illustrating a "Full-Performance" drive mode of FIG. 9A.

As shown in FIG. 10, when vehicle 210 is operating in the Full-Performance drive mode, engine 30 drives CVT 32 which then provides a power input to transmission 218. Transmission 218 then transmits power to rear differential 124 to drive rear ground engaging members 14 and transmits power to front differential 134 through prop shaft 126 to drive front ground engaging members 12.

Figure 11:
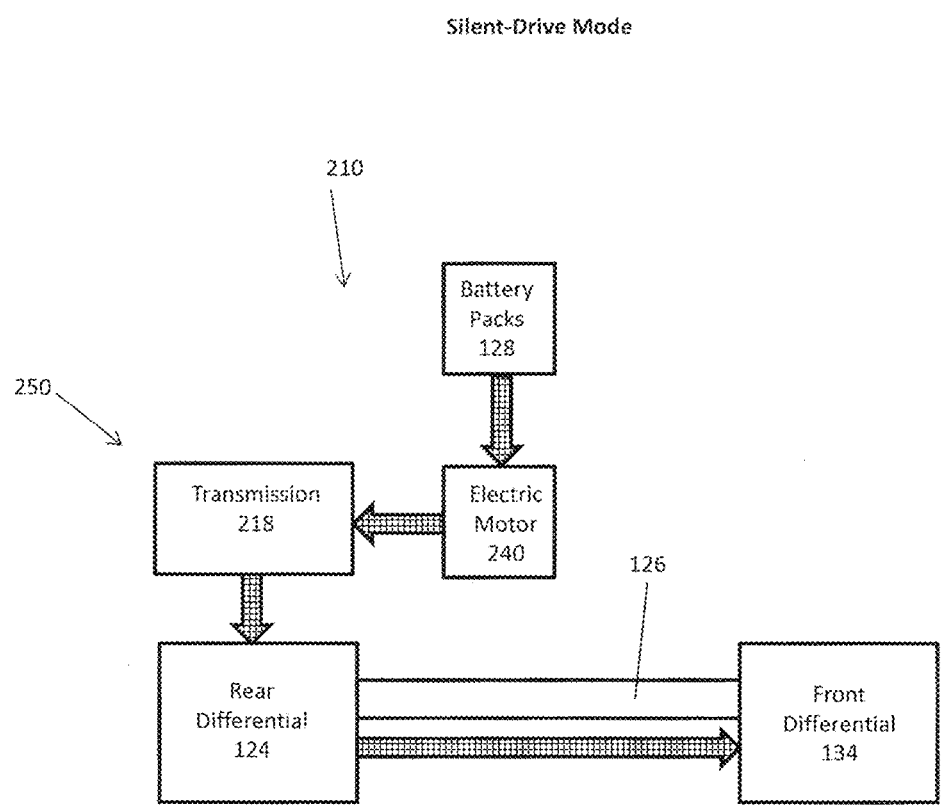
FIG. 11 is a schematic flow chart illustrating a "Silent-Drive" mode of FIG. 9A.

However, as shown in FIG. 11, when vehicle 110 is operating in the Silent-Drive mode, only battery packs 128 provide power to rear differential 124 and prop shaft 126 to drive front and rear ground engaging members 12, 14. In this way, neither engine 30 nor CVT 32 provides a power input to driveline 136. As such, engine 30 may not operate in the Silent-Drive mode which decreases the noise produced by vehicle 210 and may allow vehicle 210 to operate in low-noise environments or when vehicle 210 is utilized for a stealth-type application.

Figure 12:
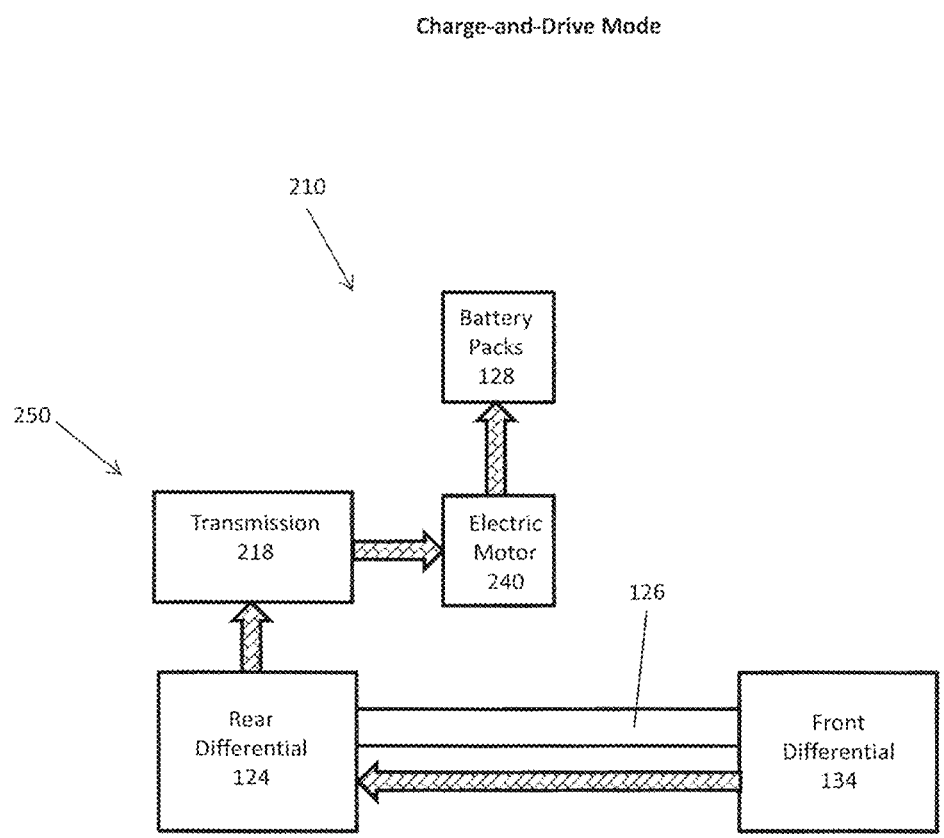
FIG. 12 is a schematic flow chart illustrating a "Charge-and-Drive" mode of FIG. 9A.

Referring to FIG. 12, when vehicle 210 is operating in the Charge-and-Drive mode, engine 30 and CVT 32 supply power to the input on transmission 218 which then provides a power input to driveline 136 to drive front and rear ground engaging members 12, 14. Additionally, when in the Charge-and-Drive mode, vehicle 210 is configured for regenerative braking which allows battery packs 128 to be charged when vehicle 210 is decelerating and braking. More particularly, front differential 134 is configured to provide a power input to rear differential 124 through prop shaft 126. The power supplied to rear differential 124 from front differential 134 is then transmitted to the input on transmission 218 and provided to motor 240 for charging battery packs 128.

Figure 13:
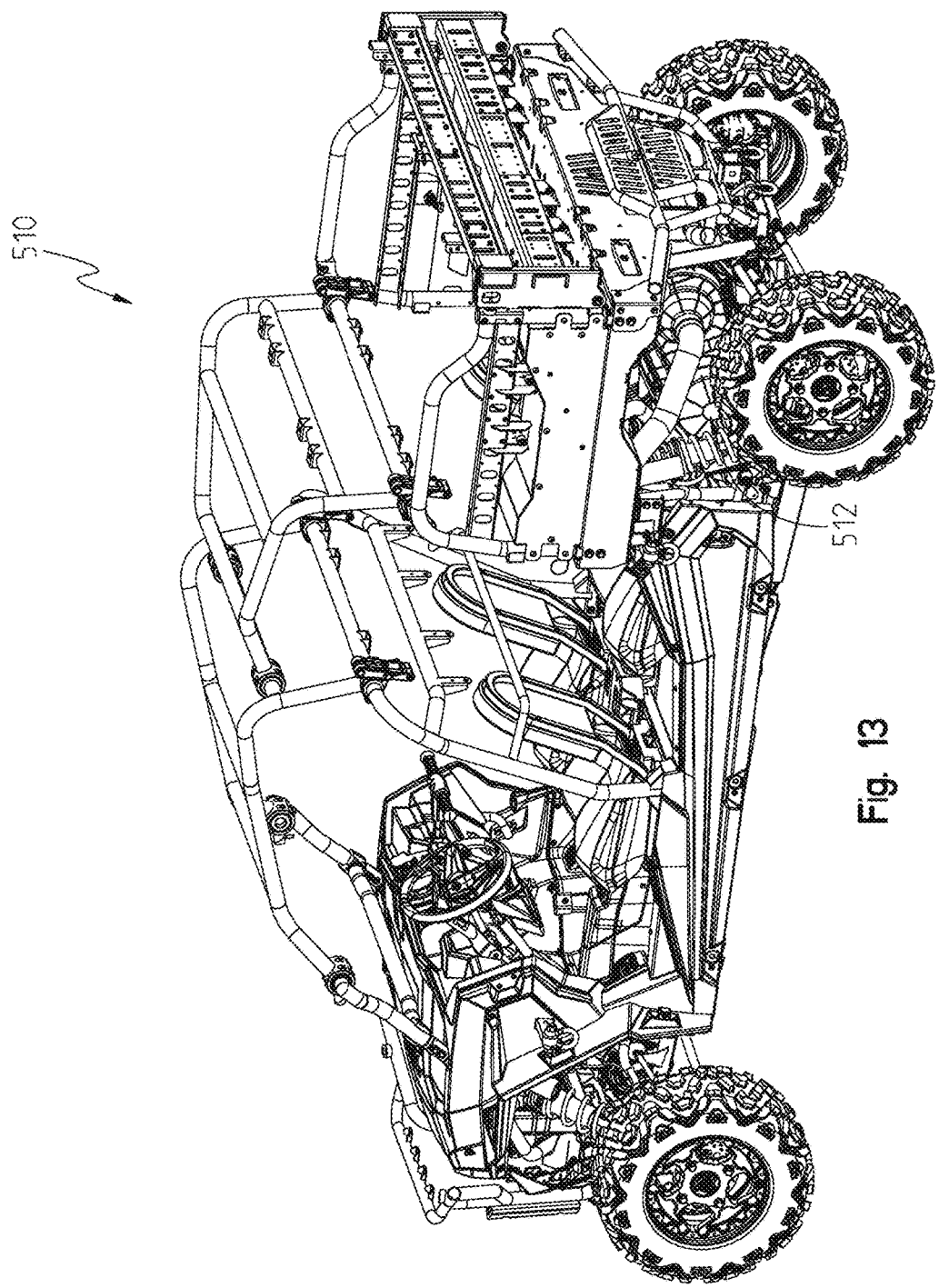
FIG. 13 is a left rear perspective view of the third embodiment of hybrid vehicle of the present disclosure.
Figure 14:
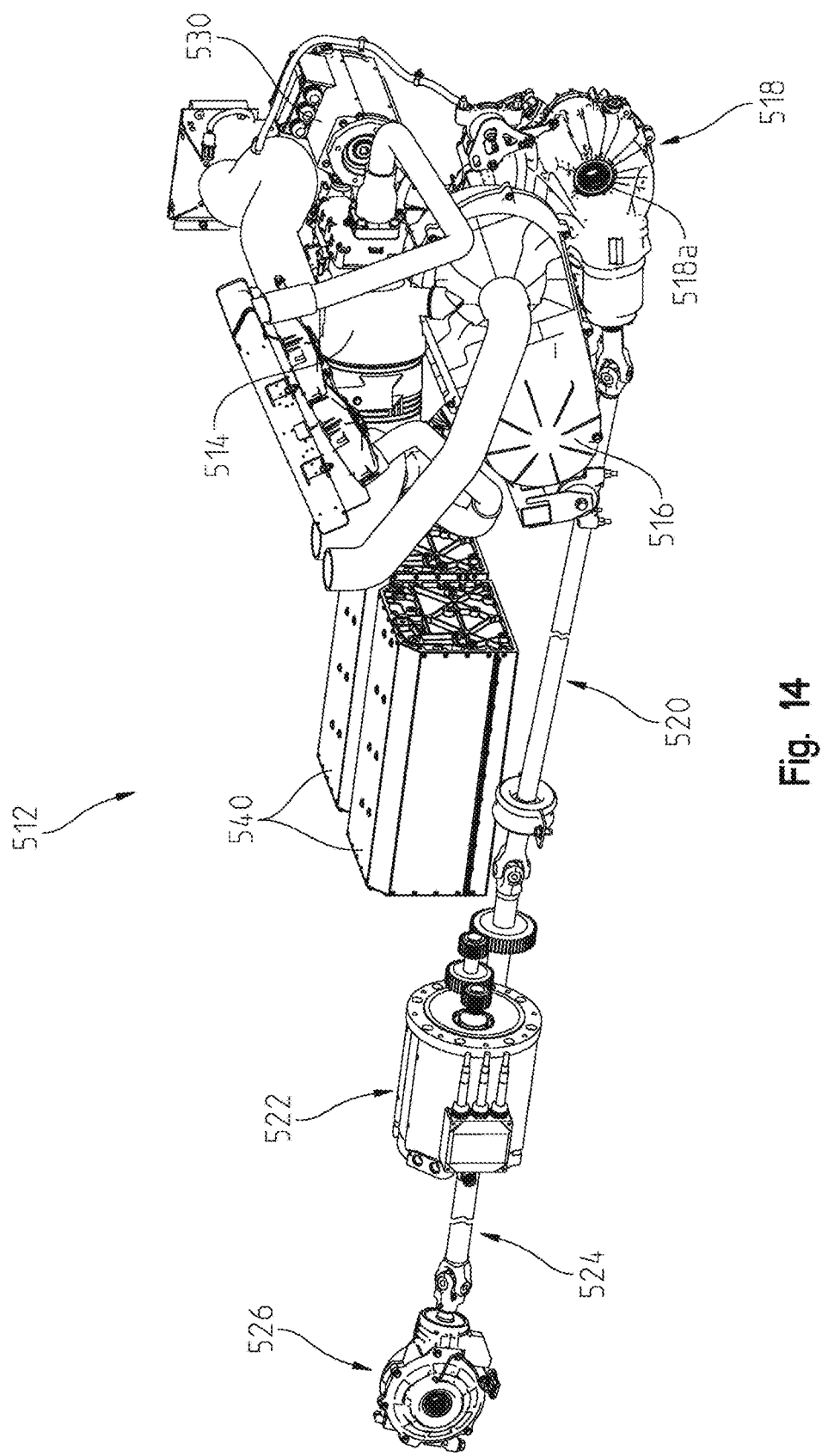
FIG. 14 is a left hand perspective view of the drive train of the embodiment of FIG. 13.

With reference now to FIG. 13, a third embodiment of hybrid vehicle is shown at 510 having a powertrain shown generally at 512. The powertrain is shown in FIG. 14 having an internal combustion engine 514, a continuously variable transmission (CVT) 516 and a transmission 518. It should be understood that the engine 514, CVT 516 and transmission 518 could be substantially similar to that shown in U.S. Pat. No. 8,827,019, the disclosure of which is incorporated herein by reference. In that patent, transmission 518 is driven directly from CVT 516 and transmission 518 is in the form of a transaxle that is a geared transmission coupled to a differential.

Figure 15:
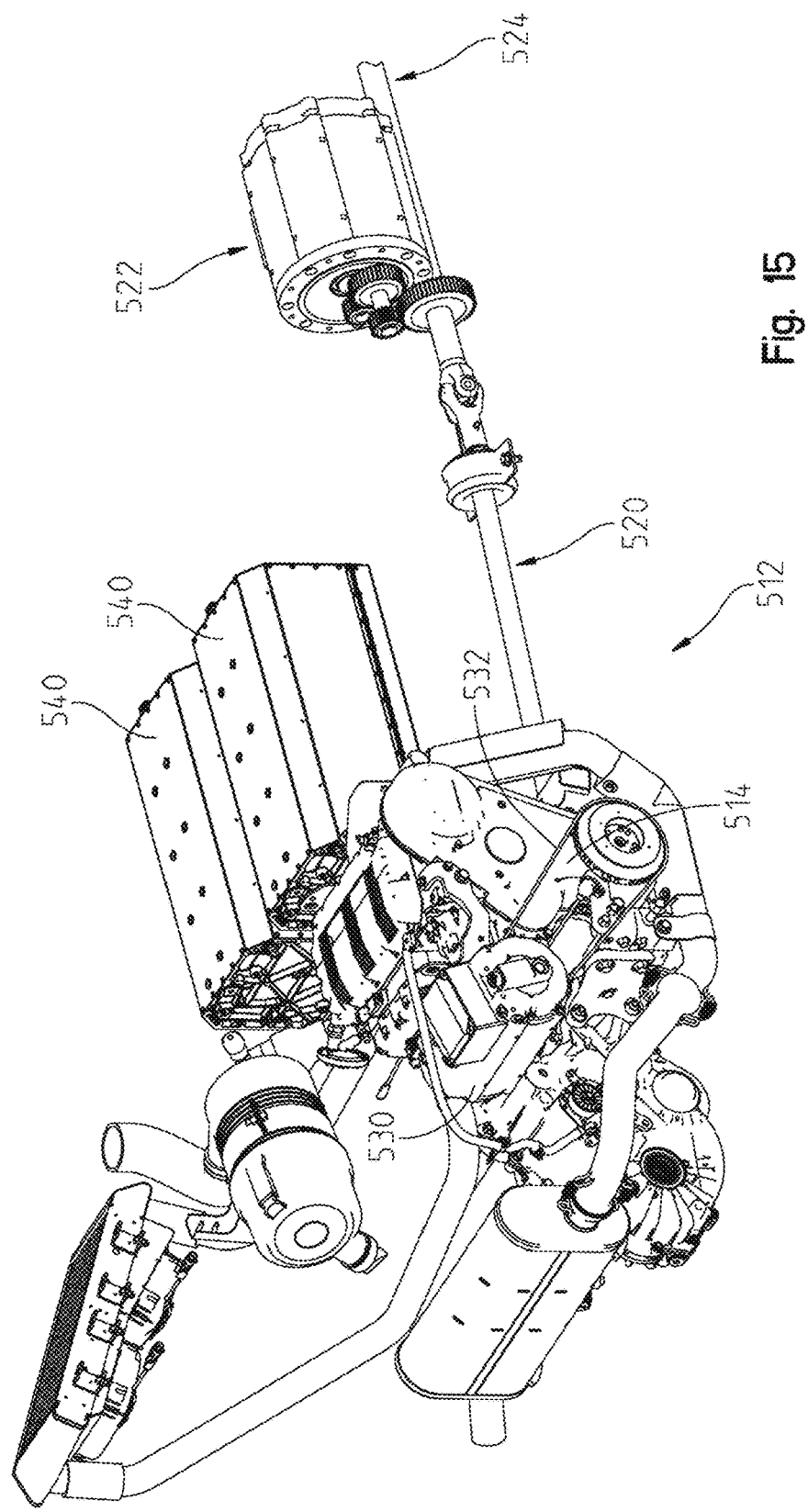
FIG. 15 is a right hand perspective view of the powertrain of FIG. 14.
Figure 16:
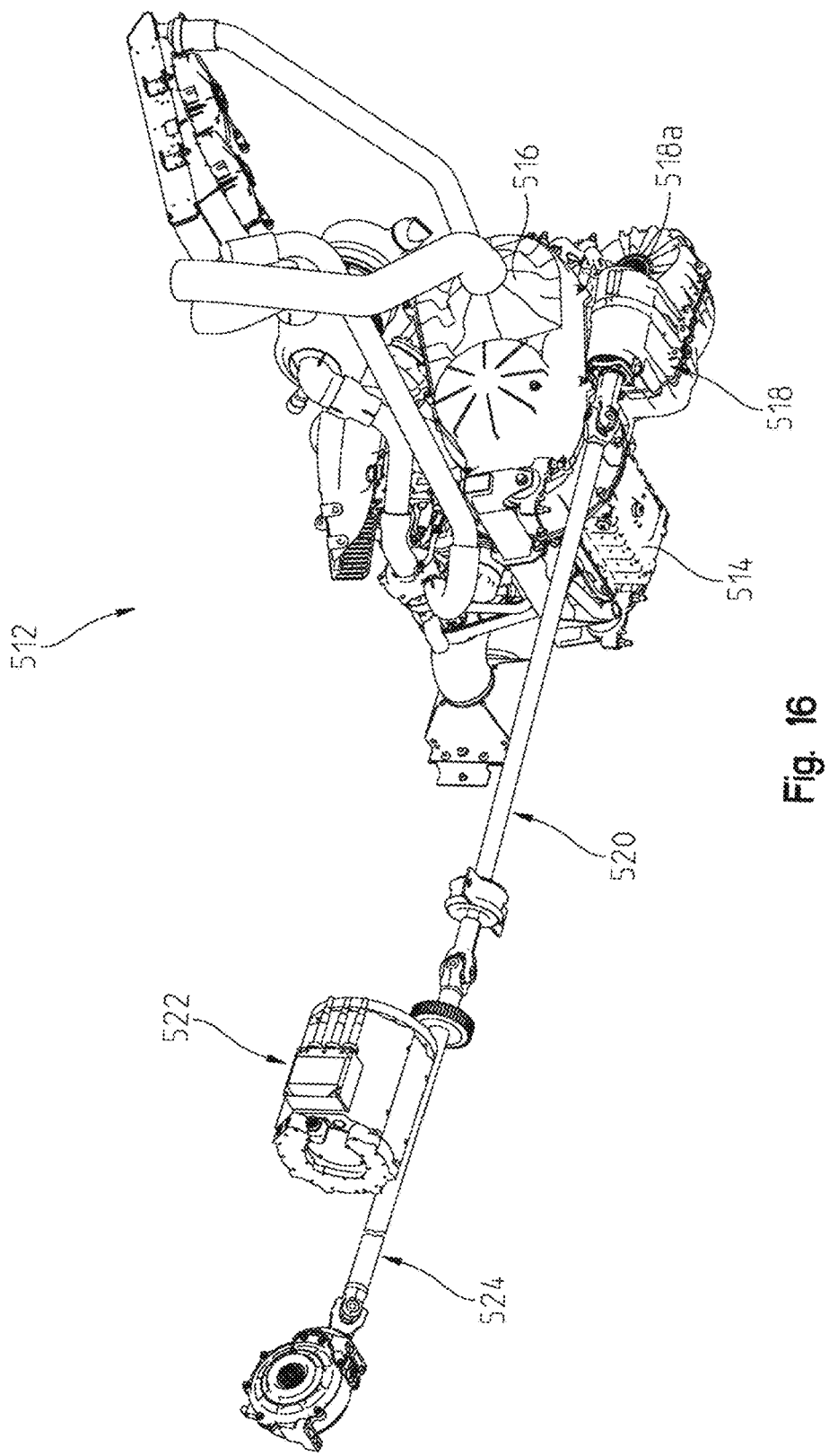
FIG. 16 is an underside perspective view of the powertrain of FIG. 14.

Transmission 518 drives a prop shaft having a first or rear prop shaft portion 520 which couples to a traction motor 522 and a second or front prop shaft portion 524 which drives a front differential 526. Transmission 518 has a rear drive or differential 518a. The differentials 518a, 526 and prop shafts 520, 524 are cumulatively referred to as driveline 528. As shown best in FIG. 15, hybrid powertrain 512 further includes an engine driven generator 530 coupled to engine 518. It should be appreciated that generator 530 could be driven by any known coupling such as gears, belts or chains, however, as shown, generator is belt driven by way of belt 532. Hybrid powertrain further includes one or more battery packs shown at 540 which would be coupled to traction motor 522 to drive the traction motor 522. FIG. 16 shows the manner in which prop shaft portion 520 extends under CVT 516 to couple with traction motor 522.

Figure 17:
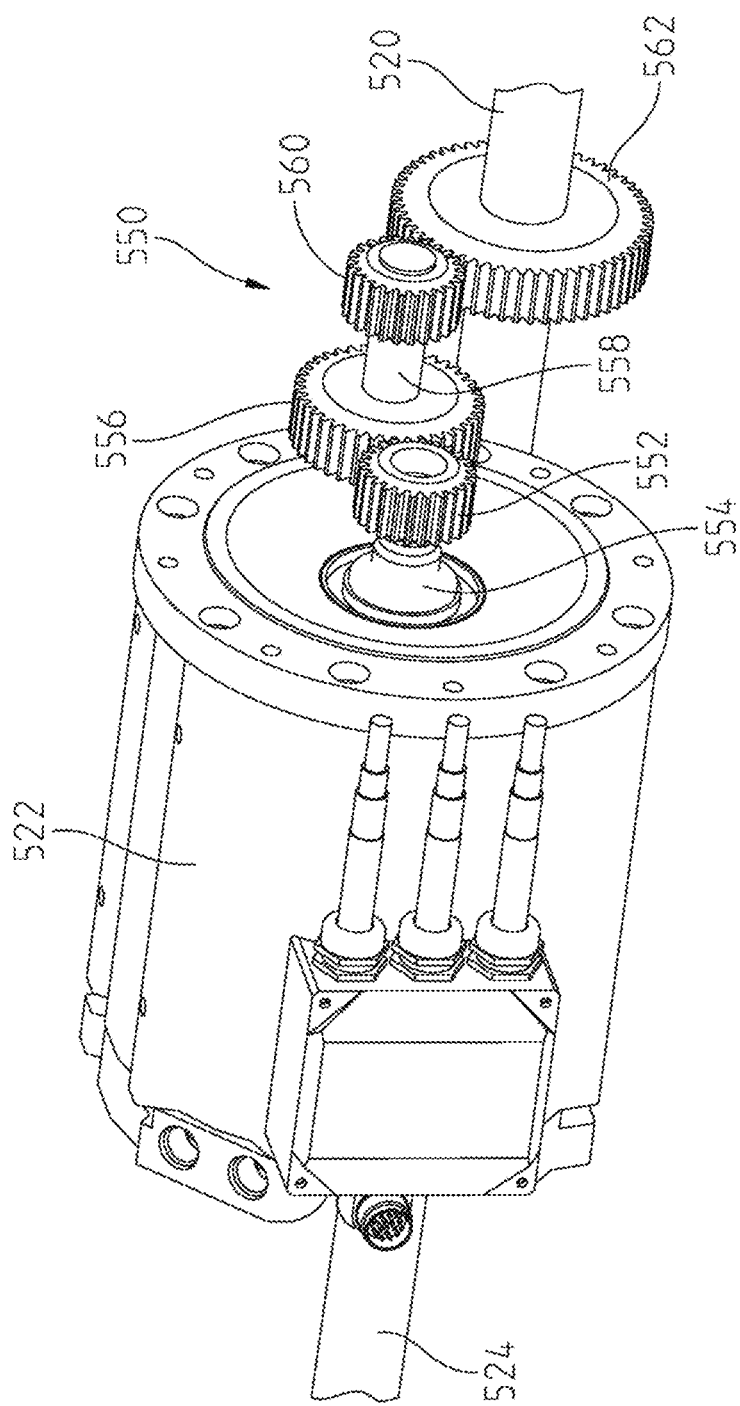
FIG. 17 is a left rear perspective view of the traction motor of the powertrain of FIG. 14.

Referring now to FIG. 17, traction motor 522 is shown coupled to prop shaft portions 520 and 524 by way of a gear train 550. Gear train 550 includes a first output gear 552 coupled to an output shaft 554 of traction motor 522 which in turn is coupled to and meshes with gear 556 which couples with shaft 558 which in turn rotates gear 560. Gear 560 is coupled to drive gear 562 which is directly coupled to prop shaft portions 520 and 524. It should be appreciated that an outer housing is positioned over gear train 550 to enclose the gears and shafts.

It should be understood from the above description that the engine 514 may drive the transmission 518, through CVT 516, which in turn drives prop shaft portions 520 and 522 to drive the front differential 526 powering both the front and rear wheels through transmission 518 and front differential 526. It should also be understood that battery packs 540 may power traction motor 522 which in turn drives prop shafts 520 and 524 to drive transmission 518 and front differential 526. It should also be understood that traction motor 522 is a motor/generator such that when driven in the generator mode, the motor/generator 522 recharges batteries 540. As will be evident from the following description of the various modes, various alternatives and combinations of the engine versus traction motor drives exist.

With reference now to FIG. 18A, the hybrid powertrain 512 is shown schematically with all of the possible various modes of operation and further comprises motor controllers 570 and 572. Four different modes of operation are possible with the hybrid powertrain 512 including a charge-at-rest mode, a charge-and-drive mode, a silent-drive mode and a full-performance mode. Motor controller 570 controls the charging of battery packs 540 from generator 530 in both the charge-at-rest and charge-and-drive modes. Similarly, motor controller 572 controls the charging of battery packs 540 from electric motor/generator 522 in the charge-and-drive mode and controls the operation of traction motor 522 in the silent-drive mode and full-performance mode as described herein. FIG. 18A shows the schematic for the driveline 528 generically, such that the transmission could propel any component of the driveline 528 in order to propel any other of the components of the driveline.

Figure 18B:
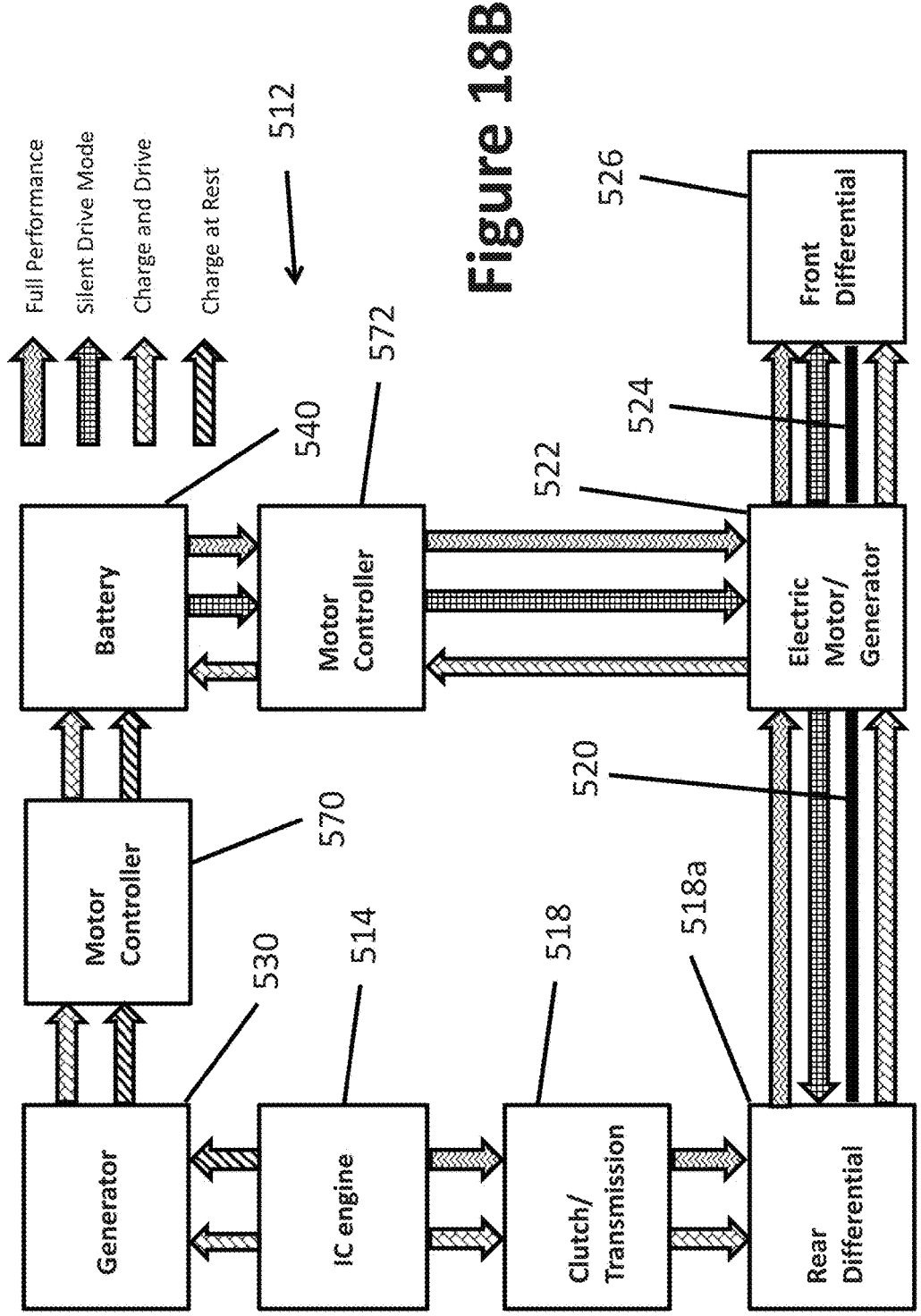
FIG. 18B is a schematic view of the hybrid powertrain of FIG. 14 with the various operating modes.

With reference now to FIG. 18B, the hybrid powertrain 512 is shown schematically with the specific embodiment of FIGS. 14-17. FIG. 18B shows all of the possible various modes of operation and further comprises motor controllers 570 and 572. Four different modes of operation are possible with the hybrid powertrain 512 including a charge-at-rest mode, a charge-and-drive mode, a silent-drive mode and a full-performance mode. Motor controller 570 controls the charging of battery packs 540 from generator 530 in both the charge-at-rest and charge-and-drive modes. Similarly, motor controller 572 controls the charging of battery packs 540 from electric motor/generator 522 in the charge-and-drive mode and controls the operation of traction motor 522 in the silent-drive mode and full-performance mode as described herein. In this schematic, transmission is shown coupled to rear differential 518*a*, which in turn is coupled to motor 522 by way of prop shaft 520. Motor 522 is coupled to front differential by way of prop shaft 524.

Figure 19:
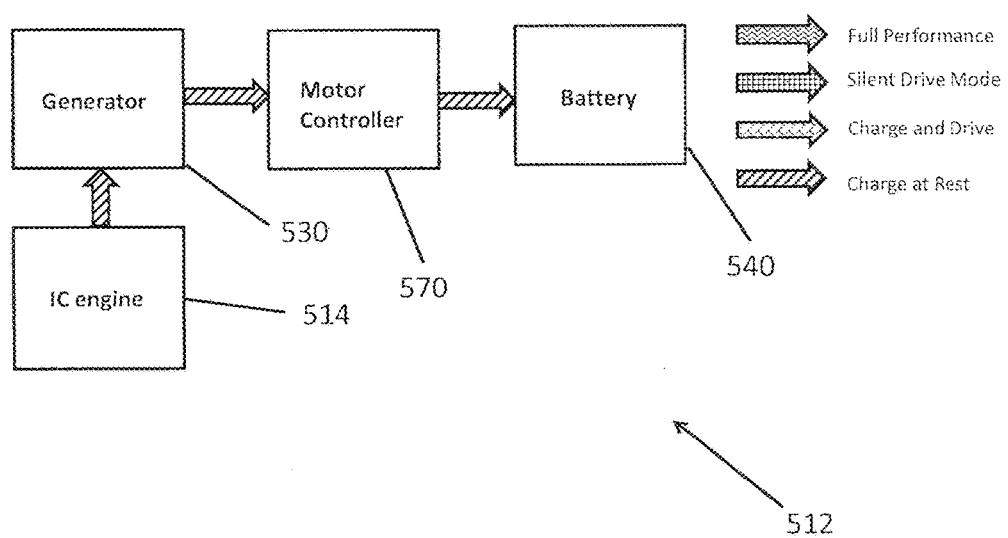
FIG. 19 is a schematic view of the charge at rest mode for the hybrid schematic of FIG. 18.

With reference to FIG. 19, the charge-at-rest mode will be described. The charge-at-rest mode would be the capability of charging the battery packs 540 from engine-driven generator 530 while the vehicle is not moving. Thus, when the vehicle is not driven, the internal combustion engine 514 could be operated for the purpose only of operating generator 530 to recharge the battery packs 540.

Figure 20:
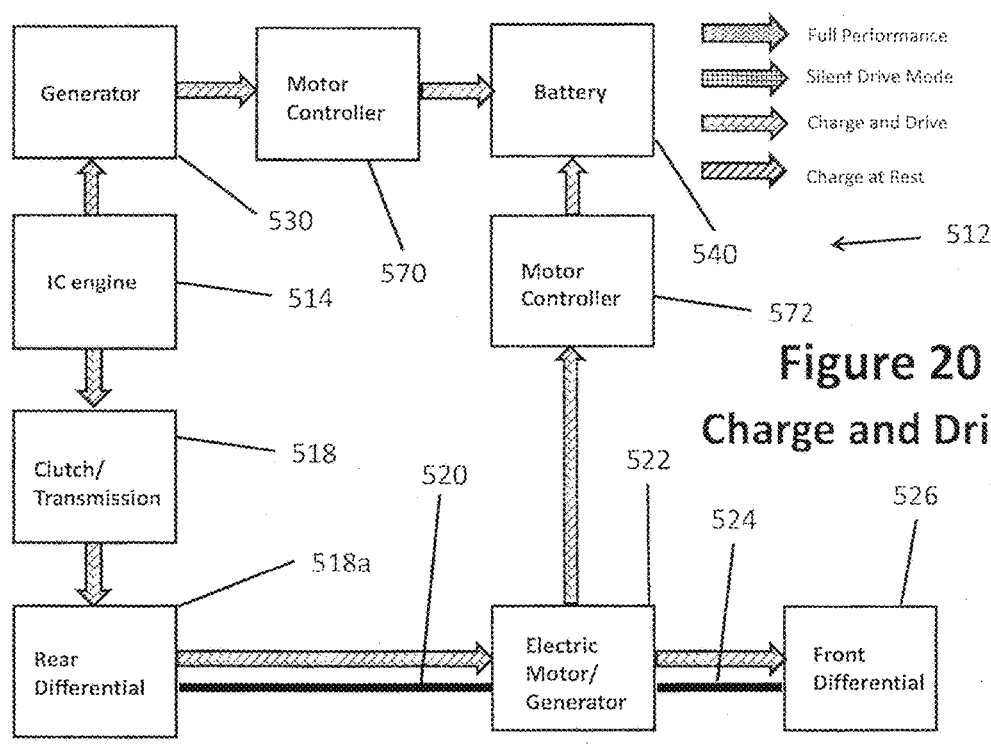
FIG. 20 is a schematic view of the charge and drive mode of the hybrid schematic of FIG. 18.

With reference to FIG. 20, a charge-and-drive mode is shown, where the vehicle is driven by way of the internal combustion engine 514 driving transmission 518 which in turn drives rear differential 518A and front differential 526 through prop shaft portions 520, 524. In this mode, electric motor/generator 522 is operated in the generator mode such that prop shaft portion 520 drives the generator portion of electric motor/generator 522 to charge battery packs 540 through motor controller 572. Generator 530 is also driven by the internal combustion engine 514 and also charges battery packs 540 through motor controller 570.

Figure 21:
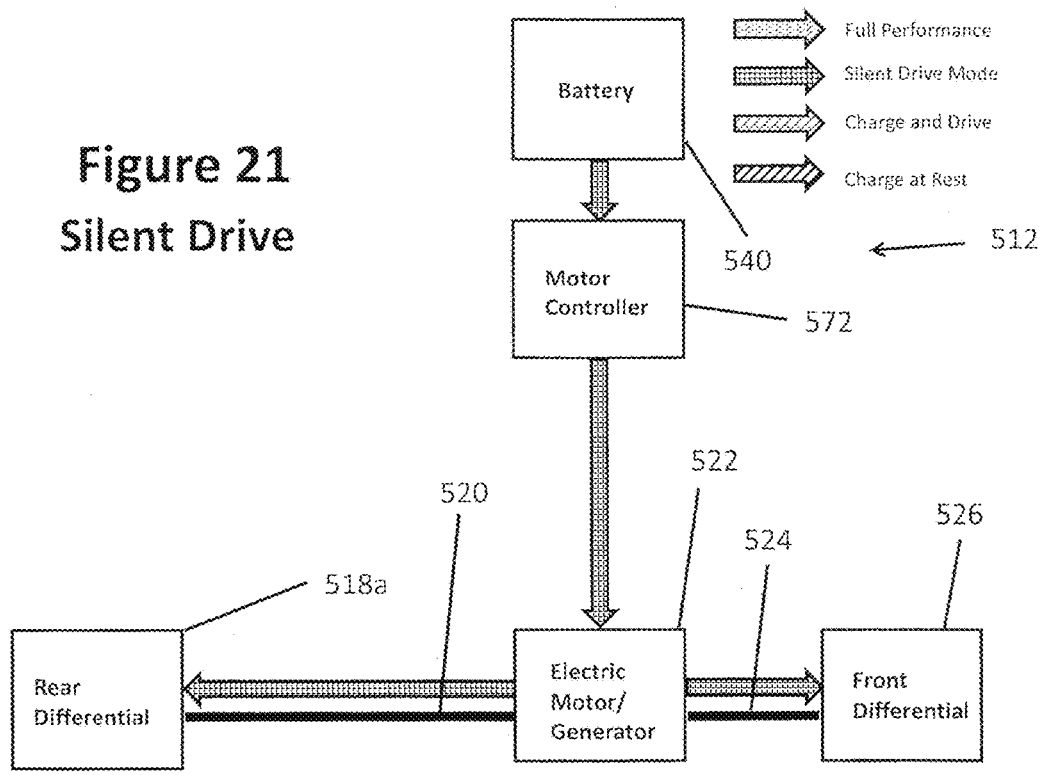
FIG. 21 is a schematic view of the silent drive mode of the hybrid schematic of FIG. 18.

With respect now to FIG. 21, a silent-drive mode is shown which does not utilize the internal combustion engine 514, but rather only drives the traction motor portion of the electric motor generator 522 by way of battery pack 540 through motor controller 572. In this mode, traction motor 522 drives prop shaft portions 520 and 524 to couple differentials 518A and 526 respectively. It should be appreciated that in the silent-drive mode, full all-wheel drive performance is provided just as in the case where the internal combustion engine drives the differentials 518A and 526, however, in the opposite sense.

Figure 22:
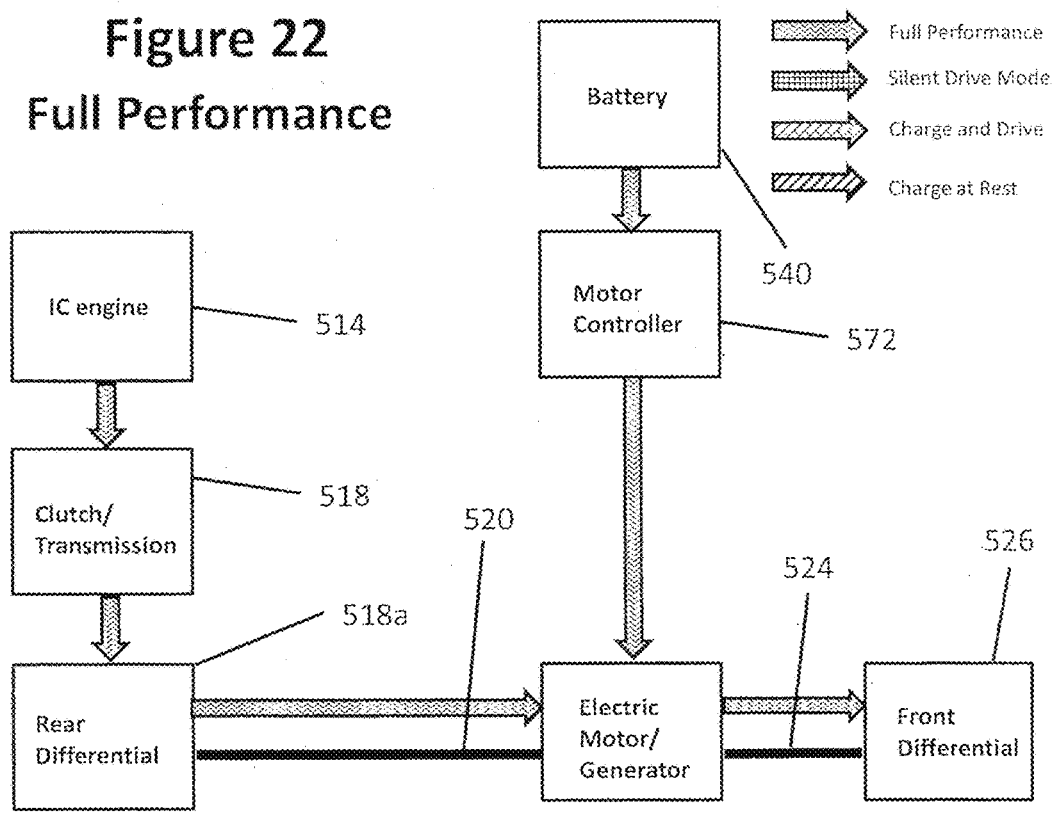
FIG. 22 is a schematic of the full performance mode of the hybrid schematic of FIG. 18.

Finally, as shown in FIG. 22, a full-performance mode is shown where both the internal combustion engine 514 and traction motor 522 provide torque to prop shaft portions 520 and 524 to drive differentials 518A and 526. In this mode, the generator 530 may be electrically disengaged such that no load is placed on internal combustion engine 514 to operate the generator 530. However, in this mode, the internal combustion engine 514 drives transmission 518 in order to add torque to both prop shaft portions 520 and 524. In a like manner, traction motor 522 also adds torque to prop shaft portions 520 and 524 through battery packs 540 controlled through motor controller 572.

Figure 23:
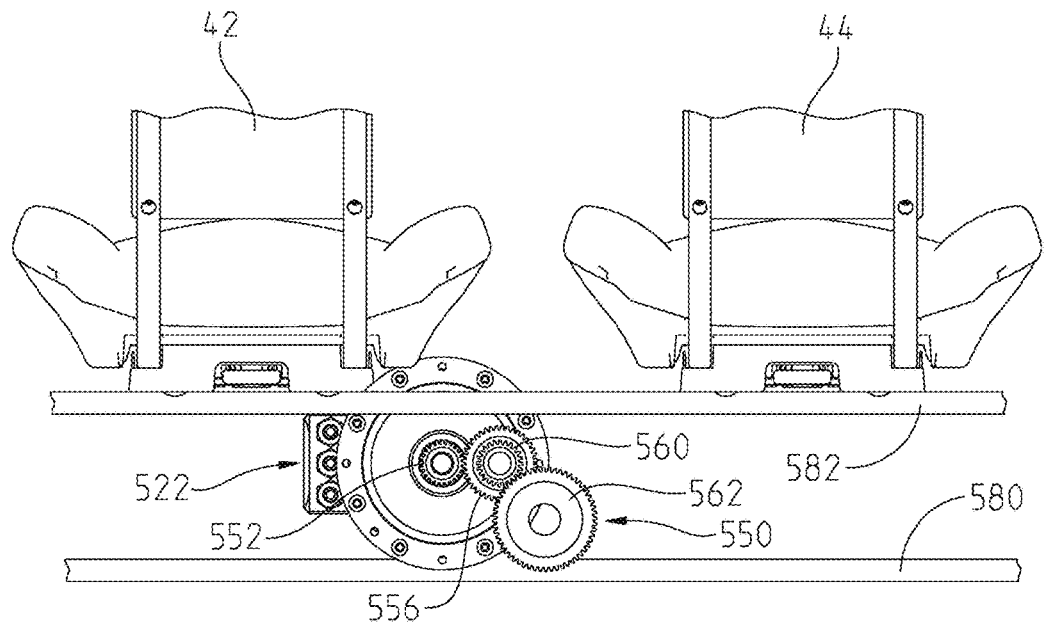
FIG. 23 is a rear view taken behind the seats showing one possible orientation of the traction motor of FIG. 17.
Figure 24:
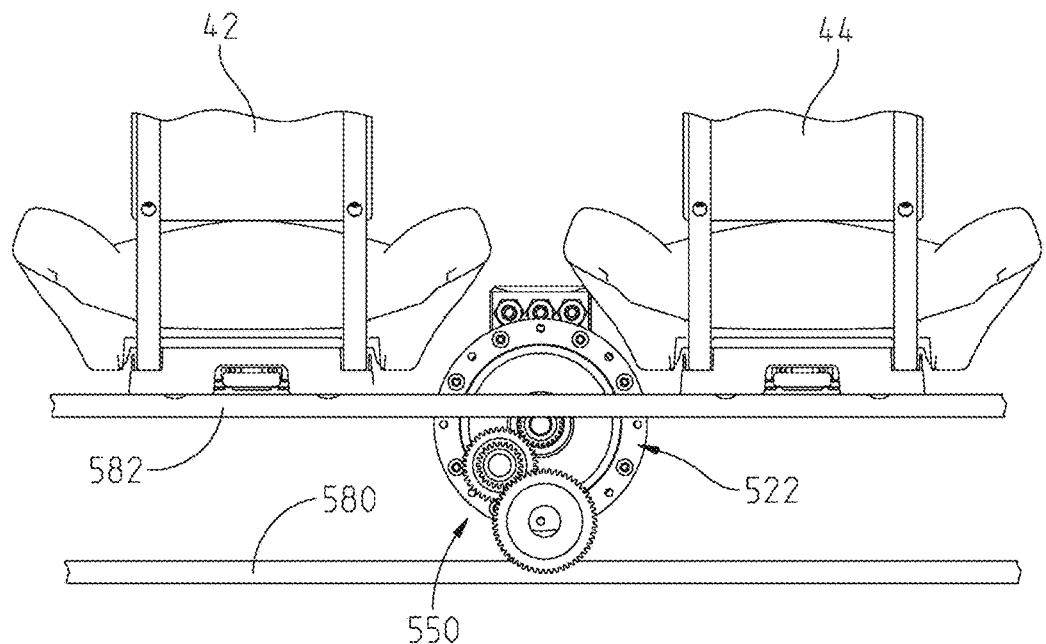
FIG. 24 is another possible orientation for the traction motor of FIG. 17.

With reference now to FIG. 23, one orientation of the traction motor 522 and gear train 550 are shown where traction motor 522 is positioned under seats 42, 44, coupled to frame portion 580 and under seat frame support 582. Alternatively, and with reference to FIG. 24, traction motor 522 and gear train 550 could be coupled to frame portion 580 with the traction motor 522 positioned intermediate seats 42, 44. The embodiment of FIG. 24 provides flexibility if traction motor 522 needs to be enlarged and cannot fit under frame seat support 582.

Figure 25:
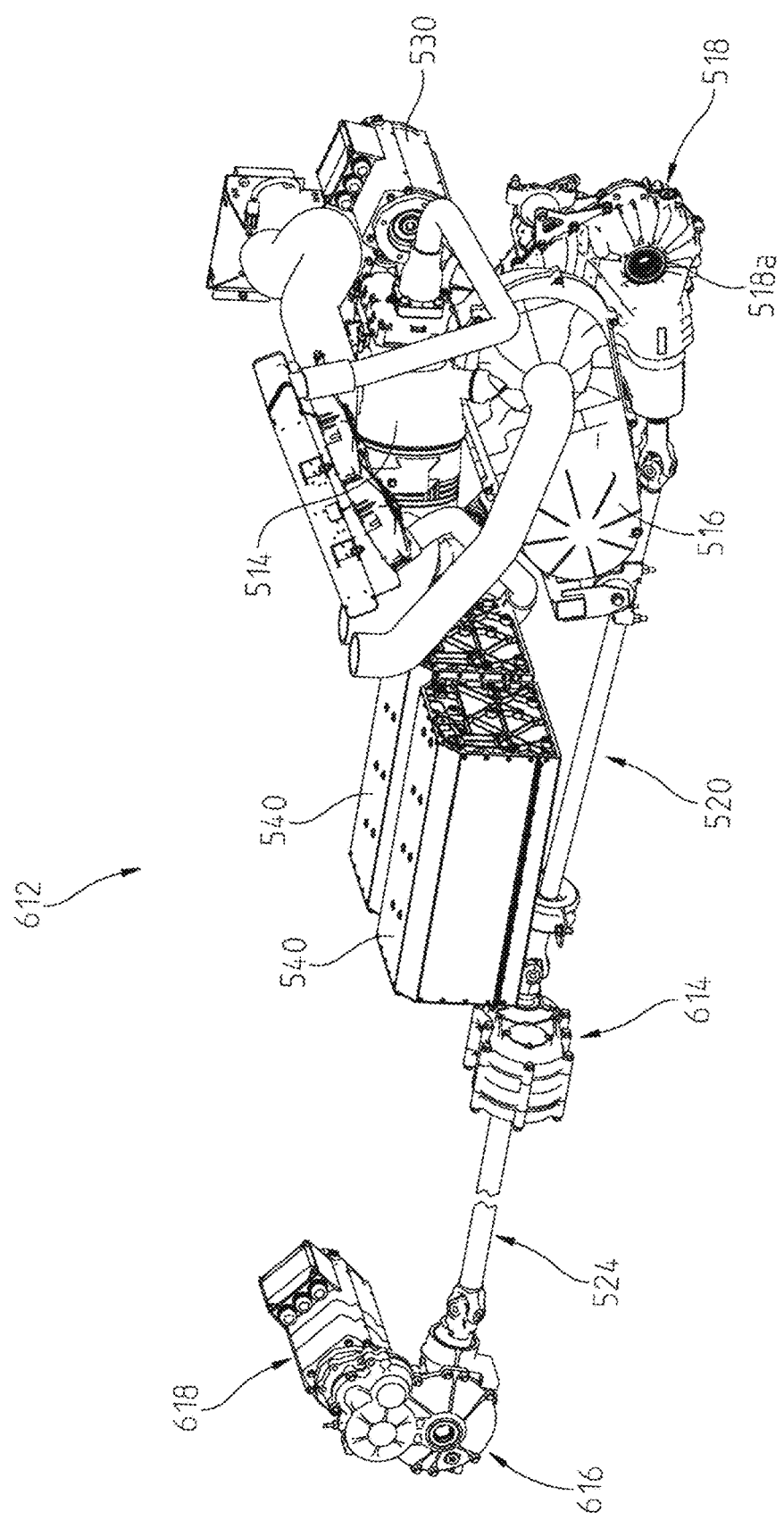
FIG. 25 is a left rear perspective view of the drive train for a fourth possible hybrid embodiment having a front traction motor.

With reference now to FIG. 25, a fourth embodiment of a hybrid powertrain is shown at 612 and is similar to Hybrid powertrain 512 in that it includes an internal combustion engine 514 which drives a CVT 516 which in turn drives transaxle 518 coupled to prop shaft portions 520 and 524. Transaxle 518 has a rear differential portion 518*a*. Hybrid powertrain 612 further includes an engine driven generator at 530 similar to that described above. Battery packs 540 are also positioned in the vehicle for electric drive as disclosed herein. However, in the embodiment of FIG. 25, a bi-directional clutch 614 couples the prop shaft portions 520 and 524 and prop shaft portion 524 is coupled to a front-drive unit 616. In addition, a front traction motor 618 is coupled to the front drive until 616. Transmission 518 has a rear drive or differential 518*a*. The differentials 518*a*, 526 and prop shafts 520, 524 are cumulatively referred to as driveline 628. With the overview as described with reference to FIG. 25, the bi-directional clutch 614 will be described in greater detail with reference to FIGS. 26 and 27.

Figure 26:
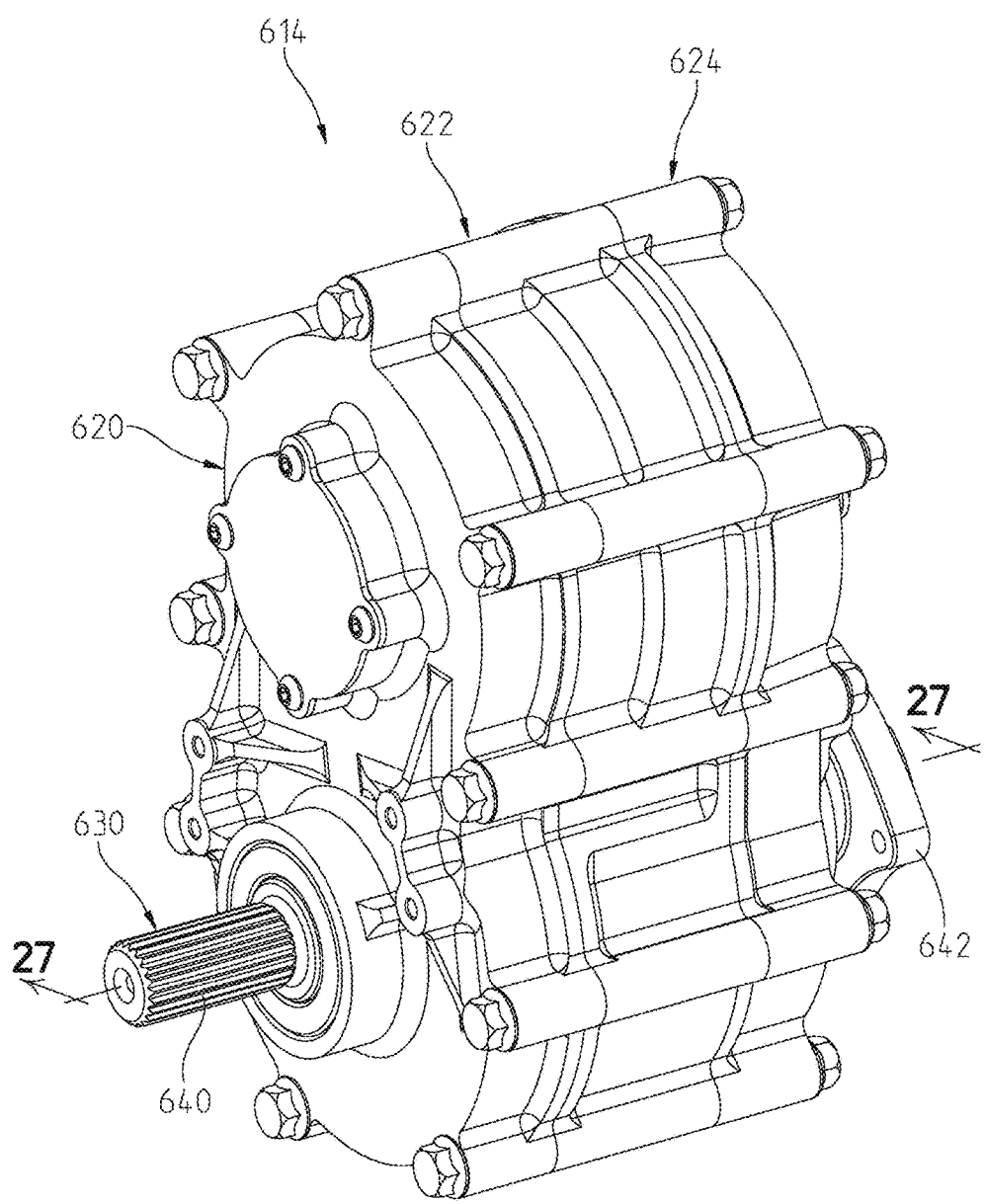
FIG. 26 is a right rear perspective view of a bi-directional clutch for use with the hybrid powertrain of FIG. 25.
Figure 27:
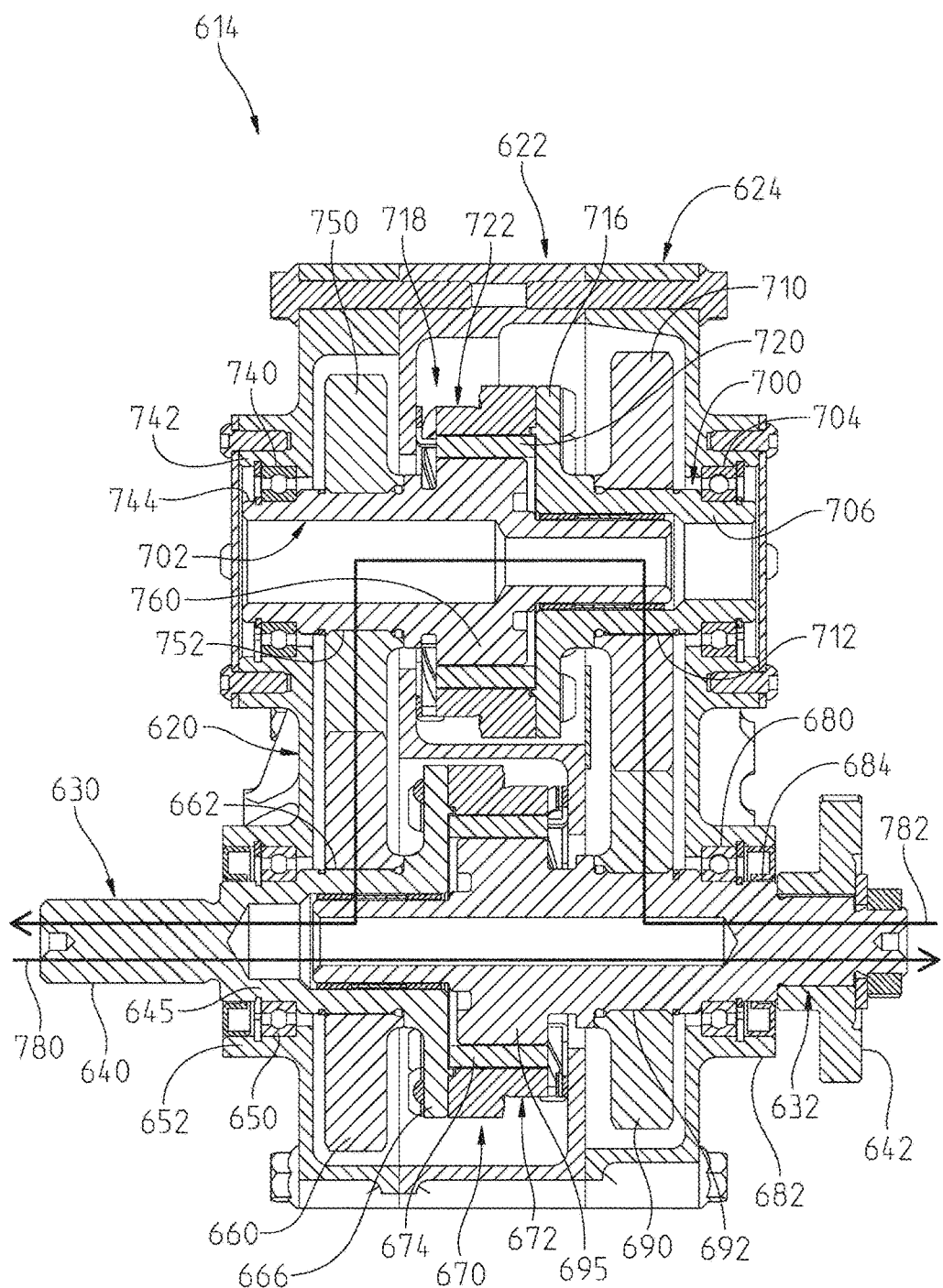
FIG. 27 is a cross-sectional view through lines 3-3 of FIG. 26.
Figure 28:
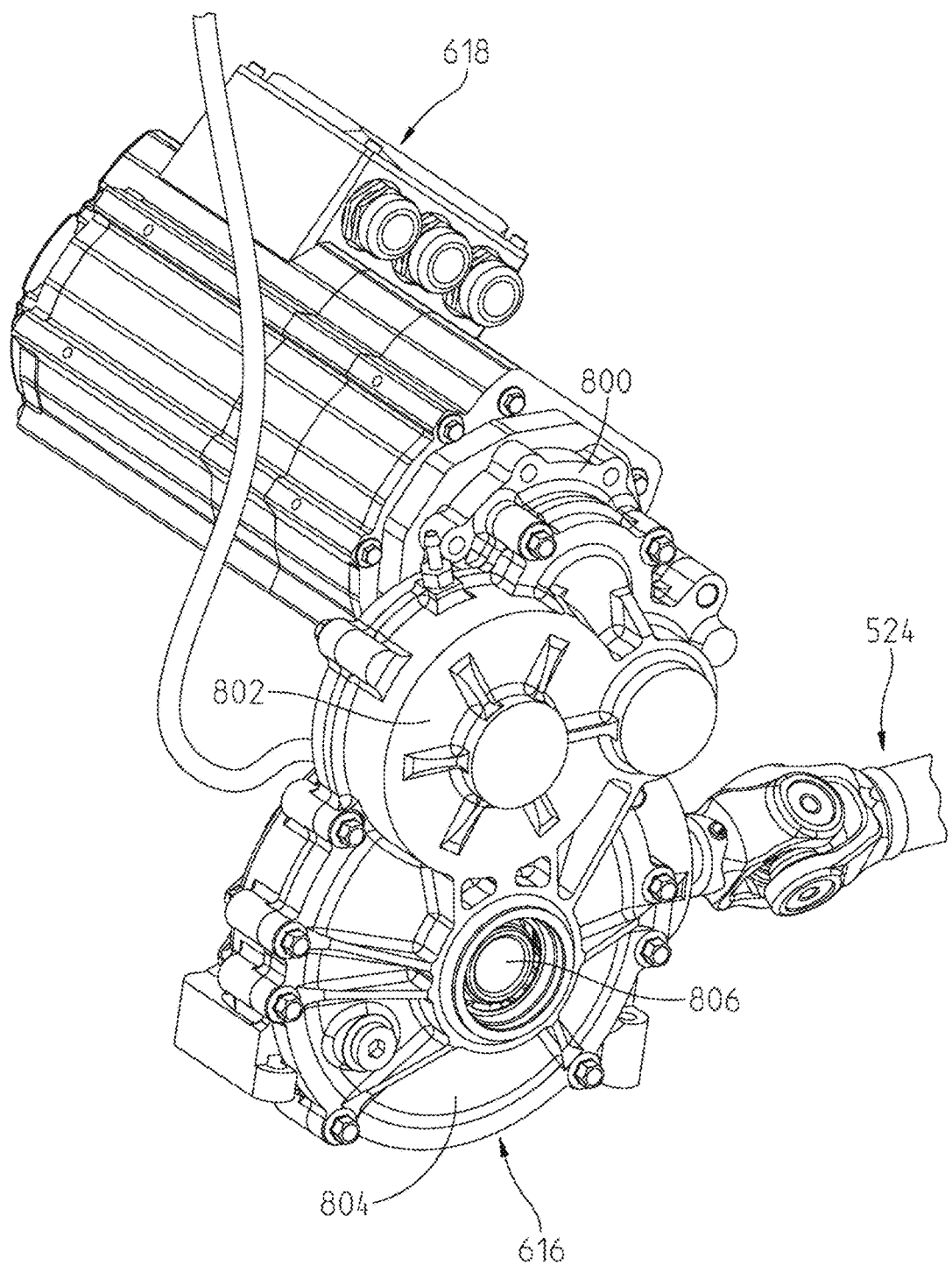
FIG. 28 is a left front view of the front traction motor and front drive for the hybrid powertrain of FIG. 25.
Figure 29:
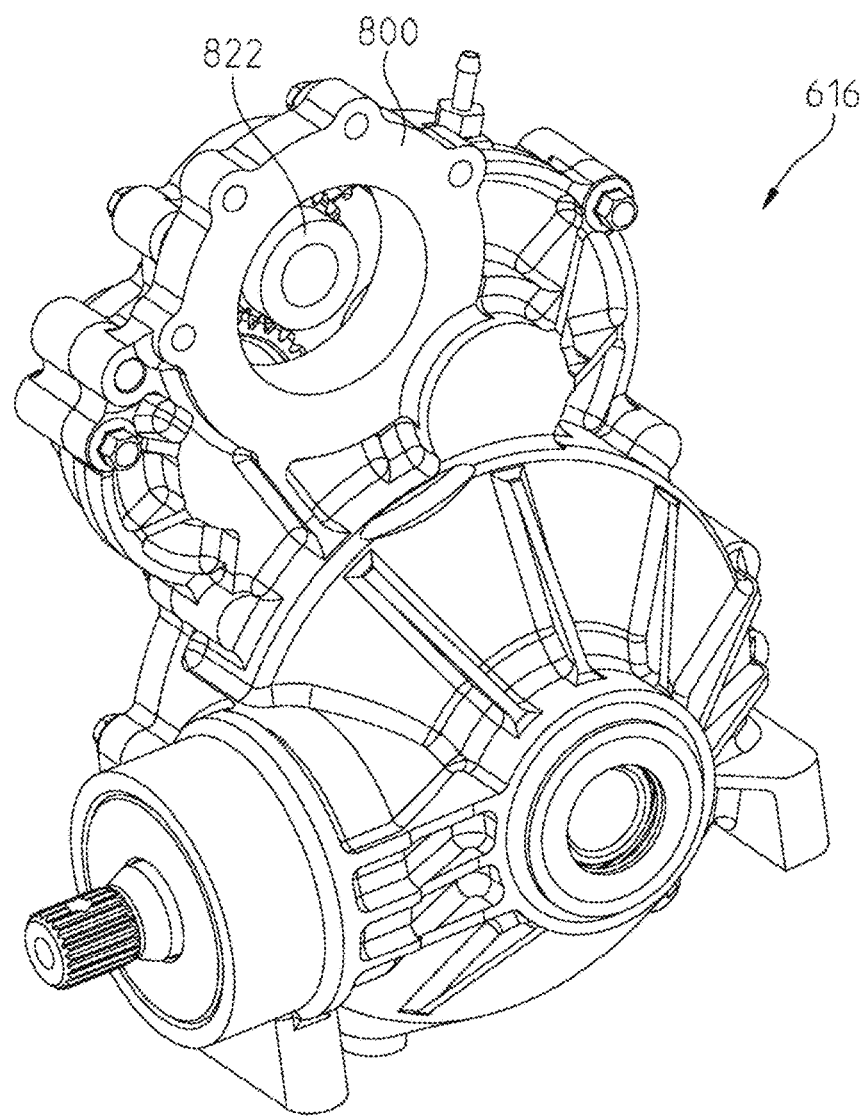
FIG. 29 is a right rear perspective view of the front drive of FIG. 28 less the traction motor.
Figure 30:
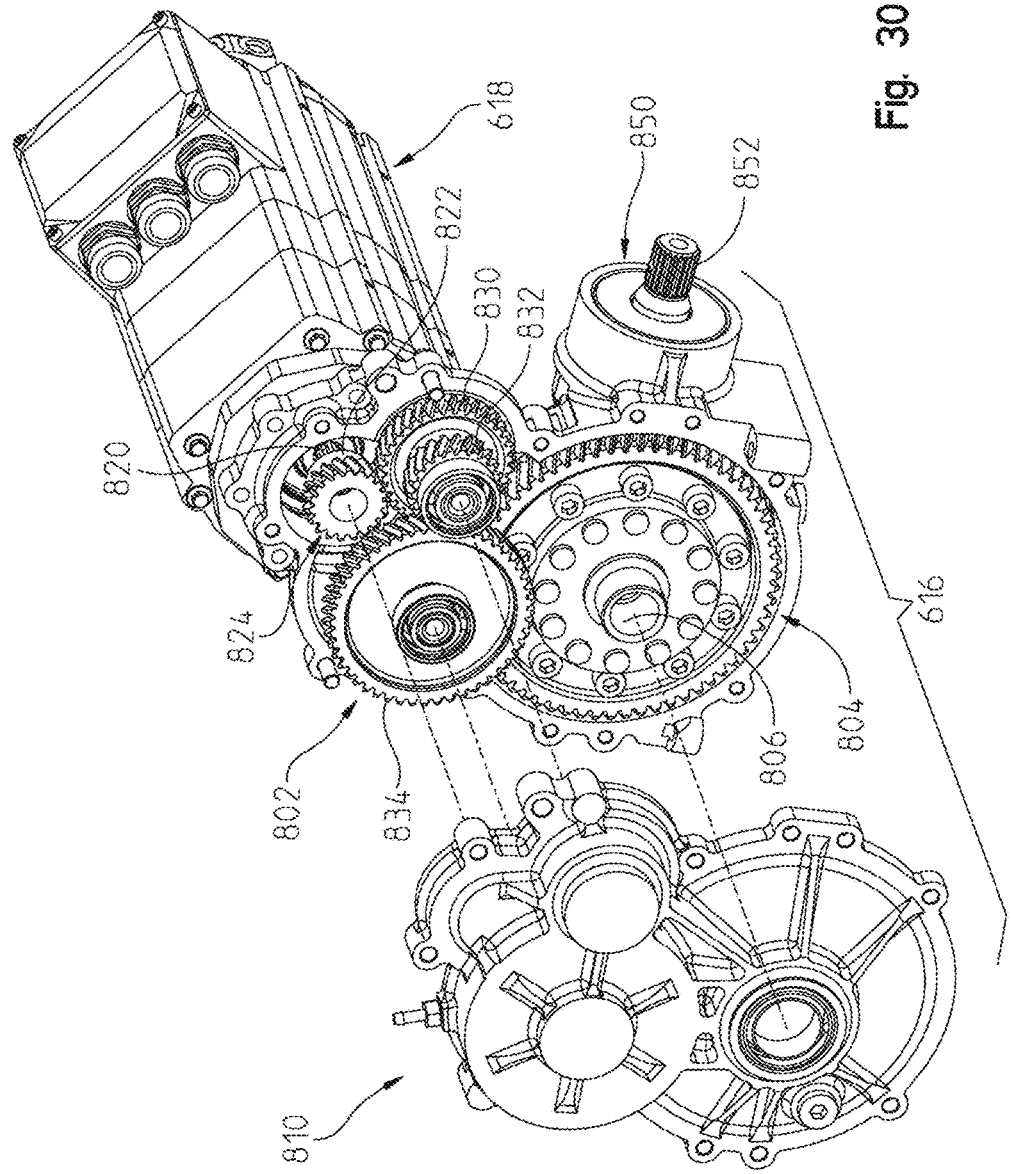
FIG. 30 is a left rear perspective view of the traction motor and front drive of FIG. 28 with the left hand cover exploded away from the front drive.
Figure 31:
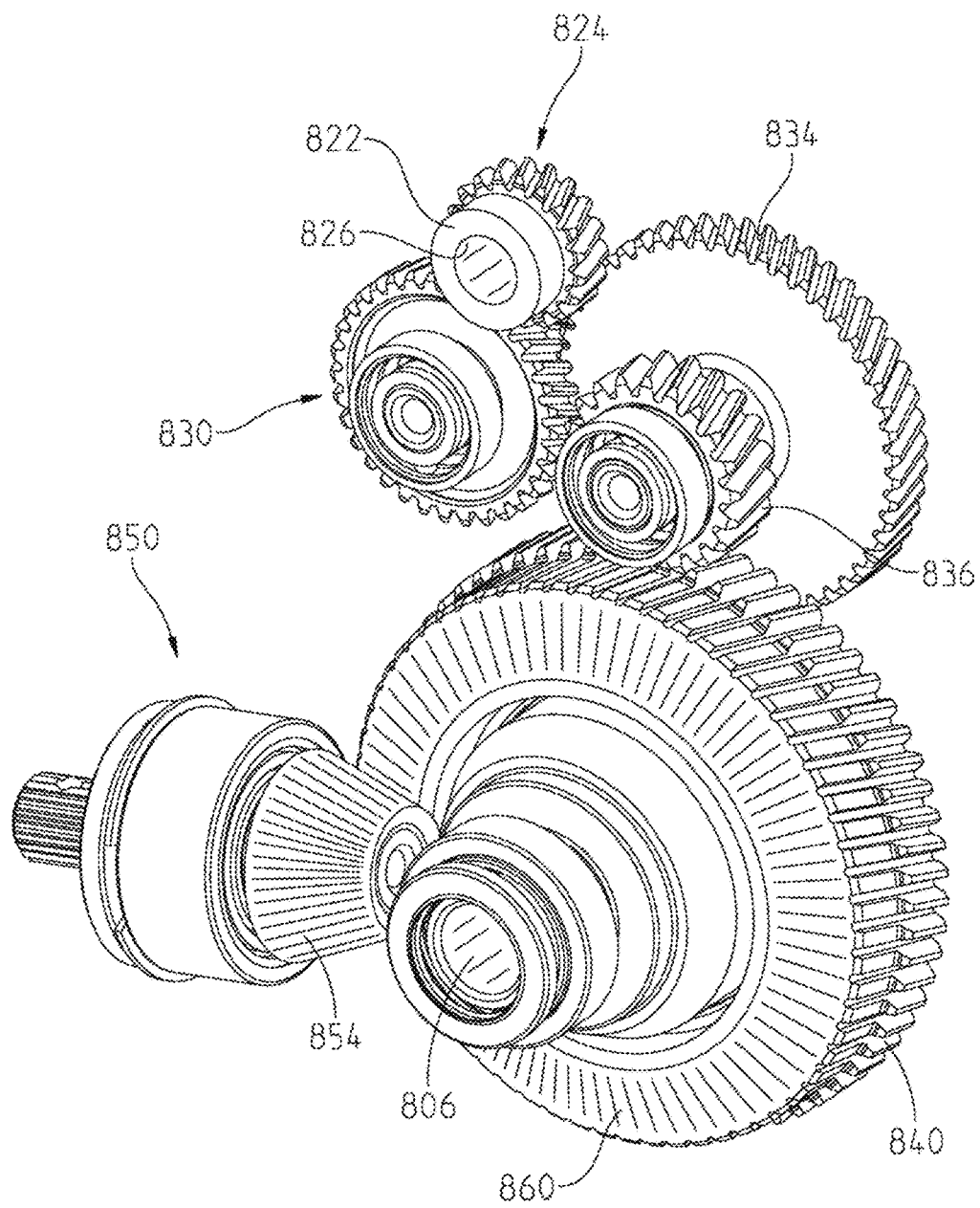
FIG. 31 is a right front perspective view showing the gearing of the front drive of FIG. 28.

With reference first to FIG. 26, bi-directional clutch 614 includes a rear casing portion 620, a center casing portion 622 and a front casing portion 624. Two shafts protrude from the casing; namely a rear shaft 630 protrudes from the rear casing 620 and a front shaft 632 protrudes from the front casing 624 (FIG. 27). These two shafts 630 and 632 are separate from each other and either shaft may operate as the input or output shaft depending upon the direction of drive as described herein. As shown, shaft 630 has a splined shaft portion at 640, whereas shaft 632 includes a flange at 642. Shaft 630 is coupled to rear casing 620 by way of bearings 650 which cooperate with a bearing receiving portion 652 of casing 620 and a raised portion 654 of shaft 630. Shaft 630 further includes a gear 660 positioned on a receiving surface 662 of shaft 630. Shaft 630 further includes a flange 666 which retains thereon a one-way clutch 670. One way clutch 670 includes an outer cage 672 and clutch rollers 674 as described herein.

With reference still to FIG. 27, shaft 632 is coupled to casing 624 by way of bearings 680 which cooperate between bearing receiving portions 682 of casing 624 and an outer surface 684 of shaft 632. A gear 690 is positioned on a surface 692 of shaft 632. Shaft 632 further includes a raised portion 695 which cooperates with rollers 674. It should be appreciated that shaft 630 is coupled to or decoupled from shaft 632 by way of one-way clutch 670 as described herein.

With reference still to FIG. 27, bi-directional clutch further includes a front off-set shaft 700 and a rear off-set shaft 702. Front off-set shaft 700 is coupled to front casing 624 by way of bearings 704 received in bearing receiving portions 706 of casing 624. Shaft 700 includes a gear 710 positioned on a portion 712 of shaft 700. Gear 710 is coupled to and meshes with gear 690 as described herein. Shaft 700 further includes a flange 716 which retains a one-way clutch 718 having clutch rollers 720 and an outer cage 722. Rear off-set shaft 702 is coupled to casing 620 by way of bearings 740 positioned in receiving portion 742 of casing 620 and received on a surface 744 of shaft 702. Gear 750 is positioned on a surface 752 of shaft 702 and is coupled to and meshes with gear 660. Shaft 702 includes an enlarged portion at 760 which cooperates with rollers 720 of one-way clutch 718. It should also be appreciated that one-way clutches 670 and 718 operate in the opposite sense, that is, when one is locked, the other is unlocked and vice versa. One way clutches 670, 718 may operate in the manner described in the U.S. Pat. No. 5,036,939. With reference still to FIG. 27, the operation of the bi-directional clutch will now be described.

As mentioned above, input torque may be received to either of splined shaft 640 or flange 642. If torque is received to the splined shaft 640, the power transmission is shown through the bi-directional clutch by way of arrow 780. That is, if input torque is received through the splined shaft 640, one-way clutch 670 locks together shafts 630 and 632 such that input torque to shaft 630 provides a direct output torque to shaft 632. Meanwhile, in the case where input torque is received directly to shaft 630, one-way clutch 718 is disengaged, such that no torque is being transmitted through off-set shafts 700 and 702. However, in the case where input torque is received to flange 642 to shaft 632, one-way clutch 670 is disengaged and one-way clutch 718 is engaged such that the power transmission is shown by arrow 782. That is, input torque to flange 642 provides a direct coupling between gears 690 and 710, and due to the engagement of the one-way clutch 718, shafts 700 and 702 are directly coupled, which in turn couples gears 750 and 660. In this case, gear 660 transmits torque to shaft 630 such that the power distribution is from the front to the back.

With reference now to FIGS. 28-31, the traction motor 618 and front drive unit 616 will be described in greater detail. As shown best in FIG. 28, traction motor 618 may be coupled directly to a flange 800 (FIG. 29) of front drive 616. Front drive 616 includes a gear train portion 802 and a differential portion 804 having an output drive at 806 to drive the front wheels. As shown best in FIG. 30, an outer casing 810 of the front drive 616 is removed to show the gear train 802 and the differential 804. As shown best in FIG. 30, traction motor 618 includes a shaft 820 which couples with a hub 822 of gear 824. Gear 824 is shown best in FIG. 31 which includes an internal diameter at 826 which would be splined to cooperate with motor shaft 820. As shown best in FIGS. 30 and 31, gear 824 meshes with gear 830 and gear 830 is coupled to a gear 832 (FIG. 30) which in turn drives gear 834. As shown best in FIG. 31, gear 834 has on a rear side thereof a gear 836 which in turn is coupled to differential gear 840. Gear 840 provides the input to the differential drives 806 which in turn drives the front wheels.

As an alternative to the front drive 616 being driven by the traction motor 618, the front drive unit 616 has an input drive at 850 including a splined shaft at 852 which couples to a pinion 854 (FIG. 31) which couples to corresponding teeth on face 860 of gear 840. Thus, as an alternative to being driven by traction motor 618, input torque to spline shaft 852 drives differential gear 840 by way of the meshing of the teeth on gear 854 with the teeth on face 860 of differential gear 840.

Figure 32A:
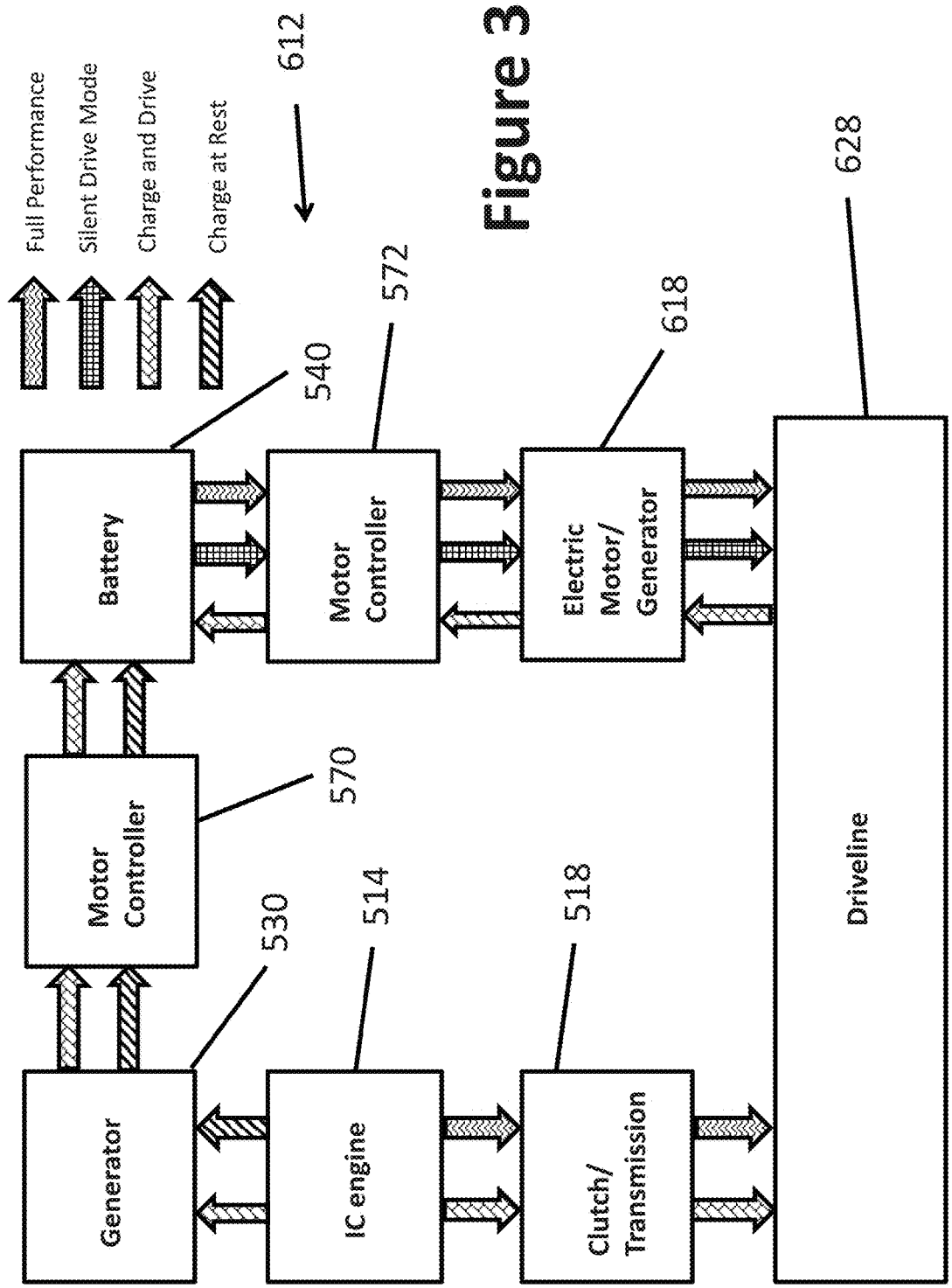
FIG. 32A is a schematic view of the hybrid powertrain of FIG. 25 with the various operating modes with the driveline shown generically.

With reference now to FIG. 32A, the hybrid power train 612 will be described in greater detail. As shown in FIG. 32A, all of the various modes are shown with their association to the front traction motor 618, where the driveline 628 is shown generically.

Figure 33:
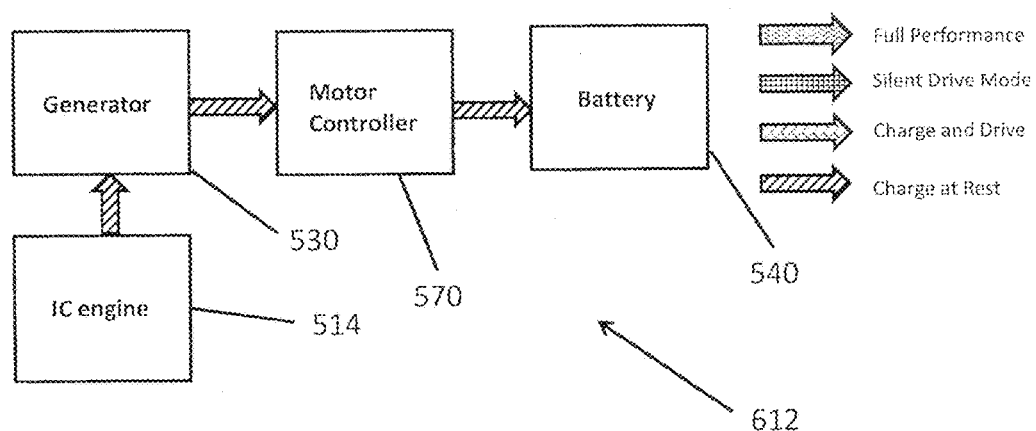
FIG. 33 is a schematic view of the charge at rest mode for the hybrid schematic of FIG. 32.

With reference now to FIG. 32B-36, the hybrid power train 612 will be described in greater detail. As shown in FIG. 32B, all of the various modes are shown with their association to the front traction motor 618, where the transmission is coupled to the rear differential 518*a* and the traction motor 618 is coupled to the front differential 806. As shown in FIG. 33, the charge-at-rest mode is identical to hybrid powertrain 512 where the internal combustion engine operates the generator 530 while the vehicle is at rest to charge battery packs 540 through motor controller 570.

Figure 34:
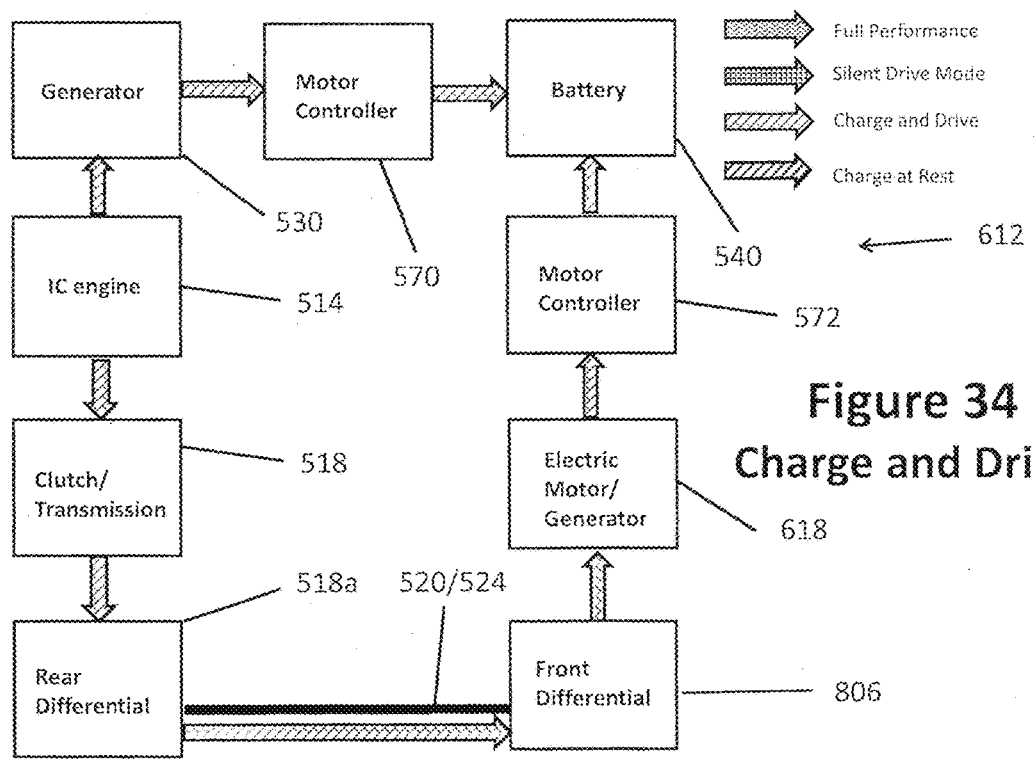
FIG. 34 is a schematic view of the charge and drive mode of the hybrid schematic of FIG. 32.

With reference now to FIG. 34, the charge-and-drive mode is shown schematically where the internal combustion engine 514 drives both the transmission 518 as well as generator 530. Generator 530 charges battery pack 540 through motor controller 570. Transmission 518 also drives rear differential 518A as well as front differential 806 through prop shaft portions 520/524. The front traction motor 618 is also a generator which when driven can charge batteries 540 through motor controller 572.

With reference now to FIG. 35, the silent drive mode is shown where traction motor 618 is driven by battery packs 540 through motor controller 572. As described above, traction motor 618 drives the front differential 806 through the front drive 616. Meanwhile, the rear differential 518A is driven by the prop shaft portions 520/524 in the reverse direction.

Finally, with respect to FIG. 36, the full performance mode is shown where input torque is received from both the internal combustion engine 514 as well as the traction motor 618. In this mode, internal combustion engine 514 drives transmission 518 which in turn drives the rear differential 518A. Torque is transmitted forwardly from prop shaft portions 520/524 to front differential 806. At the same time, traction motor 618 provides input torque to the front differential 806 by way of battery pack 540 controlled through motor controller 572.

Figure 37A:
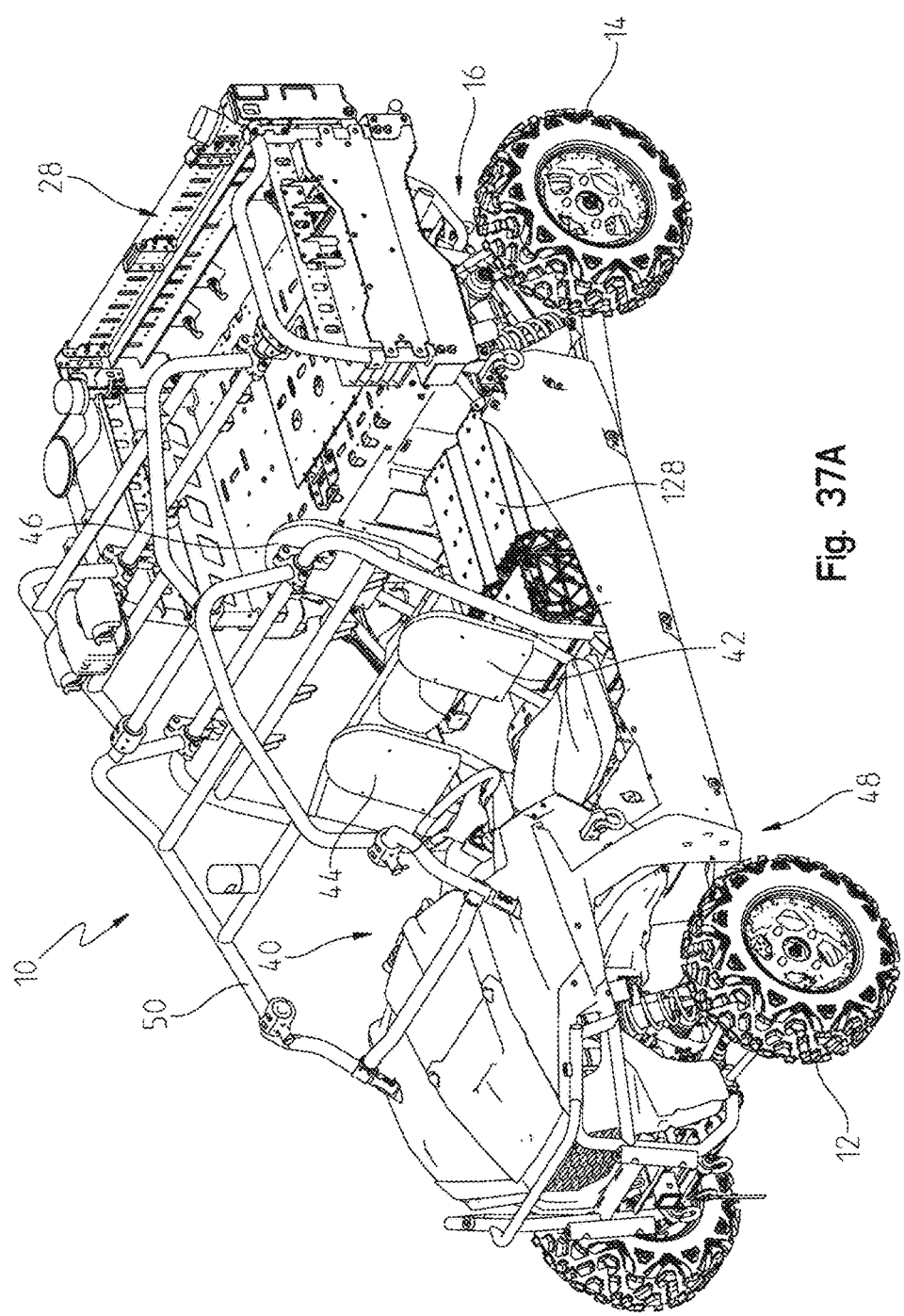
FIG. 37A is a front left perspective view of a hybrid utility vehicle of the present disclosure including a plurality of battery packs configured to be used with any of the powertrain assemblies disclosed herein.

Referring to FIG. 37A, battery packs 128 are configured to be modular in that multiple battery packs 128 may be coupled together to increase power, battery range, torque, and/or payload capacity for vehicle 10. For example, each battery pack 128 may be configured with a plug or other input that would allow additional battery packs 128 to merely plug into or otherwise connect to the existing battery packs 128. In this way, battery packs 128 may be customized to any particular application of vehicle 10. Additionally, depending on certain applications, various battery packs 128 may be removed from vehicle 10 when less power is needed to operate vehicle 10. In one embodiment, vehicle 10 may be configured with a base or standard number or size of battery packs 128, however, during an ordering process for vehicle 10 and/or at a later date after vehicle 10 has been received by the user, the user may remove some of battery packs 128 when vehicle 10 requires decreased power and/or the user may order additional battery packs 128 when vehicle 10 requires increased power. In one embodiment, battery packs 128 may include DC batteries.

Figure 37B:
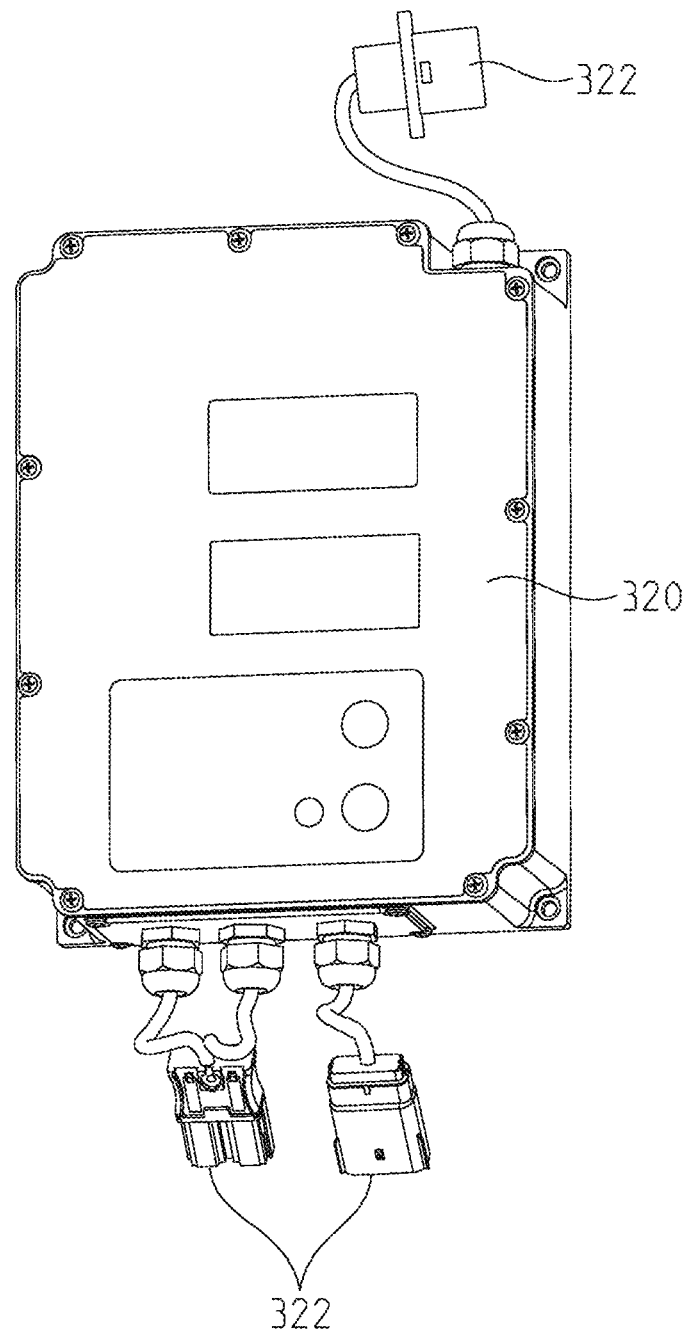
FIG. 37B is a front perspective view of a charger of a hybrid utility vehicle of the present disclosure.

Referring to FIG. 37B, one or more chargers 320 may be included on vehicle 10 in a modular configuration such that additional chargers 320 may be merely plugged into or otherwise coupled to various components of vehicle 10 when additional charging capacity may be needed or one or more chargers 320 may be removed from vehicle 10 when less charging capacity is needed or when additional cargo space is needed on vehicle 10. Chargers 320 include electrical connectors 322 which may be operably coupled to battery packs 128, other chargers 320, and/or other components of vehicle 10 but may be supported on any portion of vehicle 10. For example, chargers 320 may be supported on a portion of rear cargo area 28. In one embodiment, chargers 320 may be supported on vehicle 10 with Lock & Ride® components, available from Polaris Industries, Inc. located at 2100 Highway 55 in Medina, Minn. 55340.

Figure 42:
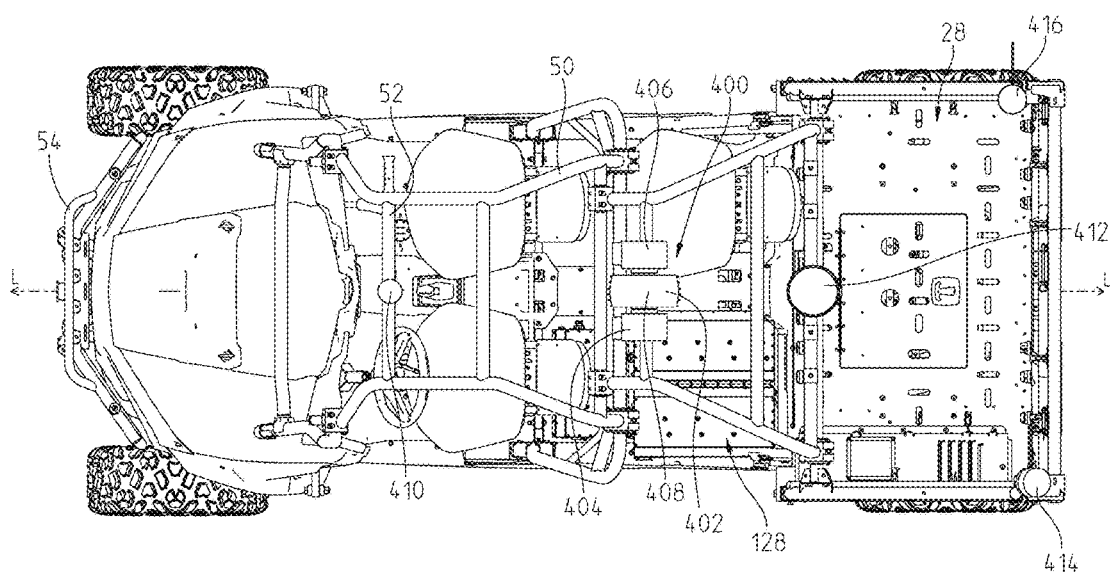
FIG. 42 is a top view of the vehicle of FIG. 41 including the autonomous assembly or kit for the vehicle.
Figure 43:
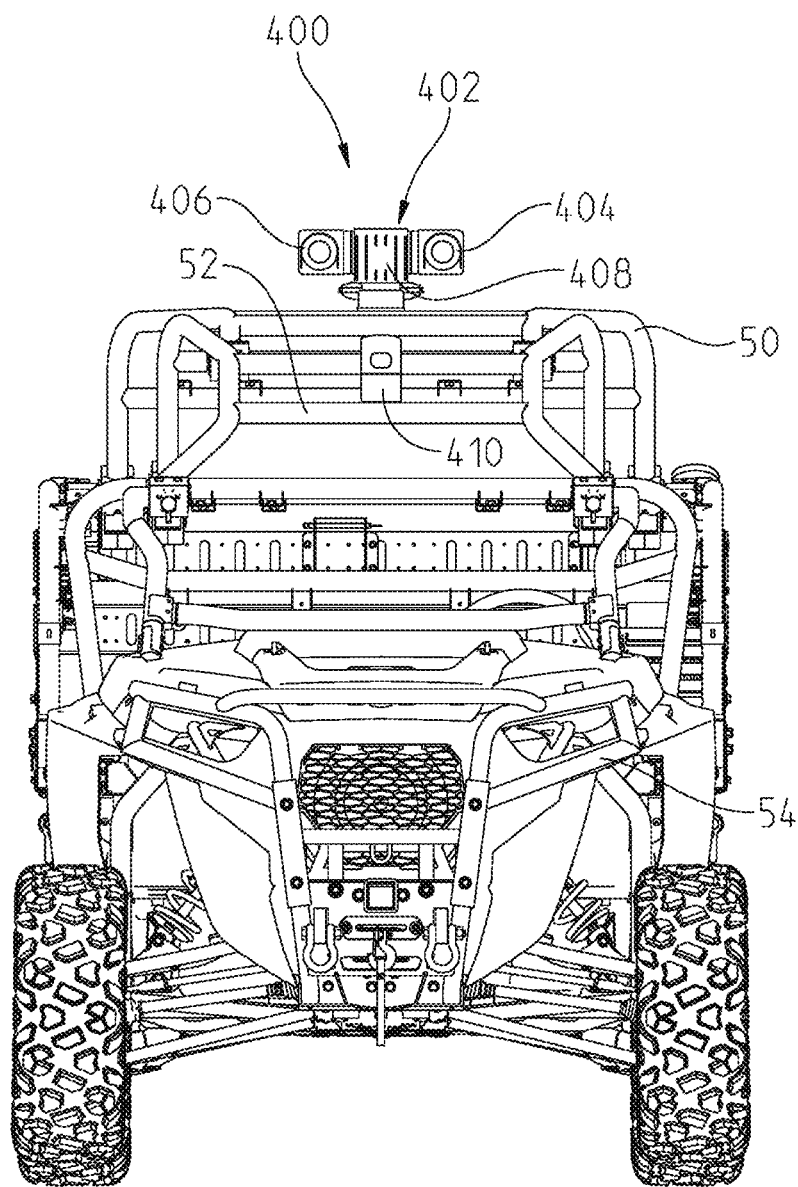
FIG. 43 is a front left perspective view of the vehicle of FIG. 41 including the autonomous assembly or kit for the vehicle.

Additionally, the size and number of battery packs 128 may affect the weight bias of vehicle 10 and, therefore, in one embodiment, battery packs 128 may be centered along a longitudinal axis L of vehicle 10 (FIG. 42). Alternatively, as shown in FIG. 37, one rear passenger seat 46 may be removed to provide the necessary space for battery packs 128. In a further embodiment, both rear passenger seats 46 may be removed to provide space for battery packs 128. Alternatively, battery packs 128 may be of any size, shape, or configuration and may be positioned at any portion of vehicle 10 to allow for various applications for vehicle 10 and for weight biasing determinations.

Figure 38A:
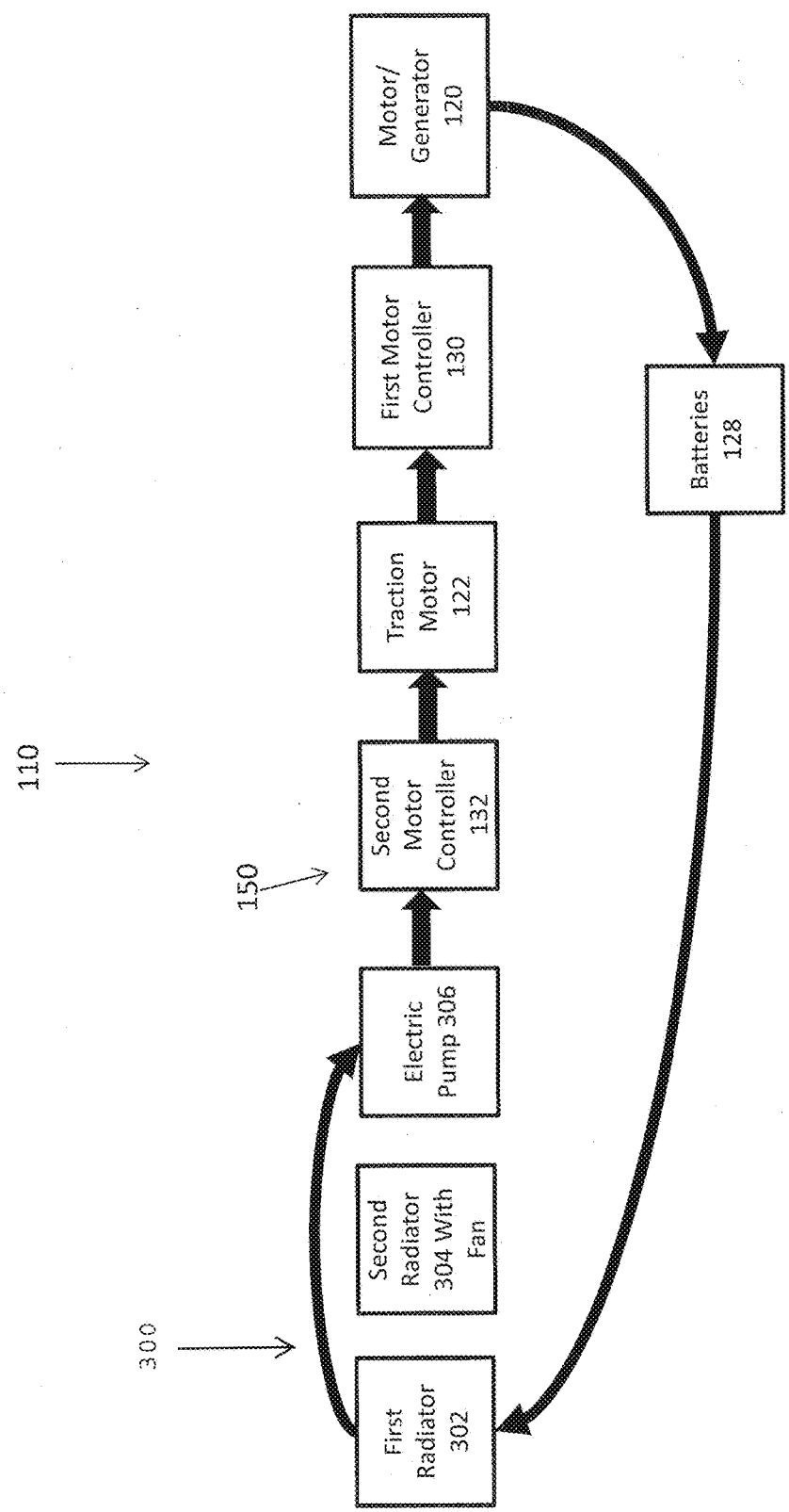
FIG. 38A is a schematic view of a cooling assembly of any of the hybrid utility vehicles disclosed herein.

Referring to FIG. 38A, and using vehicle 110 (FIGS. 2A and 2B) as an example, a cooling assembly 300 for any vehicle disclosed herein includes a first radiator 302 which is fluidly coupled to an electric pump 306 of electrical system 150. First radiator 302 may be positioned generally forward of a portion of a second radiator 304 with a fan which is fluidly coupled to at least engine 30 of powertrain assembly 116. In this way, electrical system 150 has a separate cooling system from the cooling system for powertrain assembly 116 which allows the components of electrical system 150 to operate at lower operating temperatures than the temperatures at which engine 30 and other components of powertrain assembly 116 operate. In other words, by separating the cooling system for electrical system 150 from the cooling system for powertrain assembly 116, the components of electrical system 150 are able to be cooled to lower temperatures than the components of powertrain assembly 116, which increases the efficiency of the components of electrical system 150.

In operation, ambient air may flow over first radiator 302 to cool or lower the temperature of any coolant or cooling fluid (e.g., water, oil, etc.) flowing therethrough. More particularly, the fan coupled to second radiator 304 pulls ambient air through both first and second radiators 302, 304 which cools the cooling fluid in first radiator 302 for electrical system 150 and also cools the cooling fluid in second radiator 304 for cooling at least engine 30 of powertrain assembly 116. Once the ambient air cools the cooling fluid flowing through first radiator 302, electric pump 306 then supplies the cooling fluid to the components of electrical system 150 to decrease the temperature thereof. For example, as shown in FIG. 38, electric pump 306 supplies cooling fluid to second motor controller 132, traction motor 122, first motor controller 130, motor/generator 120, and battery packs 128 to prevent these electrical components from overheating. After cooling battery packs 128, the cooling fluid then flows back to first radiator 302 to be cooling by the ambient air flowing therethrough.

In one embodiment of cooling assembly 300, as shown in FIG. 38B, first radiator 302 may be coupled to first and second motor controllers 130, 132. Alternatively, first radiator 302 instead may be coupled to battery packs 128. Illustratively, first radiator 302 includes a hot cooling fluid outlet port 310 and a cold cooling fluid inlet port 312 and may be formed as an aluminum extrusion configured to circulate the cooling fluid therethrough. More particularly, the cooling fluid is circulated through first radiator 302 to dissipate heat from electrical system 150. As shown in FIG. 38B, first radiator 302 is configured to shed heat from at least motor controllers 130, 132 coupled thereto. Because first radiator 302 may be positioned intermediate motor controllers 130, 132 such that motor controller 130 is coupled to a first side of first radiator 302 and motor controller 132 is coupled to a second side of first radiator 302, first radiator 302 is configured to simultaneously shed heat from both motor controllers 130, 132.

Figure 38C:
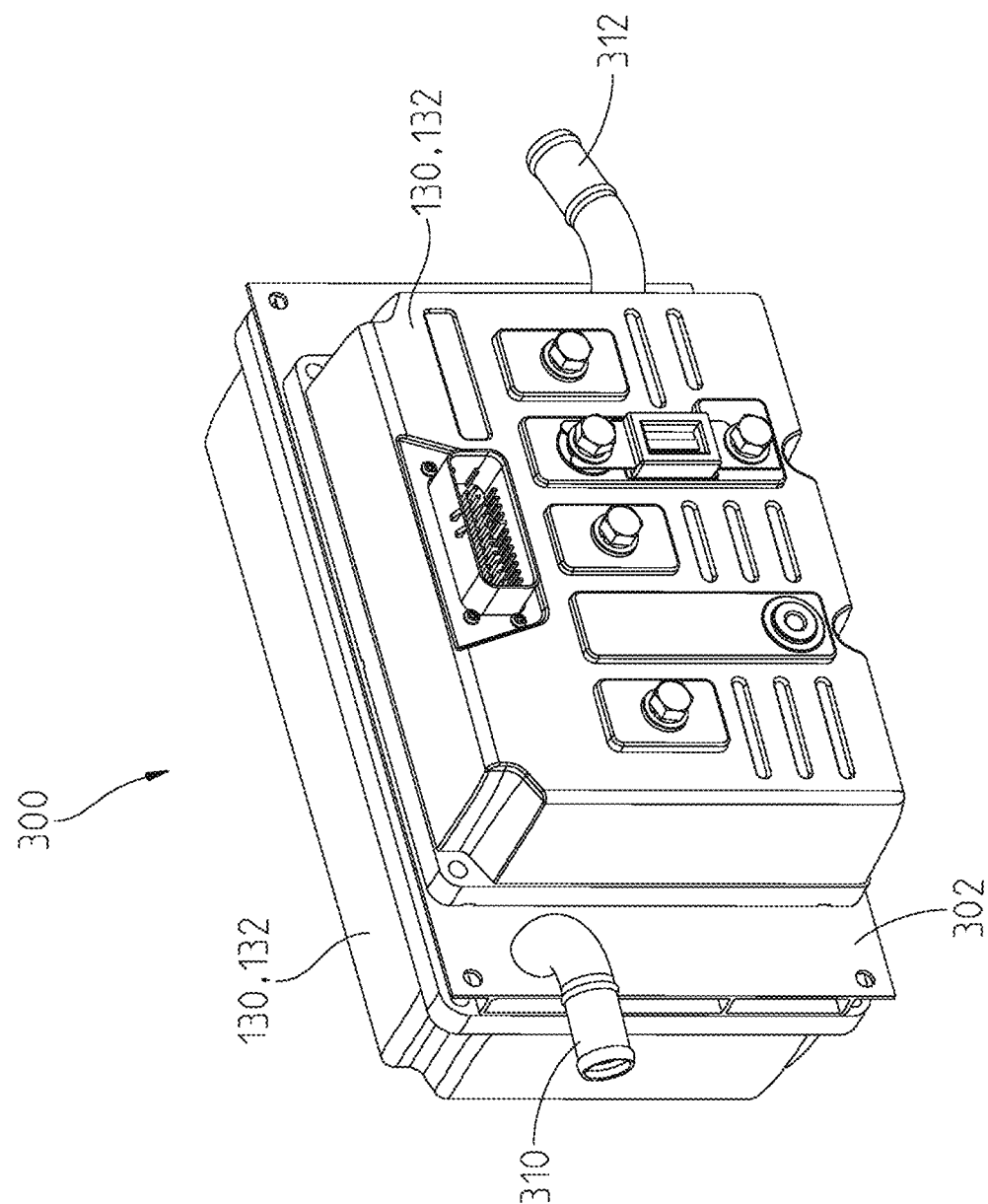
FIG. 38C is an alternative embodiment of the radiator coupled to the motor controllers of FIG. 38B.
Figure 38D:
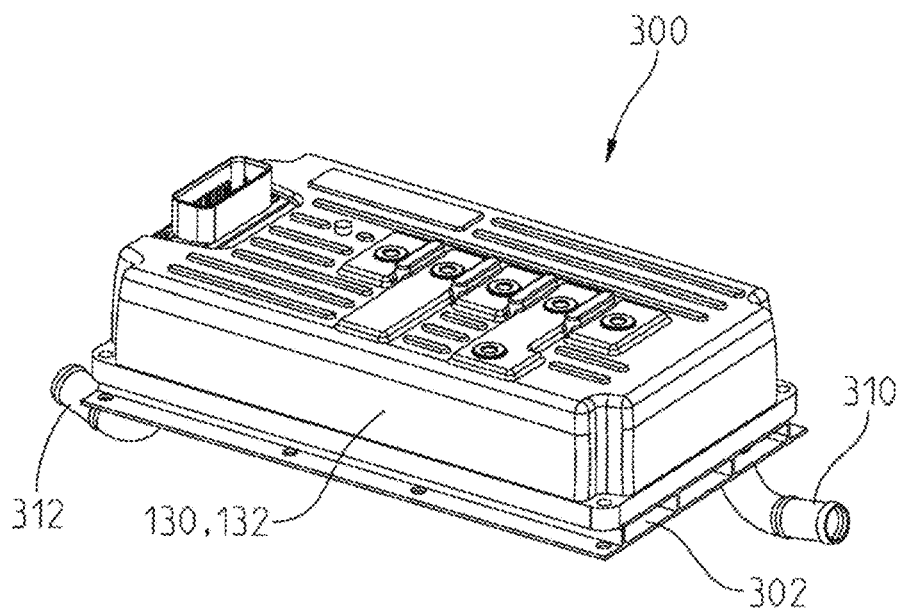
FIG. 38D is an alternative embodiment of the radiator coupled to one of the motor controllers of FIG. 38B.
Figure 38E:
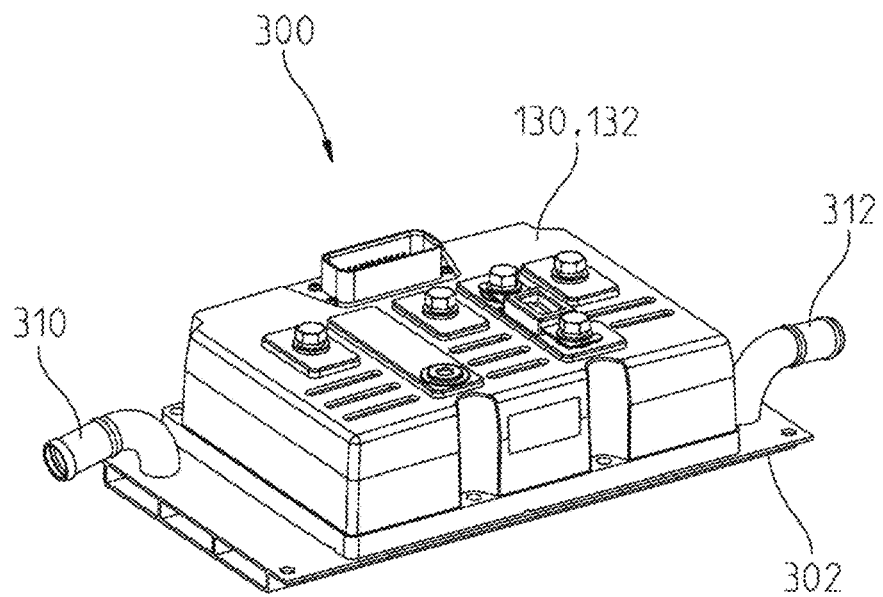
FIG. 38E is an alternative embodiment of the radiator coupled to the other of the motor controllers of FIG. 38B.

Alternatively, as shown in FIGS. 38C-38E, the configuration of first radiator 302 and motor controllers 130, 132 may be adjusted, depending on various vehicle parameters. For example, as shown in FIG. 38C, first radiator 302 may be coupled to both motor controllers 130, 132 in an alternative configuration. Additionally, as shown in FIGS. 38D and 38E, each motor controller 130, 132 may be coupled to its own, separate radiator 302 such that each radiator 302 is configured for cooling just one motor controller 130, 132.

Figure 39:
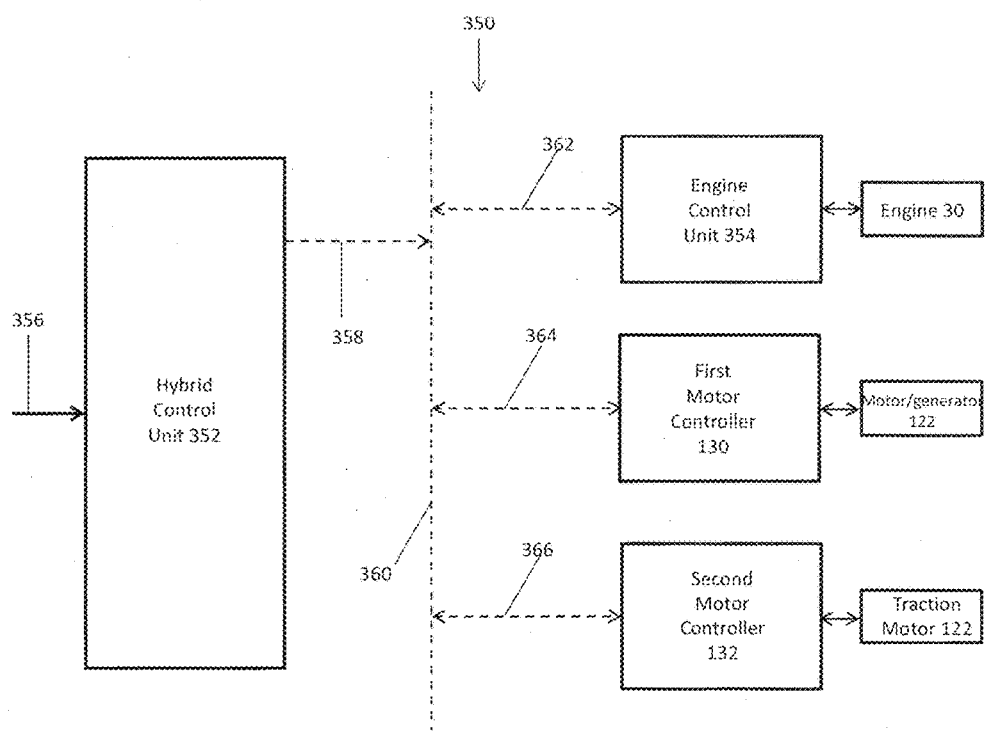
FIG. 39 is a schematic view of a control system for operating any of hybrid vehicles disclosed herein in various drive modes.

Referring to FIG. 39, and using vehicle 110 as an example, a control system 350 for operating electrical system 150 is provided. Control system 350 includes a hybrid control unit 352 which is electrically coupled to an engine control unit 254 for powertrain assembly 116, first motor controller 130 for motor/generator 120, and second motor controller 132 for traction motor 122. Additionally, because battery packs 128 may be operably coupled to first motor controller 130, hybrid control unit 352 also is configured to be electrically coupled to battery packs 128.

In operation, hybrid control unit 352 receives a user input 356 which indicates the drive mode in which vehicle 110 should operate. Depending on user input 356, hybrid control unit 352 sends a torque command signal 358 to a communications network 360, illustratively a high-speed CANBUS system. More particularly, hybrid control unit 352 may send vehicle data such as torque and speed limits to engine 30, motor/generator 120, and/or traction motor 122 via communications network 360 when sending torque command signal 358. In one embodiment, the torque and speed limits may be utilized by traction motor 122 for energy recovery during braking.

Once torque command signal 358 is received, communications network 360 then sends an input signal 362 to engine control unit 354 if engine 30 is to be started or stopped in the user-specified drive mode, sends an input signal 364 to first motor controller 130 if motor/generator 120 is to be operated in the user-specified drive mode, and/or sends an input signal 366 to second motor controller 132 if traction motor 122 is to be operated in the user-specified drive mode. For example, if a user desires to operate vehicle 110 in an all-electric or Silent-Drive mode, then user input 356 will indicate this to hybrid control unit 352 which then sends torque command signal 358 to communications network 360 indicative of the Silent-Drive mode. Communications network 360 then provides only input signal 366 to second motor controller 132 to operate traction motor 122 because engine 30 and motor/generator 120 are not utilized during the Silent Drive mode. As such, communications network 360 does not send any input signal 362 or 364 to engine control unit 354 or first motor controller 130, respectively.

Alternatively, if the user specifies that vehicle 110 should operate in the other drive modes, such as the Full Performance drive mode, the Charge-and-Drive mode, or the Charge-at-Rest drive mode, then hybrid control unit 352 will provide a torque command signal 358 indicative of these modes such that other components, such as engine 30 and/or motor/generator 120 may operate to facilitate those desired modes.

In one embodiment when vehicle 110 is operating and moving, the Charge-and-Drive mode may be the default hybrid mode which allows motor/generator 120 to maintain battery packs 128 at approximately 80%±10% state-of-charge ("SOC"). In a further embodiment, motor/generator 120 may maintain battery packs 128 at approximately 90%±10% state-of-charge ("SOC") when in the Charge-and-Drive mode. To maintain the charge on battery packs 128, both engine 30 and traction motor 122 may be utilized for driving vehicle 110 while motor/generator 120 is configured to output power based on vehicle speed to maintain the SOC on battery packs 128.

However, when in the Full-Performance drive mode, both engine 30 and traction motor 122 drive vehicle 110 and, in this mode, hybrid control unit 352 may allow the charge on battery packs 128 to become fully depleted in order to effect the Full-Performance drive mode. However, when in the Full Performance drive mode, motor/generator 120 may be operated to output the necessary power for operating essential vehicle components.

Yet, when vehicle 110 is not moving, the user may still desire for vehicle 110 to operate in the Charge-at-Rest mode in which case engine 30 operates to drive motor/generator 120 to supply power to the operating components of vehicle 110 and to charge battery packs 128 while vehicle 110 is stationary. Alternatively, in one embodiment, engine 30 and motor/generator 120 may not operate and only battery packs 128 provide the necessary power for operating various vehicle components. In addition to charging battery packs 128 through motor/generator 120, battery packs 128 also may be charged by an onboard AC charger that is configured to be plugged into an external power source.

Control system 350 also is configured to determine if a failure has occurred in any component of electrical system 150 and/or powertrain assembly 116. For example, if control system 350 determines that a failure has occurred in traction motor 122, then vehicle 110 will be operated only by engine 30. Similarly, if engine 30 experiences a failure or malfunction, vehicle 110 will operate in the all-electric or Silent Drive mode.

Figure 40:
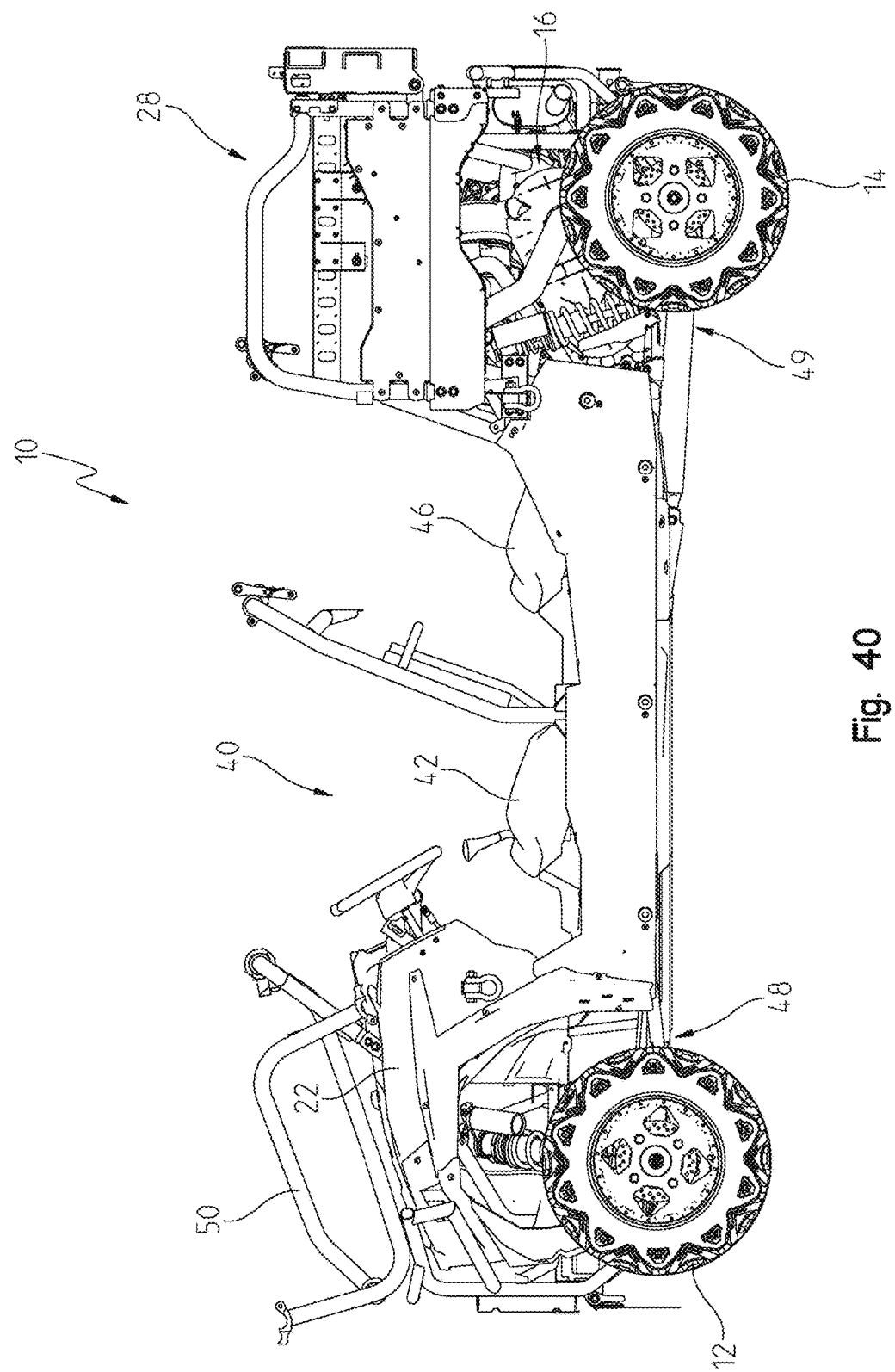
FIG. 40 is a left side view of any of the hybrid utility vehicles of the present disclosure with an upper frame portion shown in a collapsed position.
Figure 41:
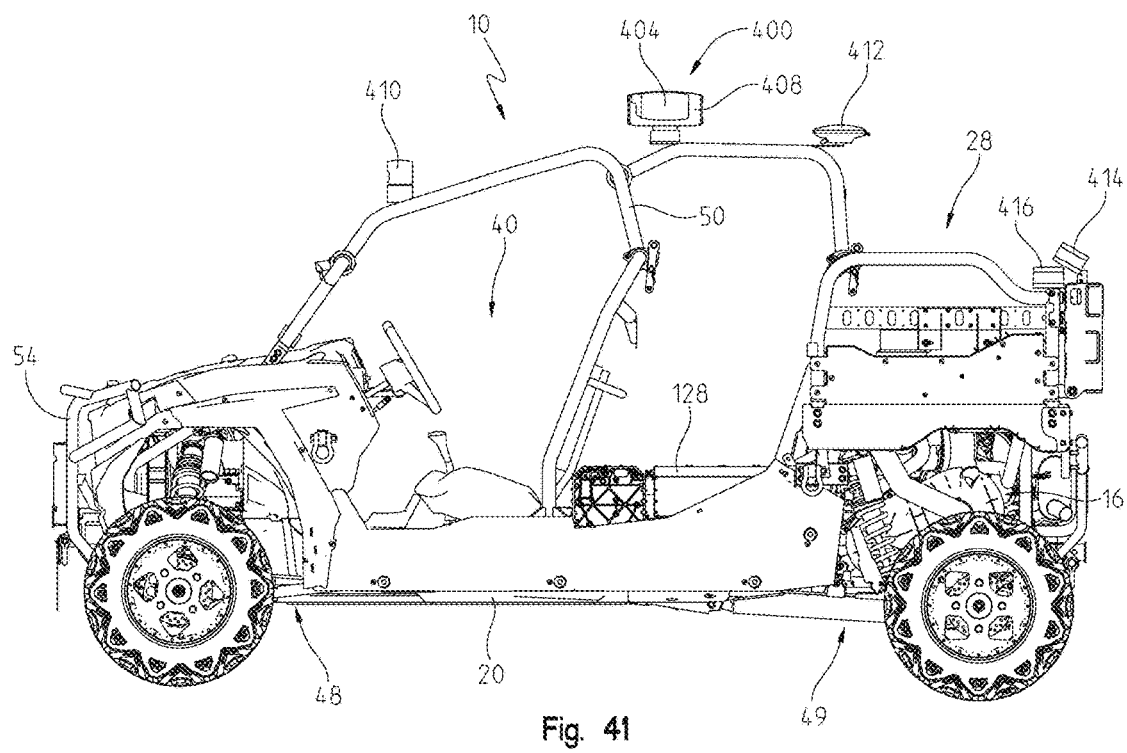
FIG. 41 is a left side view of any of the hybrid utility vehicles of the present disclosure with an upper frame assembly shown in a raised position and supporting an autonomous assembly or kit for the vehicle.

Referring to FIG. 40, upper frame portion 50 is configured to move between a collapsed position, as shown in FIG. 40, and a raised position, as shown in FIG. 1. When in the collapsed position of FIG. 40, upper frame portion 50 is folded forward and is contained on the hood of vehicle 10 and the overall height of vehicle 10 is 60 inches or less. By reducing the height of vehicle 10 in this way, vehicle 10 may be transported in various ways or on various vehicles, for example in an aircraft, on a ship, in a trailer, or in any other type of carrier. In one embodiment, vehicle 10 is sized to be positioned within a V22 military aircraft for transportation thereof. In this way, and as disclosed in the present application, a hybrid vehicle with the autonomous capabilities disclosed hereinafter is configured to be positioned and transported on any type of vehicle or in any type manner, including being positioned on standard military vehicles for transportation to various military sites. Additional details of vehicle 10 may be disclosed in U.S. Pat. No. 8,998,253, filed Mar. 28, 2013, the complete disclosure of which is expressly incorporated by reference herein.

When upper frame portion 50 is in the raised position, an autonomous assembly 400 may be coupled to portions of vehicle 10 to allow for autonomous or remote control of vehicle 10. Alternatively, autonomous assembly 40 may remain coupled to portions of vehicle 10 when upper frame portion 50 is in the lowered or collapsed position. Illustratively, as shown in FIGS. 37 and 41-43, autonomous assembly 400 includes an upper visual assembly 402 which includes a first camera unit 404 and a second camera unit 406, both of which may be coupled to a transceiver unit 408. In one embodiment, first and second camera units 404, 406 may include forward-facing cameras and/or sensors configured for pan, tilt, and zoom camera capabilities, thermal vision, capabilities, and night vision capabilities. As such, upper visual assembly 402 may be configured to capture images or measure data through first and second camera units 404, 406 and transmit the images and/or data to transceiver unit 408 for transmitting the images and/or data to a remote computer, phone, tablet, server, or other computing and/or processing device. Transceiver unit 408 also may be configured to receive inputs or commands from the computing device in order to adjust the position of first and second camera units 404, 406 for images or data related to a particular area surrounding vehicle 10.

Referring still to FIGS. 37 and 41-43, autonomous assembly 400 also includes a forward sensor unit 410 which may be operably coupled to upper visual assembly 402 and positioned on a front cross-bar 52 of upper frame portion 50. Alternatively, forward sensor unit 410 may be positioned lower on vehicle 10, for example on a front fender 54. Illustratively, forward sensor unit 410 is a LIDAR sensor unit configured for using light in a remote sensing method to measure distances and ranges. In this way, forward sensor unit 410 also may be configured to obtain geodetic distances, ranges, points, or other data from an area forward of vehicle 10 and transmit the data to a remote computer processor or server. Additionally, forward sensor unit 410 may be configured to receive a remote input or command to adjust the position of forward sensor unit 410.

Autonomous assembly 400 also may include a GPS antenna 412 operably coupled to upper visual assembly 402 and forward sensor unit 410. GPS antenna 412 may be wirelessly coupled a remote computer processor or server for receiving and/or transmitting information or data about the position of vehicle 10. In one embodiment, GPS antenna 412 may be coupled to a rear cross-bar of upper frame portion 50. Illustratively, GPS antenna 412 is positioned longitudinally rearward of upper visual assembly 402, although GPS antenna 412 may be positioned at any other location on vehicle 10.

Autonomous assembly 400 also may include rear sensor units 414, 416 which may be LIDAR sensors operably coupled to GPS antenna 412 and/or a remote computer processor or server. In one embodiment, rear sensor units 414, 416 are coupled to a portion of rear cargo area 28. Illustratively, one of rear sensor units 414, 416 may be angled or tilted relative to the other rear sensor unit 414, 416, depending on the application of autonomous assembly 400 and/or any input received from the remote computer processor or server.

Autonomous assembly 400 also may include an inertial motion unit (not shown) supported on a portion of rear cargo area 28. The inertial motion unit may be operably coupled to any of forward and rearward sensor units 410, 414, 416, GPS antenna 412, and/or upper visual assembly 402. The inertial motion unit may include a plurality of accelerometers and gyroscopes to measure and report pitch, roll, yaw, and other parameters of the components of autonomous assembly 400 and/or of various components of vehicle 10. The inertial motion unit may be operably coupled to a remote computer or server.

Any components of autonomous assembly 400 may be easily coupled to upper frame portion 50 and/or other portions of vehicle 10 with quick-release clamps, clips, or couplers. In one embodiment, the components of autonomous assembly 400 may be coupled to vehicle with Lock & Ride® components, available from Polaris Industries, Inc. located at 2100 Highway 55 in Medina, Minn. 55340. In this way, autonomous assembly 400 can be added to or removed from vehicle 10 easily and quickly. For example, upper frame portion 50 of vehicle 10 may be moved to the collapsed positioned (FIG. 40) for transport of vehicle 10. When in the collapsed position, autonomous assembly 400 may be removed from vehicle 10, although in other embodiments, autonomous assembly 400 may remain coupled to vehicle 10 when in the collapsed position. However, once vehicle 10 has been transported to a particular location, upper frame portion 50 may be easily moved to the raised position (FIG. 41) and autonomous assembly 400 can be quickly coupled to vehicle 10. Additionally, electrical harnessing components also may be integrated into or near the Lock & Ride® mounting positions, providing full-service quick attach mechanical and electrical points for the components of autonomous assembly 400. Harnessing may be modular and collapse/raise with upper frame portion 50 of vehicle 10. Harnessing may be integrated into or on upper frame portion 50 of vehicle 10.

Autonomous assembly 400 may be configured for a plurality of operations or applications, such as "Line of Sight" remote control, a "Follow Me" operation, and "GPS-based" operation. More particularly, if autonomous assembly 400 operates vehicle 10 using "Line of Sight" remote control, a user is able to control vehicle 10 with a remote control unit via line of sight controls or by viewing images from any of upper visual assembly 402, lower visual assembly 410, and/or rear visual assemblies 414, 416. The images from upper visual assembly 402, lower visual assembly 410, and/or rear visual assemblies 414, 416 may be transmitted to a remote processor, for example a cell phone or other mobile device, to allow the user to move vehicle 10 without being at or within vehicle 10. For example, if vehicle 10 is used on a farm, construction site, or battlefield where the user may need vehicle 10 to transport supplies to various locations, vehicle 10 may be remotely controlled to travel to various areas without the user actually being present within vehicle 10. In this way, others at the various locations can remove supplies from vehicle 10 without the user being present on vehicle 10.

Additionally, if autonomous assembly 400 operates vehicle 10 using a "Follow Me" operation, a user is able to control the movement of vehicle 10 by wearing a transponder (not shown). The transponder on the user may be electronically coupled to communications unit 412 through a wireless network (e.g., BLUETOOTH, satellite, etc.) such that vehicle 10 moves with the user through the communications between the transponder on the user and communications unit 412 on vehicle 10. For example, if the user is working on a farm, vehicle 10 may include supplies needed for the work being done by the user and vehicle 10 may automatically follow the user to provide him/her with supplies for the work being done without the user in vehicle 10.

Also, if autonomous assembly 400 operates vehicle 10 using a "GPS-based" operation, a user is able to program vehicle 10 follow a predetermined GPS guided path or waypoints. For example, vehicle 10 can be configured to follow a GPS route to deliver things to workers on a farm, military supplies to soldiers at various locations, etc.

Additional details of the functionality and integration of autonomous assembly 400 into vehicle 10, other GPS-based programs or devices for vehicle 10, other communications programs or devices of vehicle 10, and/or any other details of vehicle 10 may be disclosed in U.S. patent application Ser. No. 15/161,720, filed May 23, 2016; 62/293,471, filed Feb. 10, 2016; Ser. No. 14/985,673, filed Dec. 31, 2015; Ser. No. 14/225,206, filed Mar. 25, 2014 ; and Ser. No. 15/001,757, filed Jan. 20, 2016, and International Patent Application No. PCT/US2014/018638, filed on Feb. 26, 2014, the complete disclosures of which are expressly incorporated by reference herein.

Figure 44:
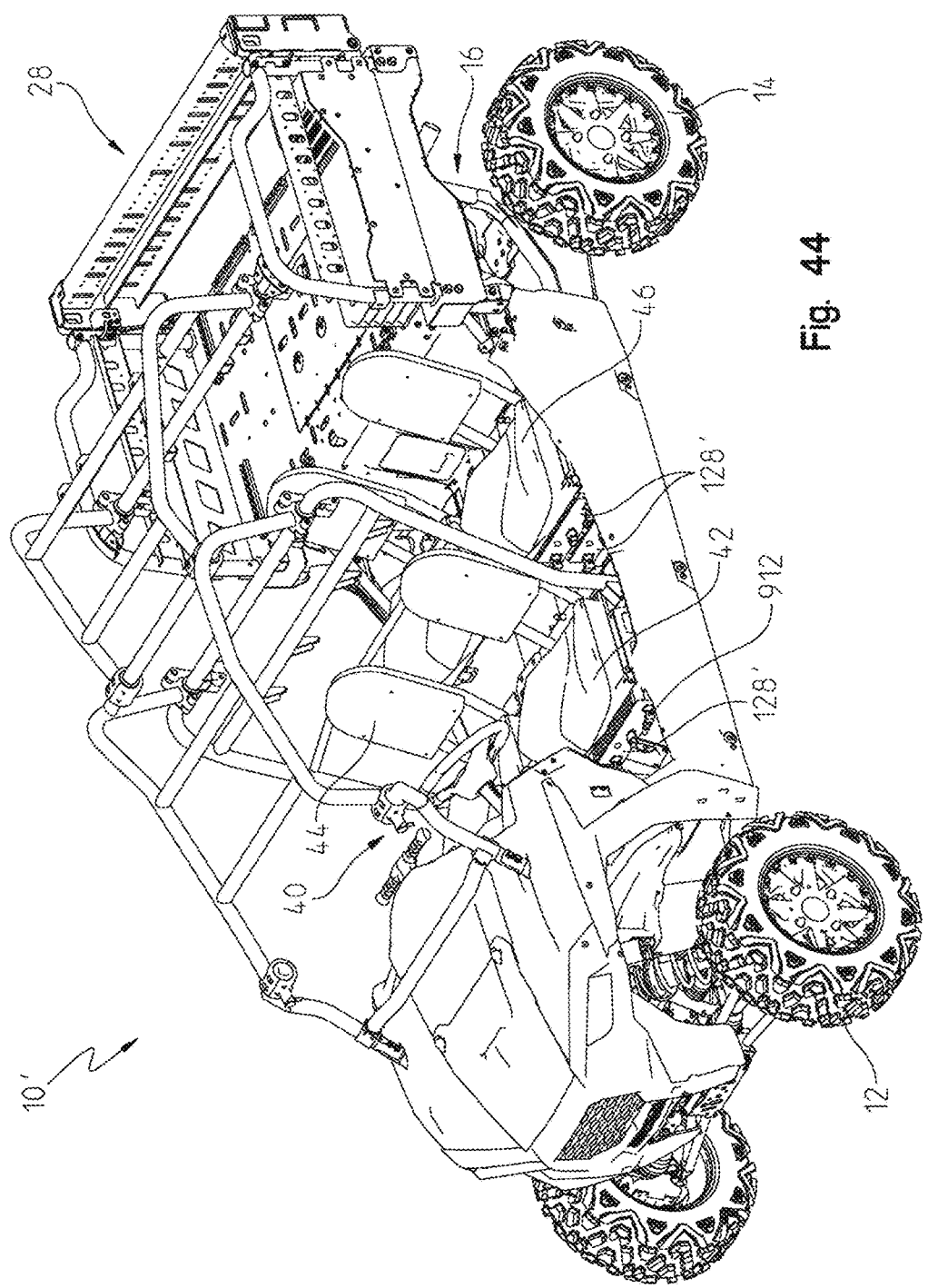
FIG. 44 is a front left perspective view of an alternative embodiment vehicle of the present disclosure.

Referring to FIG. 44, an alternative embodiment of vehicle 10, 510 (FIGS. 1, 13, and 37A) is shown as vehicle 10', where like reference numbers are used to indicate like components or systems between vehicles 10, 510, and 10'. Compared to vehicle 10, 510 of FIGS. 13 and 37A, vehicle 10' of FIG. 44 includes at least one battery 128' and, illustratively a plurality of batteries 128', positioned below at least operator seat 42 and rear passenger seats 46. As such, the configuration of vehicle 10' and batteries 128' allows both batteries 128' and seats 42, 44, 46 to remain within vehicle 10'. In one embodiment, batteries 128' may be lithium ion batteries and each battery 128' may weigh less than approximately 50 lbs., for example 40 lbs. Additionally, batteries 128' may be liquid and/or air cooled.

Figure 45:
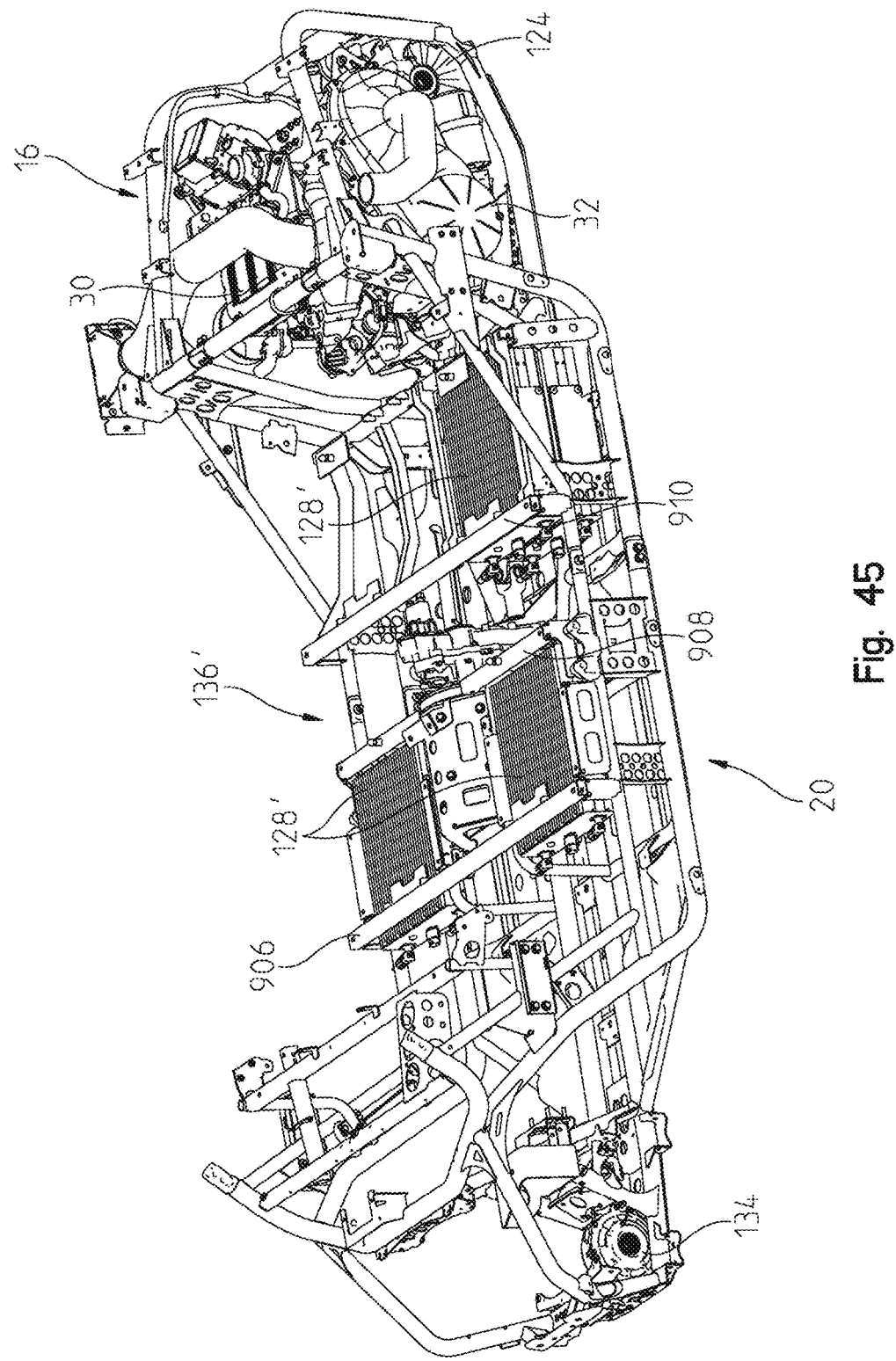
FIG. 45 is a front left perspective view of a frame assembly and a driveline of the vehicle of FIG. 44.
Figure 46:
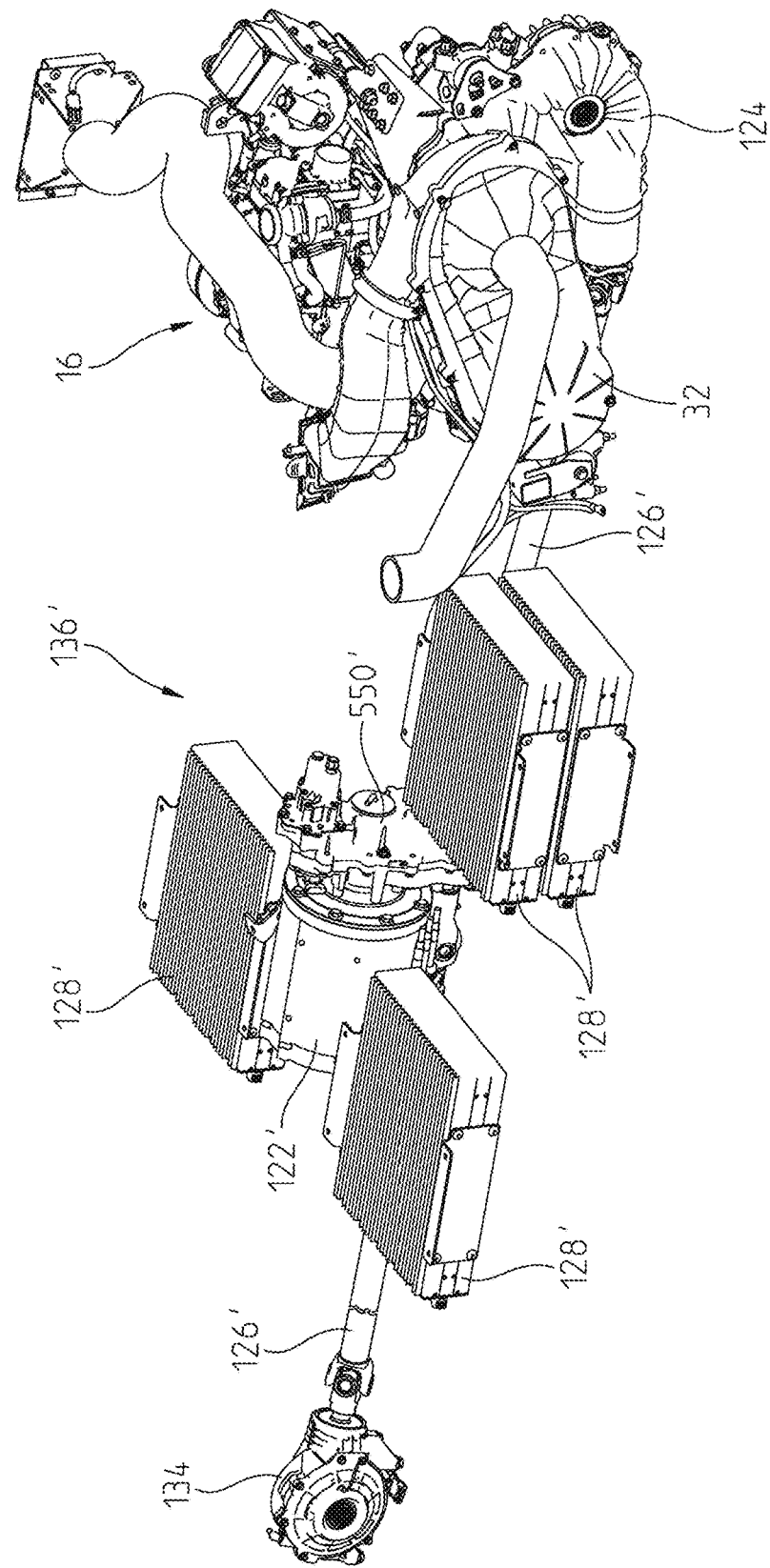
FIG. 46 is a rear left perspective view of the driveline of FIG. 45.
Figure 47:
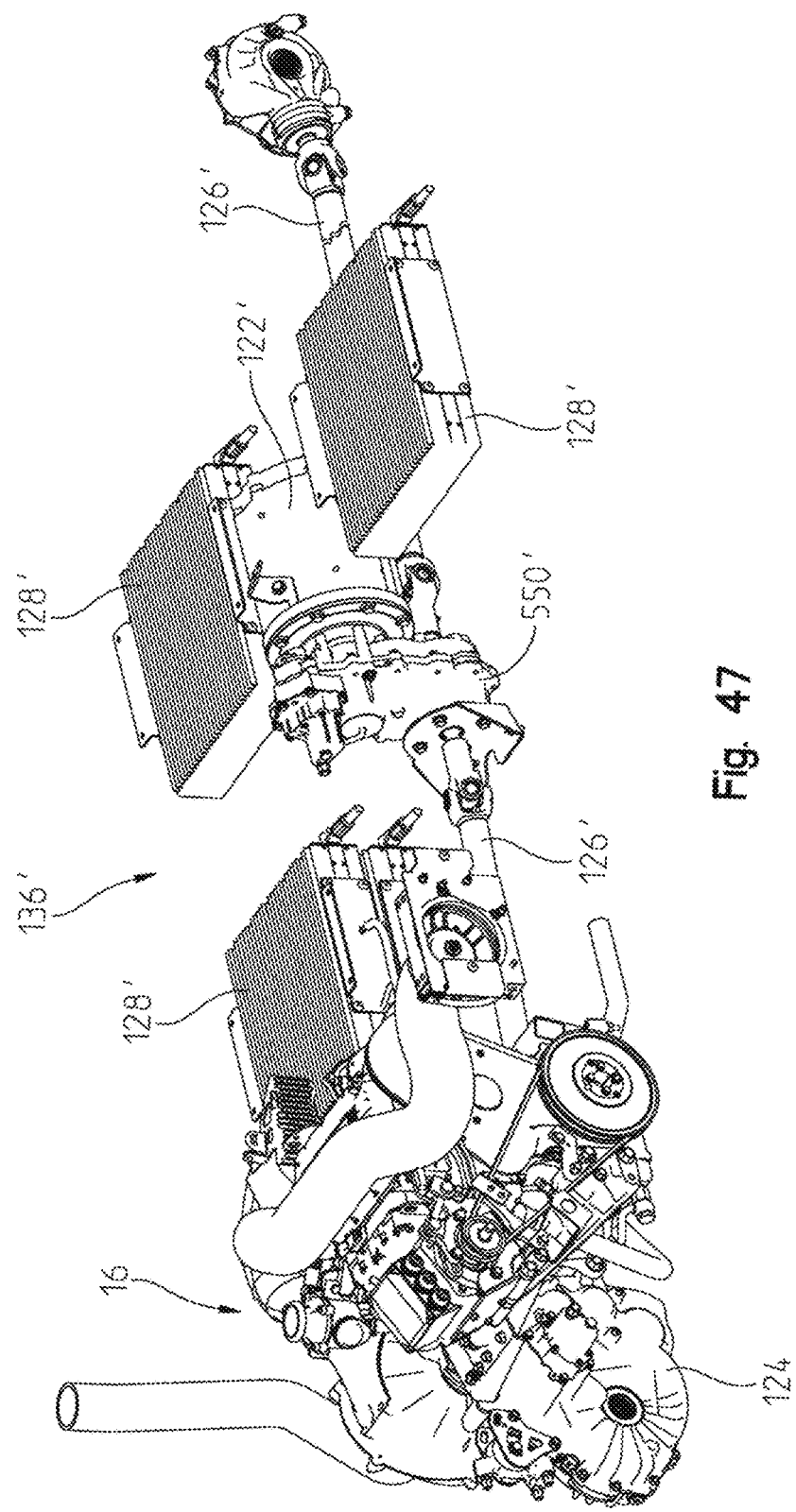
FIG. 47 is a rear right perspective view of the driveline of FIG. 46.
Figure 48:
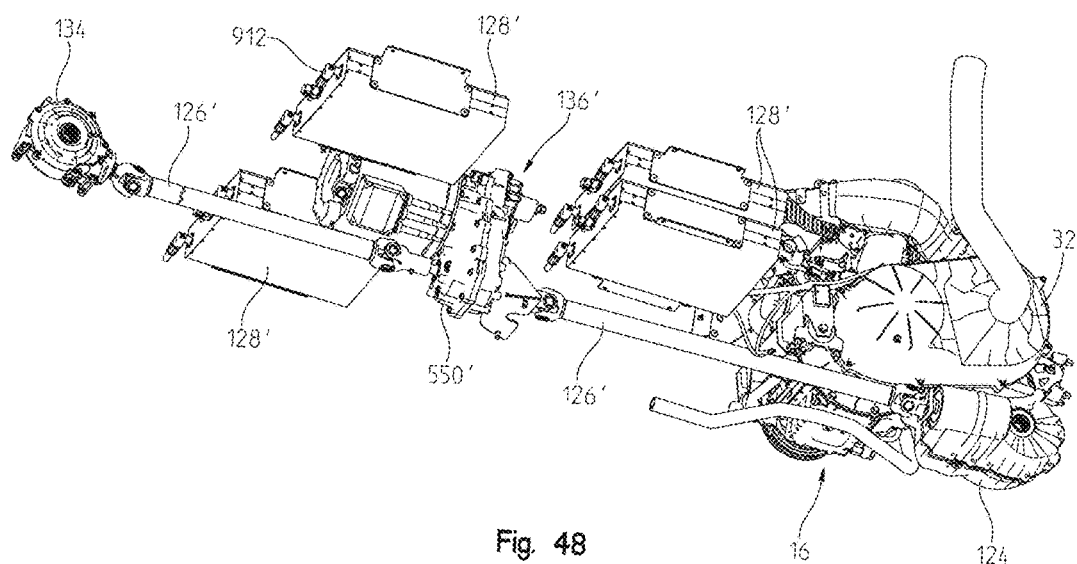
FIG. 48 is a bottom left perspective view of the driveline of FIG. 47.
Figure 49:
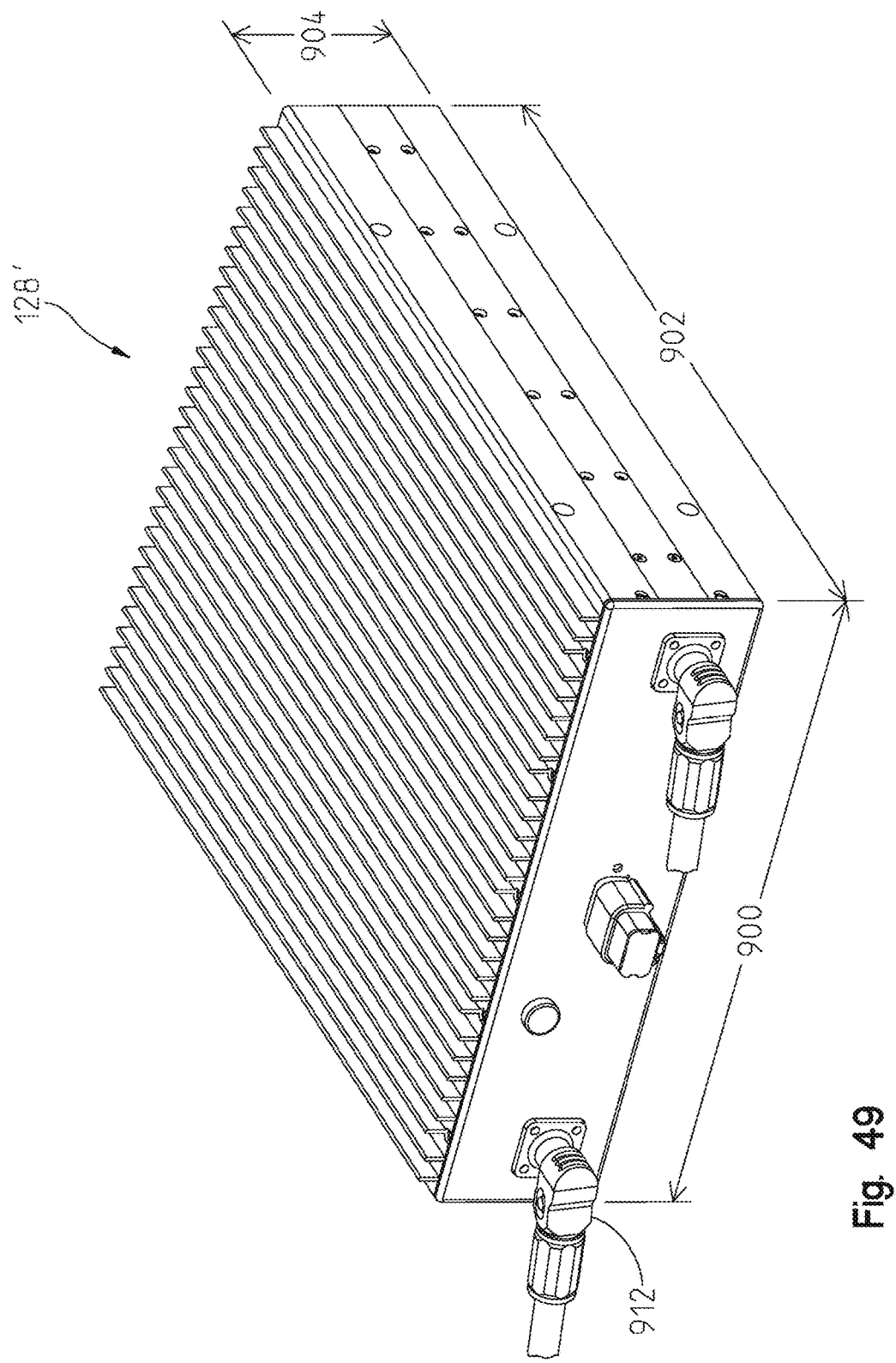
FIG. 49 is a front left perspective view of a battery positioned on the vehicle of FIG. 44 and operably included with the driveline.

As shown in FIGS. 44-49, batteries 128' define a generally rectangular configuration having a width 900 and a length 902 which are both greater than a height 904 (FIG. 49). As such, batteries 128' are wider and longer than height 904, thereby allowing batteries 128' to be positioned under any of seats 42, 44, 46 when seats 42, 44, 46 are coupled to vehicle 10'. In one embodiment, as shown in FIG. 45, batteries 128' may be stacked vertically on top of each other such that more than one battery 128' may be positioned below seats 42, 44, 46. Illustratively, batteries 128' are supported on frame assembly 20 and positioned below front seat support members 906, 908 of frame assembly 20 and/or below rear seat support member 910 of frame assembly 20 such that batteries 128' do not interfere with coupling seats 42, 44, 46 to seat support members 906, 908, 910. It may be appreciated that batteries 128' can be positioned horizontally, as shown in FIGS. 44-49, with width 900 or length 902 extending transversely to longitudinal axis L (FIG. 42) and length 902 or width 900 extending parallel to longitudinal axis L, or batteries 128' can be positioned vertically with height 904 extending transversely to longitudinal axis L. When batteries 128' are vertically oriented, multiple batteries 128' may be arranged next to each other in a lateral direction.

Batteries 128' may be in series or parallel and coupled to each other or other components of vehicle 10' using connectors 912, as shown in FIG. 49. Illustrative connectors 912 may be quick-connect connectors configured to receive a plug or other connector of another battery or component of vehicle 10'. As such, batteries 128' are both easy to assemble and disassemble on vehicle 10', for example if additional batteries 128' are required for increased power demands or if batteries 128' need to replaced, and are easy to access merely by removing seats 42, 44, and/or 46.

While batteries 128' are illustratively shown below at least seats 42, 46 in FIG. 44, it may be appreciated that batteries 128' can be positioned horizontally or vertically at other locations on vehicle 10'. For example, if vehicle 10' is configured as a utility vehicle, as shown in FIG. 44, batteries 128' may be positioned under seats 42, 44, 46 or batteries 128' also may be positioned on rear cargo area 28.

Additionally, if vehicle 10' is configured as a compact electric vehicle, for example as disclosed in U.S. patent application Ser. No. 15/001,757, filed Jan. 20, 2016, titled "ELECTRIC VEHICLE" and U.S. patent application Ser. No. 14/763,598, filed Jul. 27, 2015, titled "SIDE-BY-SIDE UTILITY VEHICLE" , the complete disclosures of which are expressly incorporated by reference herein, batteries 128' may be positioned below the operator and/or passengers seats or may be positioned rearward of the seats.

Also, if vehicle 10' is configured as a three-wheeled vehicle, for example as disclosed in U.S. Pat. No. 9,004,214, issued on Apr. 14, 2015, titled "THREE WHEELED VEHICLE", the complete disclosure of which is expressly incorporated by reference herein, batteries 128' may be positioned below the seats. Alternatively, if batteries 128' are supported on a three-wheeled vehicle, batteries 128' may be positioned laterally intermediate an operator seat and a passenger seat or rearward of the operator and/or passenger seat(s). If batteries 128' on a three-wheeled vehicle are positioned laterally intermediate the operator and passenger seats and/or rearward of the seat(s), batteries 128' may be vertically orientated, rather than in the horizontal orientation of FIG. 44. Additionally, if batteries 128' are positioned rearward of the seat(s) on a three-wheeled vehicle, batteries 128' may be angled rearwardly such that an upper end of batteries 128' is positioned upwardly and rearwardly relative to a lower end thereof.

Referring still to FIGS. 44-48, batteries 128' are included with a driveline assembly 136' of vehicle 10'. Illustratively, driveline 136' includes a prop shaft 126' which extends between front differential 134 and rear differential 124. Batteries 128' may be positioned on one or both sides of prop shaft 126' and, in one embodiment, a traction motor 122' may be positioned between batteries 128' below operator seat 42 and front passenger seat 44. In this way, traction motor 122' may be positioned between seats 42, 44 within operator area 40. Traction motor 122' may be operably coupled to prop shaft 126' through a gear train 550', illustratively a transfer case, and rotation of gear train 550' with rotation of prop shaft 126' is transferred to/from traction motor 122'. In this way, and for example when vehicle 10' is operating in an electric mode, traction motor 122' and gear train 550' are configured to rotate prop shaft 126' and provide power directly to rear differential 124 and/or front differential 134 for moving vehicle 10'.

Figure 50:
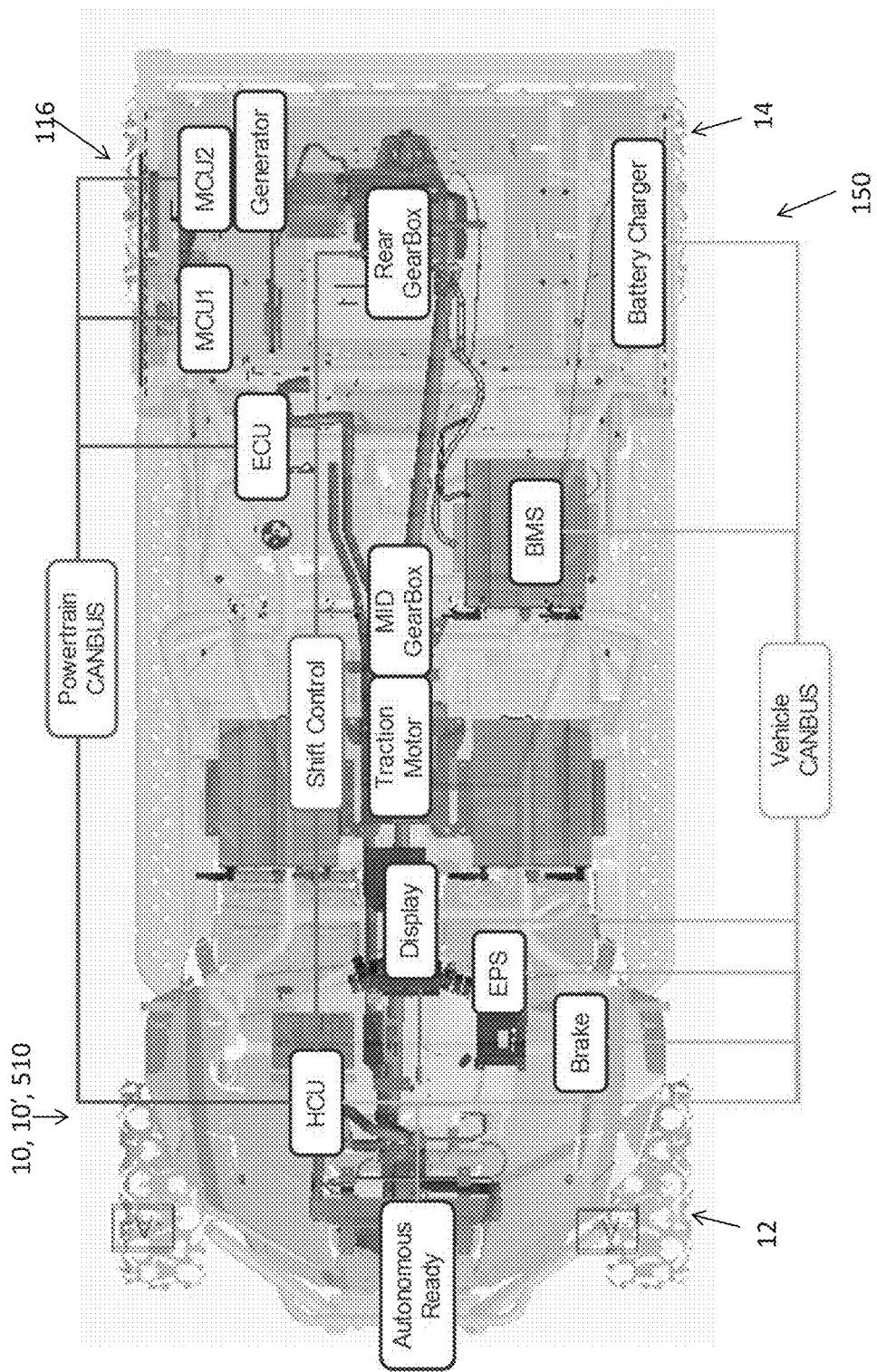
FIG. 50 is a schematic view of an electrical system of the vehicle of FIG. 44.

Referring to FIG. 50, electrical system 150 for any of the vehicles disclosed herein (e.g., vehicles 10, 10', 510) is shown and reference numbers are not used therein so as not to limit FIG. 50 to a particular vehicle embodiment. Electrical system 150 extends from the front end to the rear end of the vehicle and includes various components disclosed herein, such as first and second motor controllers ("MCU1" and "MCU2", respectively), the generator, the rear differential or gearbox, the front differential or gearbox, the battery charger, a battery management system ("BMS"), the traction motor, the gear train or gearbox adjacent the traction motor, the engine control unit ("ECU"), a display visible to at least the operator, an electric power steering unit ("EPS"), a brake assembly, the autonomous-ready system, and a hybrid control unit ("HCU"). Illustratively, a vehicle CAN-BUS is in electrical communication with at least the autonomous-ready system, HCU, brake assembly, EPS, display, BMS, and battery charger. Additionally, a powertrain CAN-BUS is in electrical communication with at least the HCU, ECU, MCU1, and MCU2. Also, a shift control system is in electrical communication with at least the HCU, gearbox, and rear differential.

Figure 51:
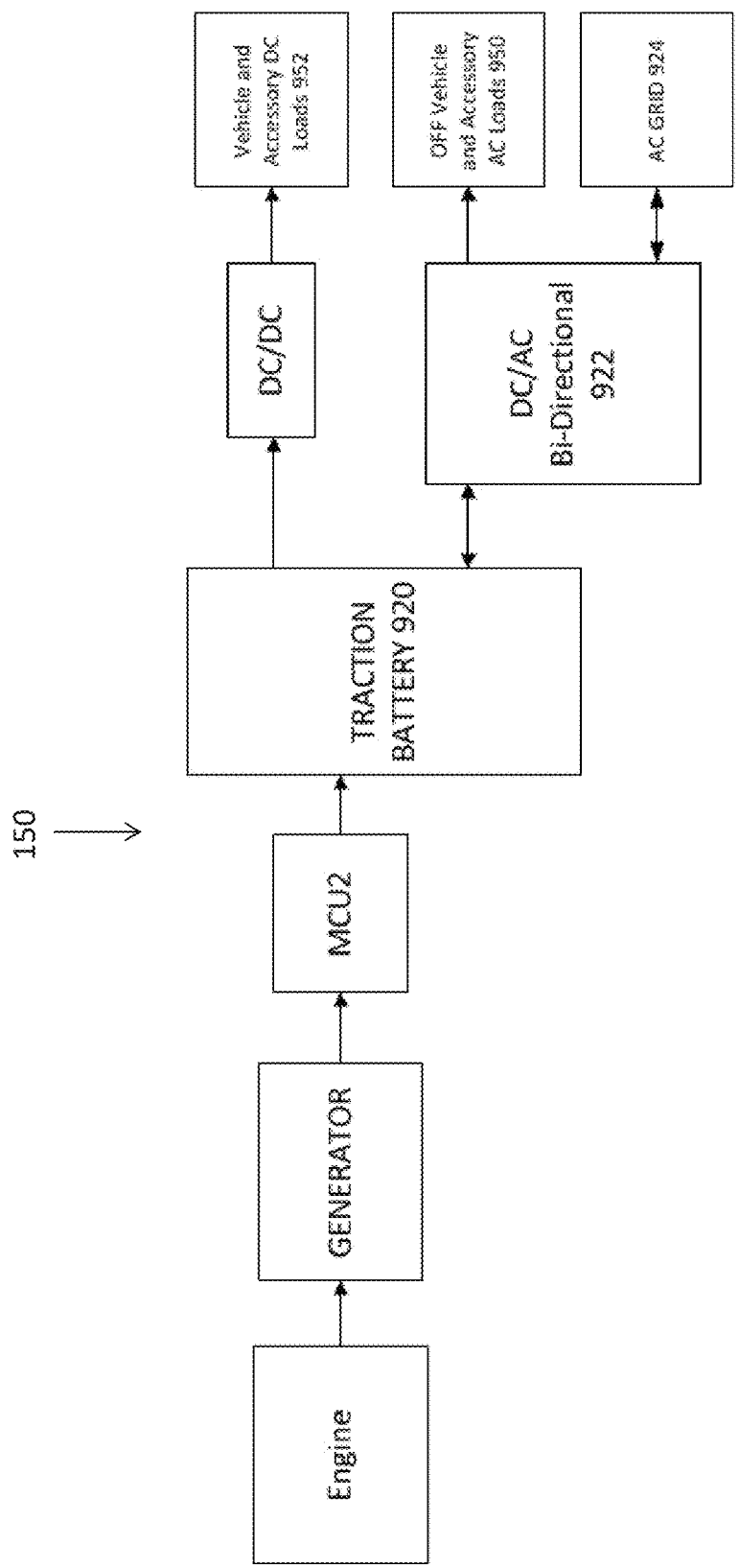
FIG. 51 is a schematic view of a charging system for the vehicle of FIG. 44 configured to receive and export power to and from the vehicle.

Referring to FIG. 51, electrical system 150 of FIG. 50 may be configured to both receive power to the vehicle and/or export power (AC and DC) from the vehicle to power onboard or outboard (e.g., external) devices or accessories, for example computers, power tools, medical devices, weapons, autonomy components, and/or surveillance components. More particularly, when the engine is operating, the generator may adjust its output to meet onboard vehicle loads 952 and outboard vehicle loads 950. However, when the engine is not operating, a traction battery 920 of the vehicle is configured to as a remote power source to provide power to vehicle loads 950, 952. A solid-state device, illustratively a bi-directional device 922, is included on electrical system 150 and is able to convert DC power from traction battery 920 into AC export power. Bi-directional device 922 also may receive AC power from an AC grid 924 and convert the power to DC for charging traction battery 920. In one embodiment, bi-directional device 922 may be charger 320 of FIG. 37B.

Bi-directional device 922 and traction battery 920 may operate while the state-of-charge ("SOC") of traction battery 920 is above a threshold value. However, if the SOC of traction battery 920 decreases below the threshold, traction battery 920 and bi-directional device 922 may stop operating such that power intake or power export capabilities are no longer possible until traction battery 920 is charged. Illustrative traction battery 920 and bi-directional device 922 may be configured for DC electrical loads up to approximately 3400 watts and approximately 24 volts and also may be configured for AC electrical loads up to approximately 240 volts. Various components of electrical system 150, including traction battery 920 and bi-directional device 922 may be air and/or liquid cooled during operation thereof.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A parallel hybrid power train for a vehicle, comprising:
   an engine;
   a transmission coupled to the engine;
   a front drive coupled to the transmission through a prop shaft;
   a rear drive coupled to the transmission;
   a traction motor being drivingly coupled to the front drive and being drivingly coupled to the transmission through the prop shaft, and the traction motor being spaced apart from the prop shaft;
   a bi-directional clutch between the prop shaft and the front drive; and
   a battery to operate the traction motor.

2. The parallel hybrid power train of claim 1, wherein the power train is configured for a silent mode when the traction motor operates to drive the prop shaft to drive the front and rear drives.

3. The parallel hybrid power train of claim 1, further comprising an engine driven generator to charge the battery.

4. The parallel hybrid power train of claim 3, wherein the power train is configured for a charge at rest mode when the engine is run to charge the batteries through the engine driven generator.

5. The parallel hybrid power train of claim 3, wherein the traction motor defines a second generator configured to charge the batteries.

6. The parallel hybrid power train of claim 5, wherein the power train is configured for a charge and drive mode when the vehicle is driven and the batteries are charged by the engine driven generator and the traction motor defines the second generator.

7. The parallel hybrid power train of claim 1, wherein the power train is configured for a full performance mode when the traction motor and engine are both operated to add torque to the prop shaft to drive the front and rear drives.

8. The parallel hybrid power train of claim 1, wherein the prop shaft has first and second portions and the bi-directional clutch is intermediate the prop shaft first and second portions.

9. The parallel hybrid power train of claim 1, comprising a silent mode wherein the traction motor operates to drive the front drive, which in turn drives the rear wheels through the prop shaft.

10. A vehicle, comprising:
    a frame assembly;
    an operator area including at least an operator seat and a passenger seat supported on the frame assembly; and
    a driveline assembly including:
      an engine supported on the frame assembly;
      a transmission operably coupled to the engine;
      a front drive operably coupled to the transmission through a prop shaft;
      a rear drive operably coupled to the transmission;

a traction motor operably coupled to the prop shaft and positioned laterally intermediate the operator seat and the passenger seat; and a battery configured to operate the traction motor.

11. The vehicle of claim 10, further comprising a gear train operably coupled to the prop shaft and the traction motor.

12. The vehicle of claim 11, wherein the gear train includes at least a first gear rotatably coupled to an output shaft of the traction motor and a second gear rotatably coupled about the prop shaft and rotatably coupled to the first gear.

13. The vehicle of claim 12, wherein the driveline assembly is configured for a charge-and-drive mode when the engine is operably coupled to the prop shaft and is configured to rotate the prop shaft, and rotation of the prop shaft rotates the second gear and operates the traction motor through rotation of the first gear with the second gear, and the operation of the traction motor charges the battery.

14. The vehicle of claim 12, wherein the driveline assembly is configured for a silent-drive mode when the battery operates the traction motor, and the operation of the traction motor drives the front and rear drives through the prop shaft when the engine is turned off.

15. The vehicle of claim 10, wherein the driveline assembly is configured for a full-performance mode when both the engine and the traction motor operate simultaneously to drive the prop shaft.

16. The vehicle of claim 10, wherein the traction motor is laterally offset from the prop shaft.

17. The vehicle of claim 10, wherein the prop shaft is at a position on the vehicle vertically lower than the battery.

* * * * *